United States Patent
Ragen

[15] 3,676,658
[45] July 11, 1972

[54] SERIAL ADDER/SUBSTRACTER UTILIZING COUNTERS

[72] Inventor: Robert A. Ragen, Hayward, Calif.
[73] Assignee: The Singer Company
[22] Filed: Dec. 12, 1969
[21] Appl. No.: 889,802

Related U.S. Application Data

[62] Division of Ser. No. 398,902, Sept. 24, 1964, Pat. No. 3,523,282, which is a division of Ser. No. 319,273, Oct. 28, 1963, abandoned.

[52] U.S. Cl. .................................................235/176
[51] Int. Cl. ...............................................G06f 7/50
[58] Field of Search ..............235/176, 168, 167, 165, 92 CP, 235/92 SA, 92 DP, 92 CC

[56] References Cited

UNITED STATES PATENTS

| | | | |
|---|---|---|---|
| 2,917,236 | 12/1959 | Reisch | 235/176 |
| 3,018,960 | 1/1962 | Dirks | 235/176 |
| 3,055,587 | 9/1962 | Wiedmer et al. | 235/176 |
| 3,161,765 | 12/1964 | Hoberg et al. | 235/176 |
| 3,294,959 | 12/1966 | Ward | 340/324 X |

Primary Examiner—Charles E. Atkinson
Assistant Examiner—David H. Malzahn
Attorney—Charles R. Lepchinsky

[57] ABSTRACT

The disclosure relates to an electronic desk type calculator wherein a pair of four element counters acting together in conjunction with timing and other circuitry are capable of performing the functions of shifting, addition, subtraction, multiplication and division.

8 Claims, 25 Drawing Figures

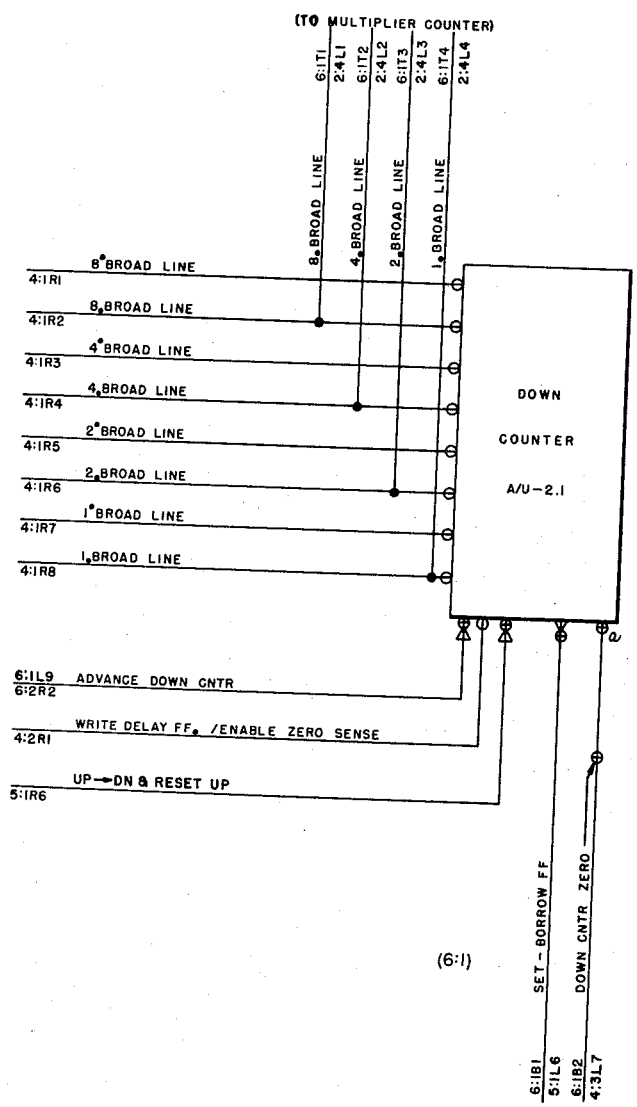

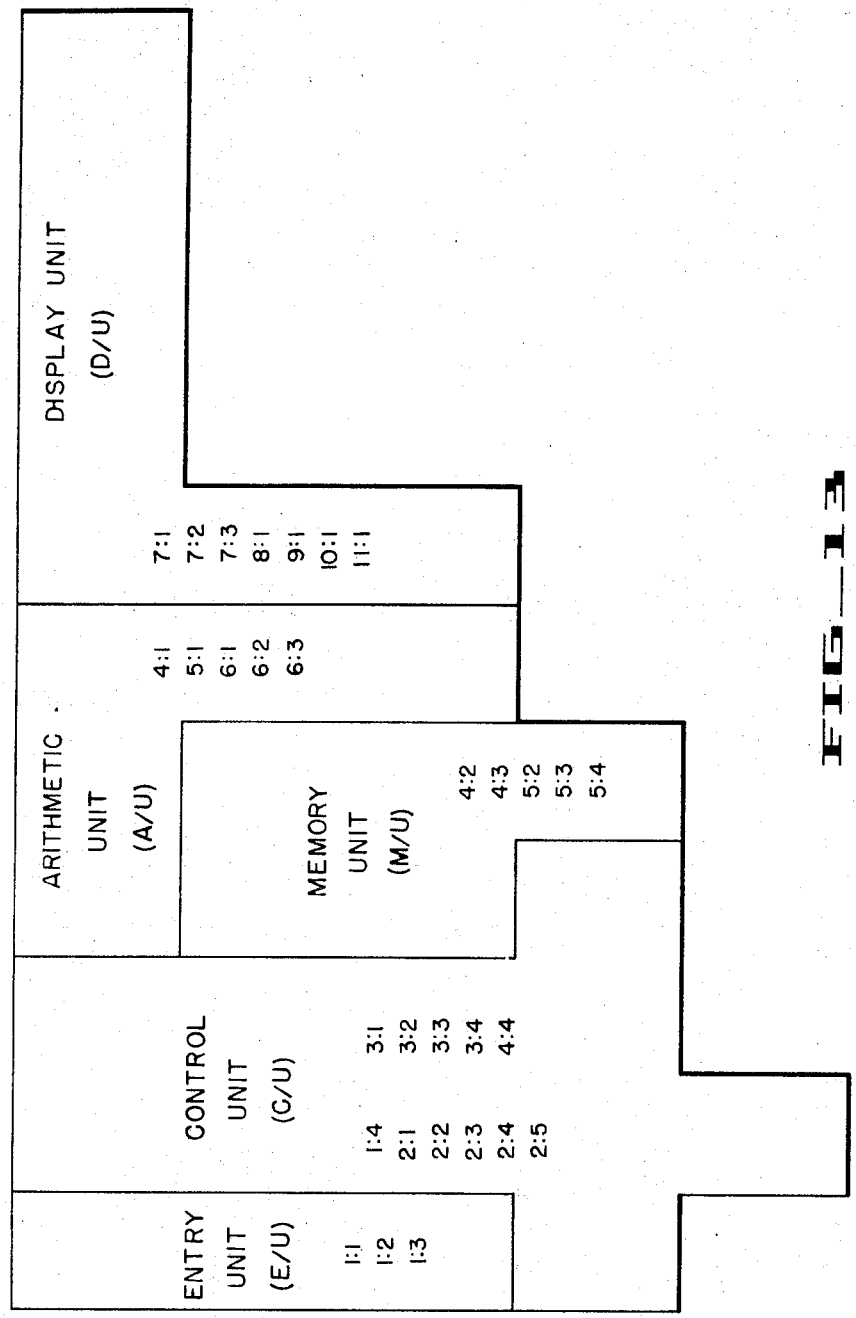
FIG_13

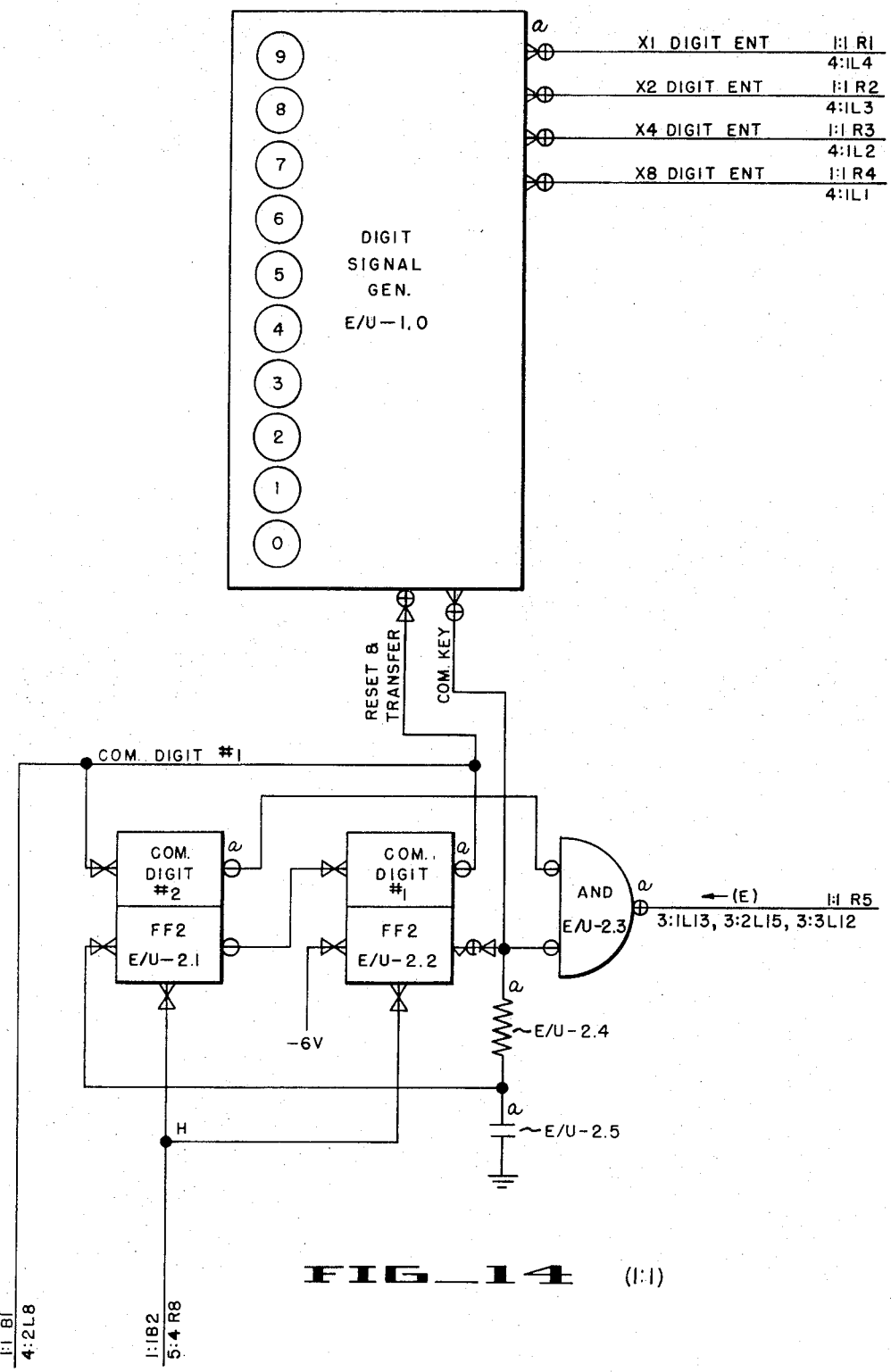
FIG_14 (1:1)

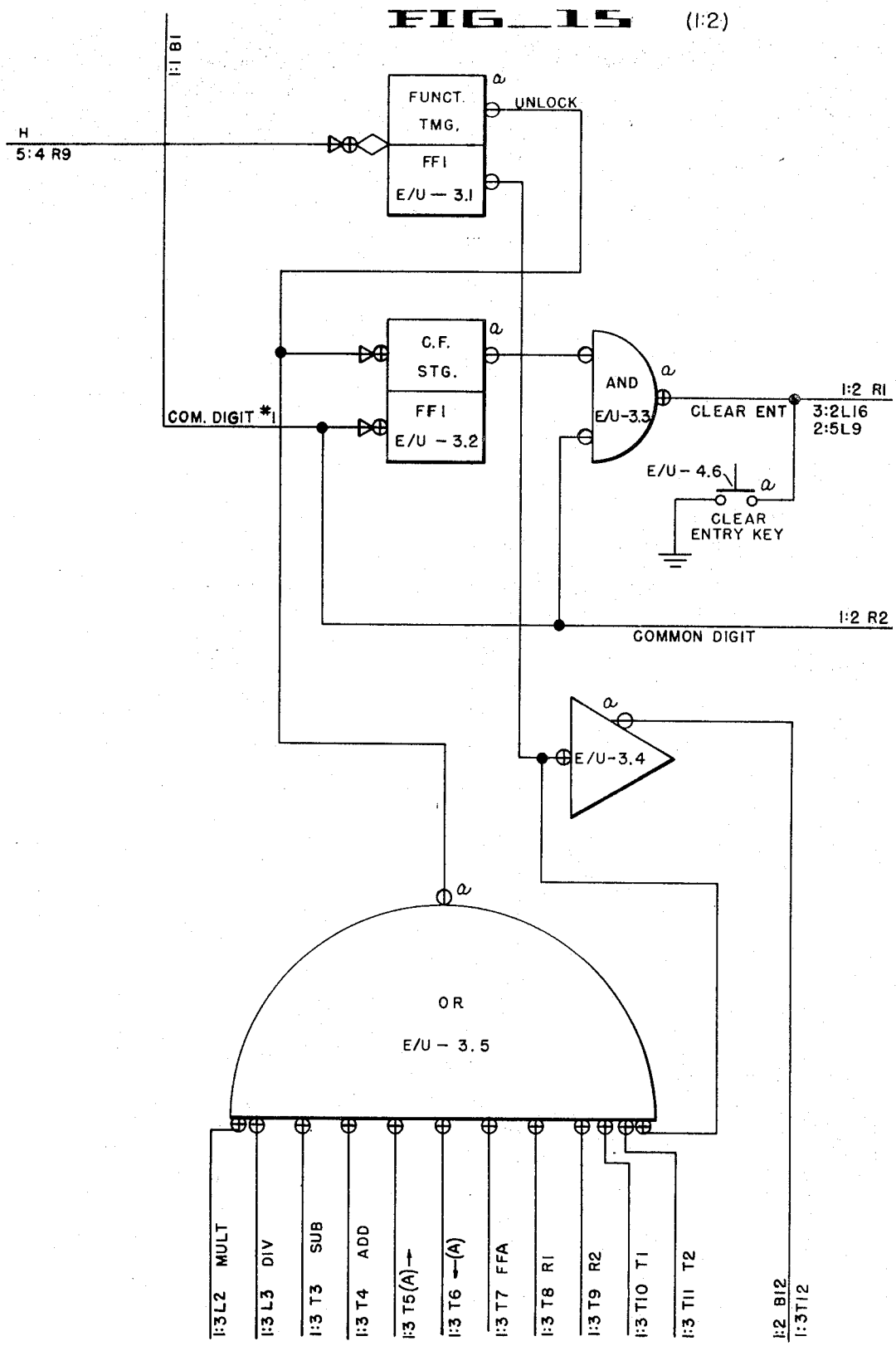

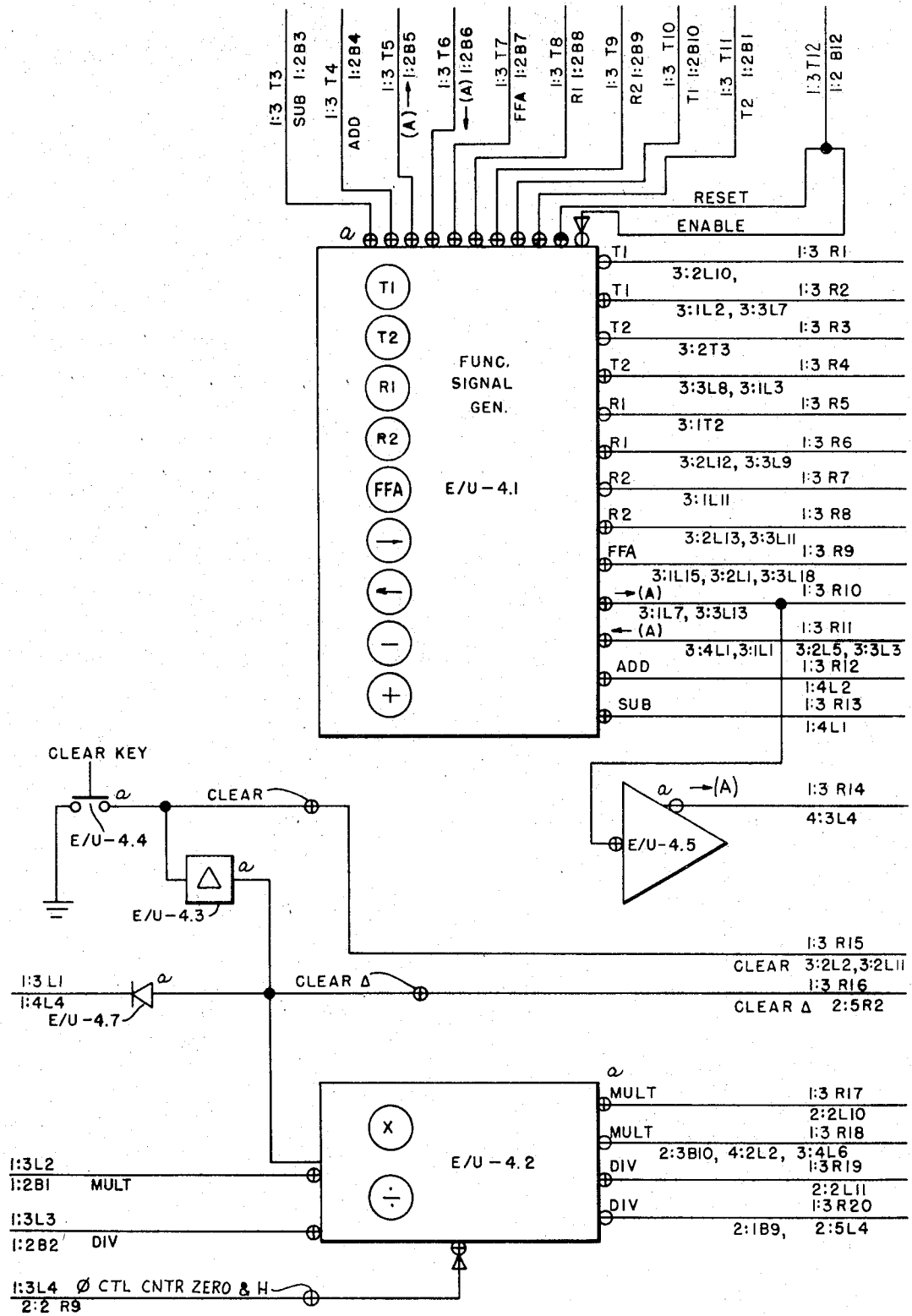
FIG_16 (1:3)

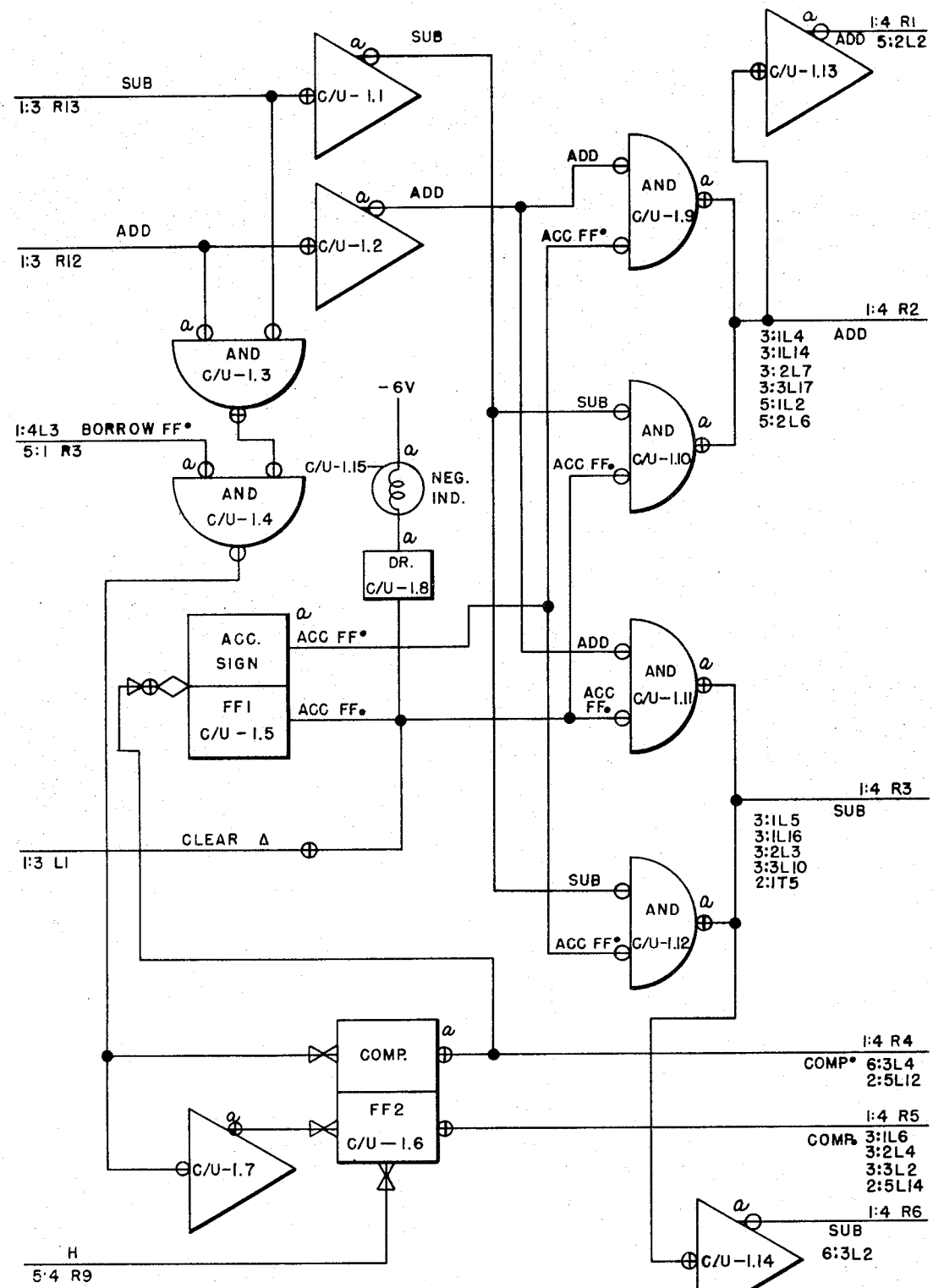
FIG_17 (1:4)

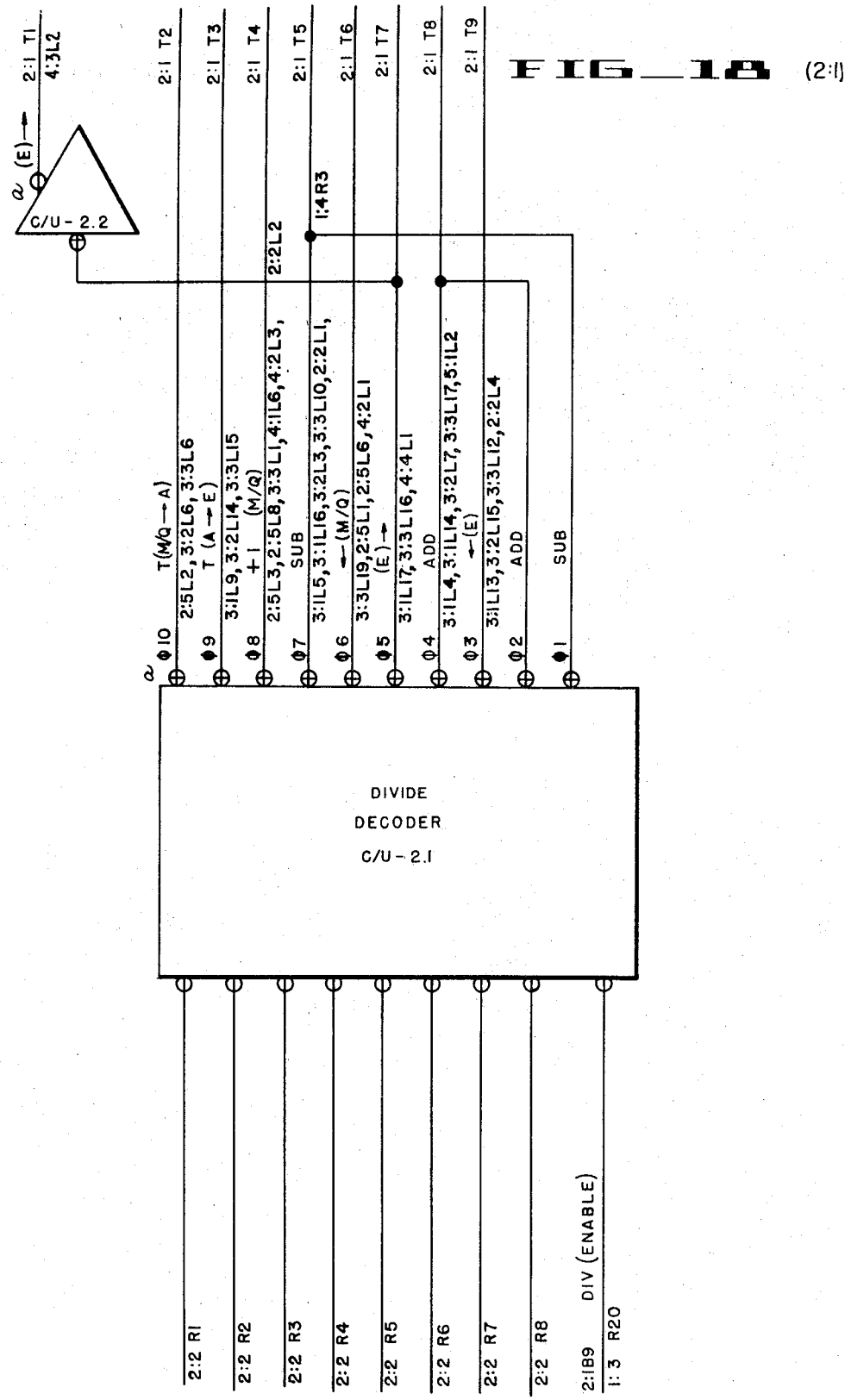
FIG_18 (2:1)

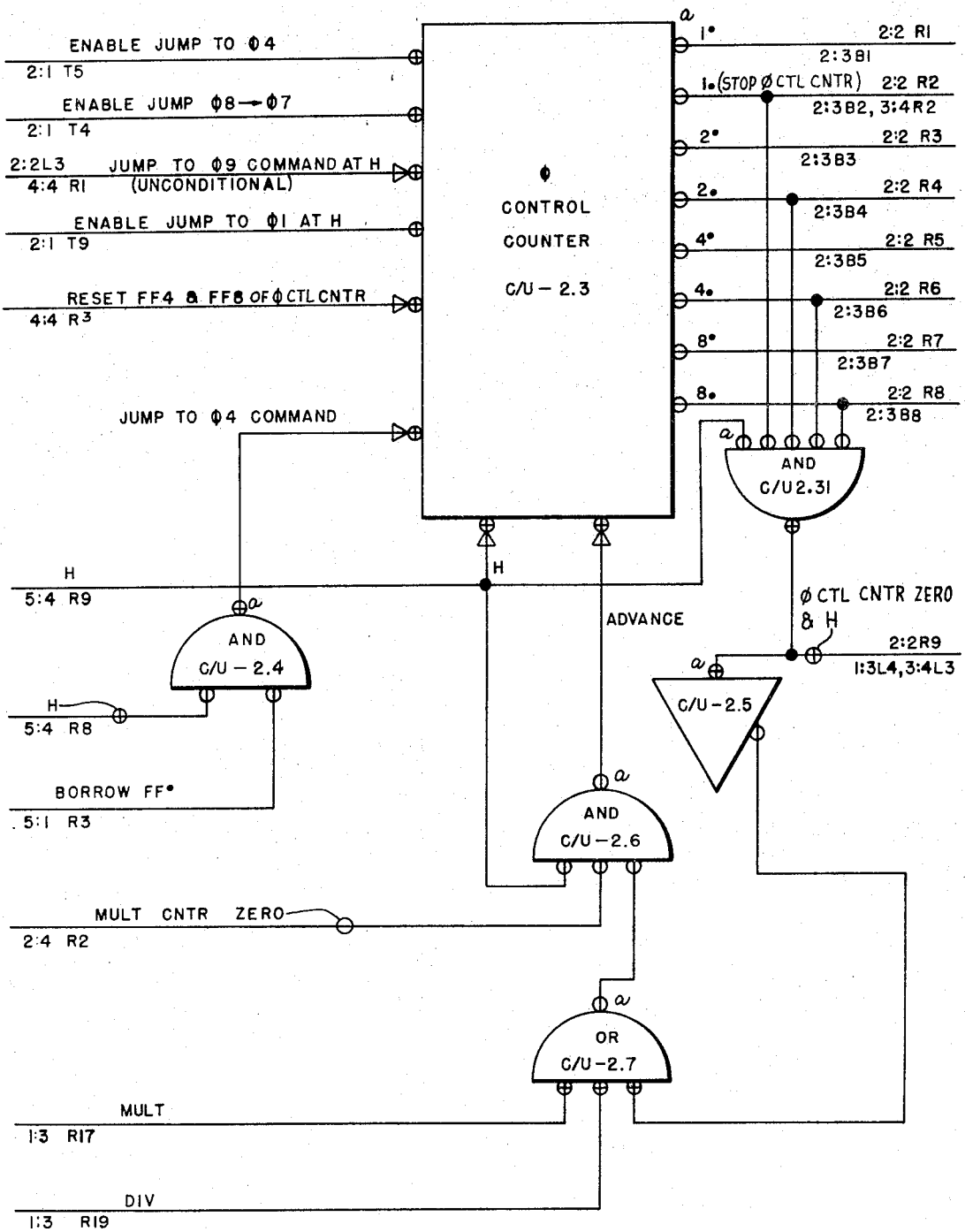
FIG_19 (2:2)

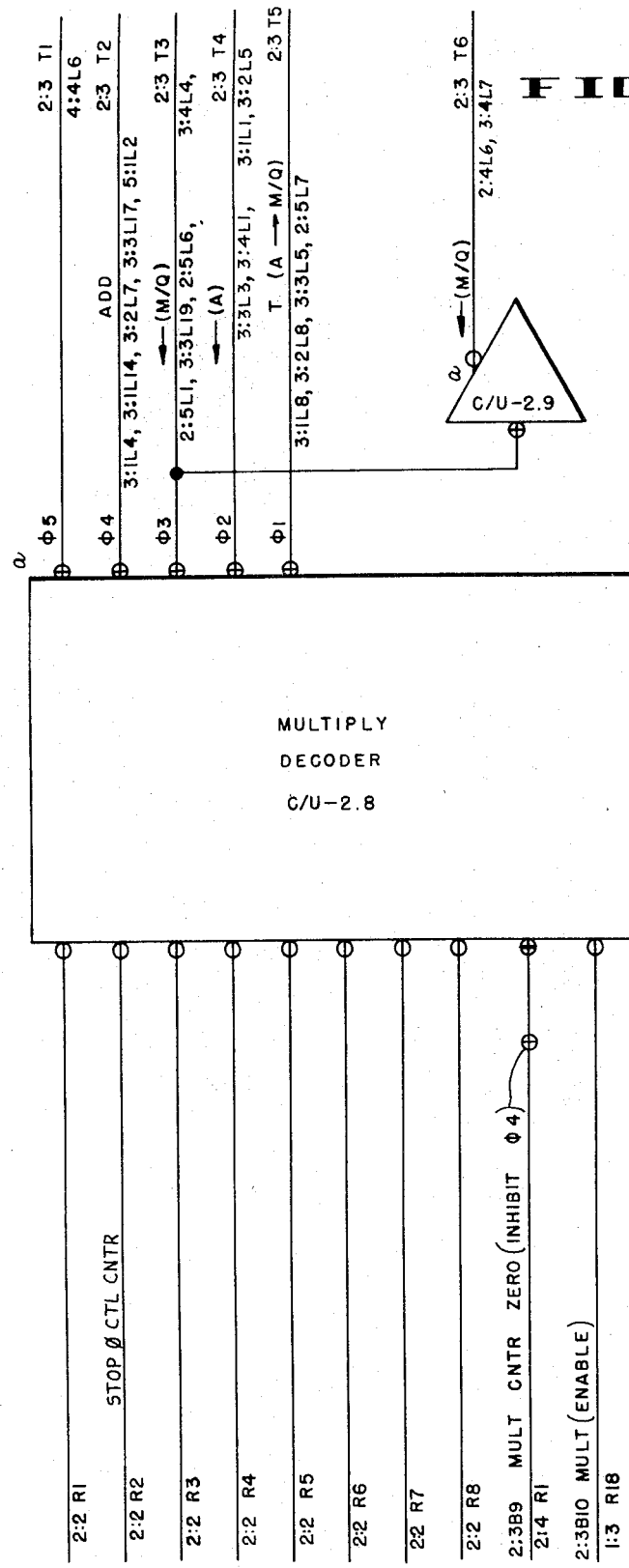
FIG_20

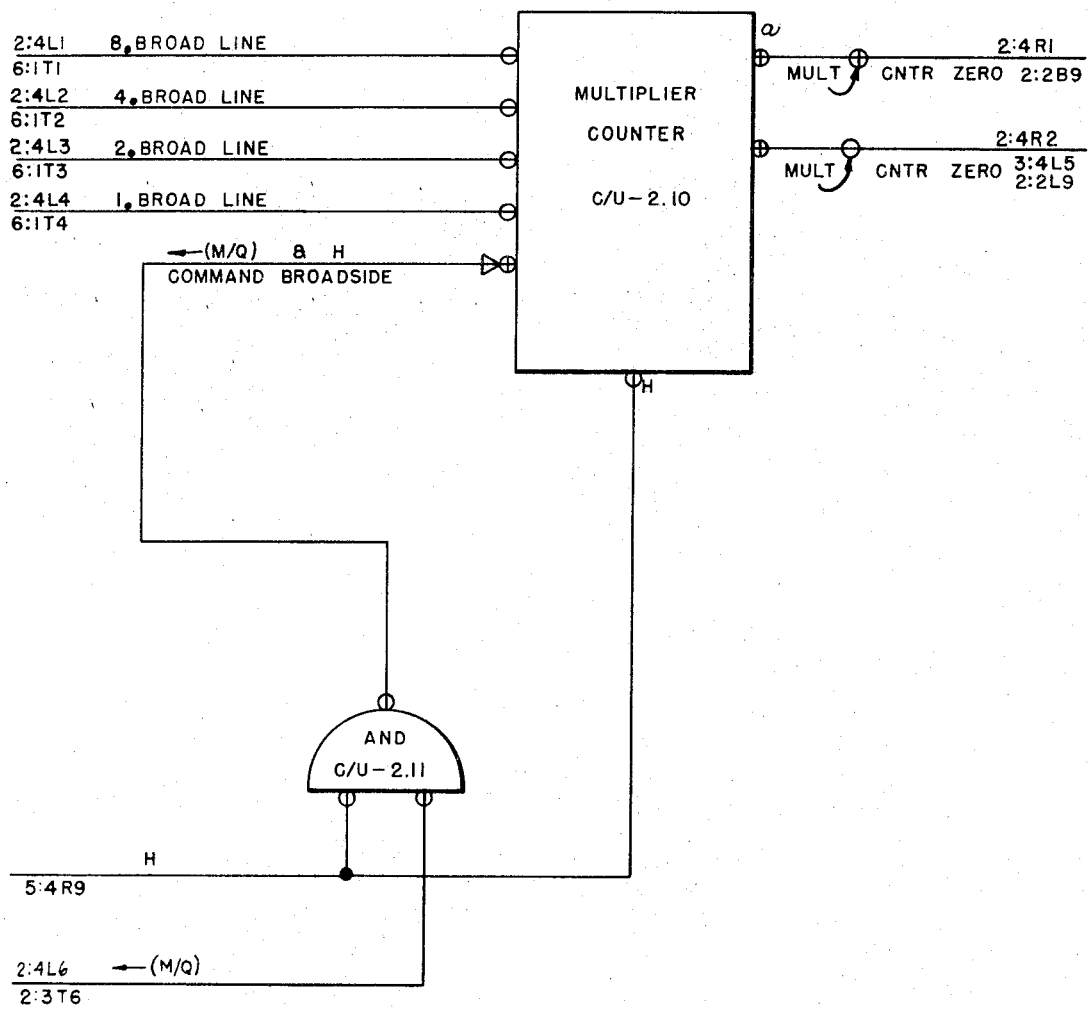
FIG_21 (2:4)

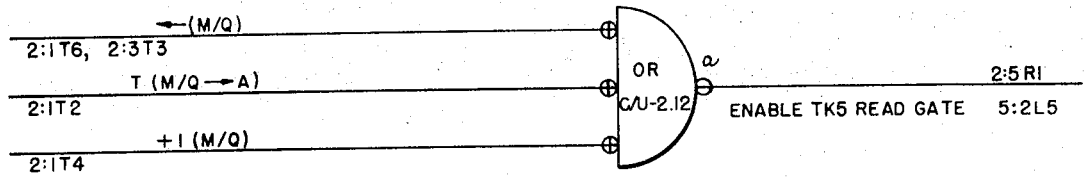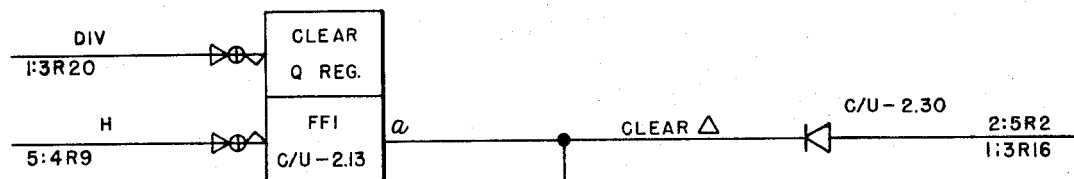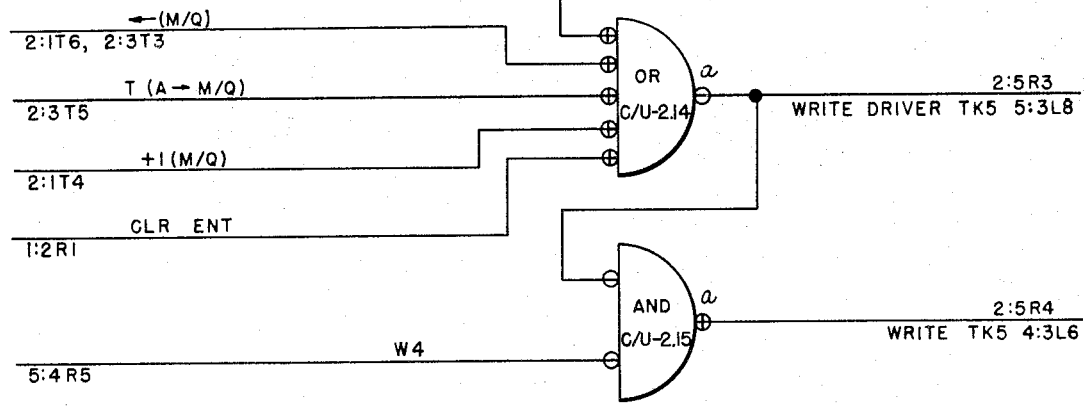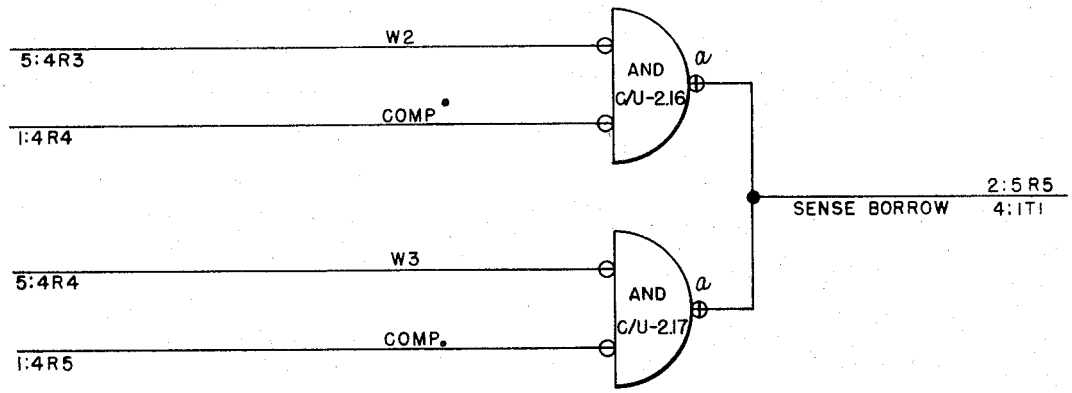
FIG_22 (2:5)

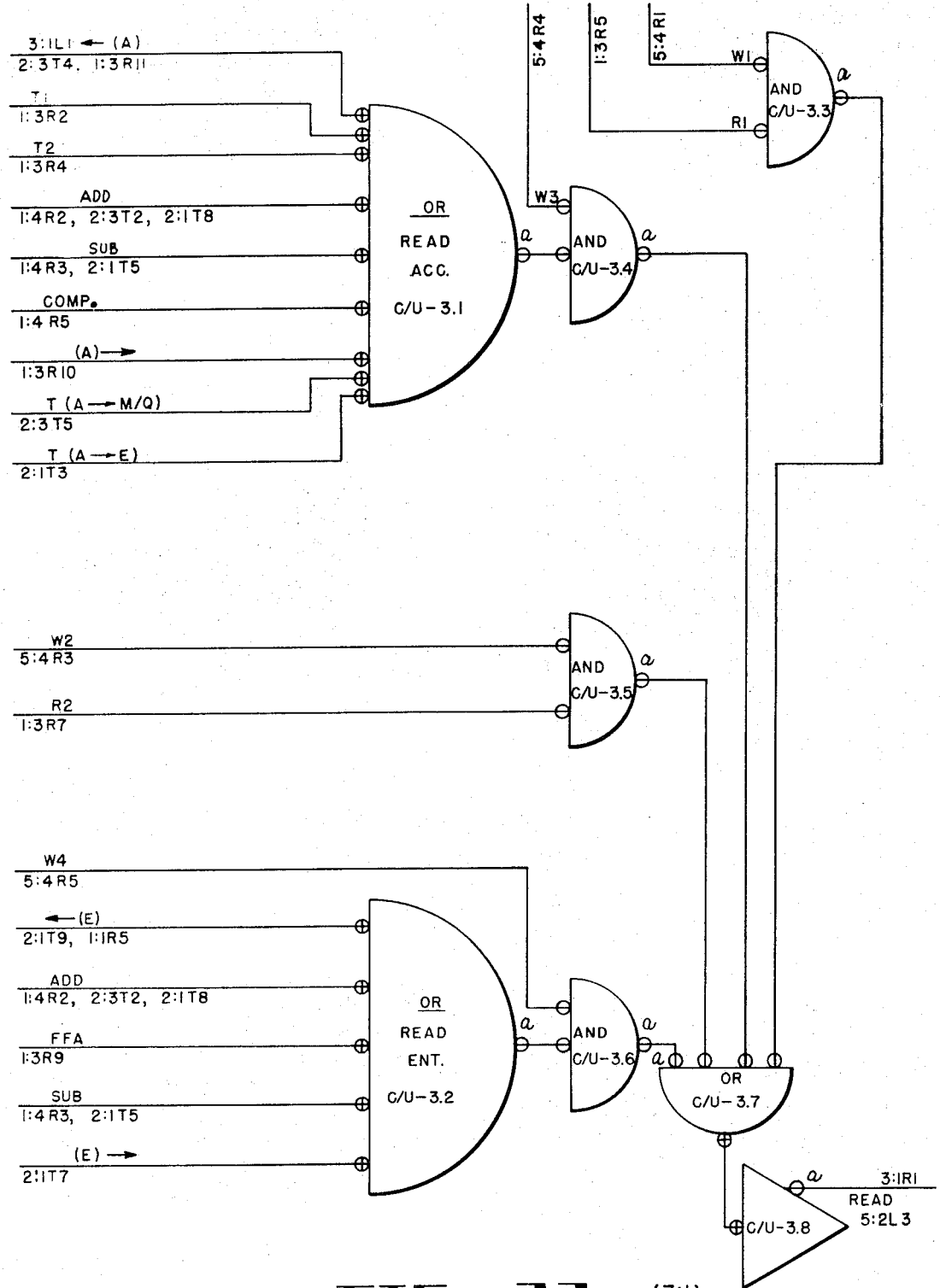
FIG_23 (3:1)

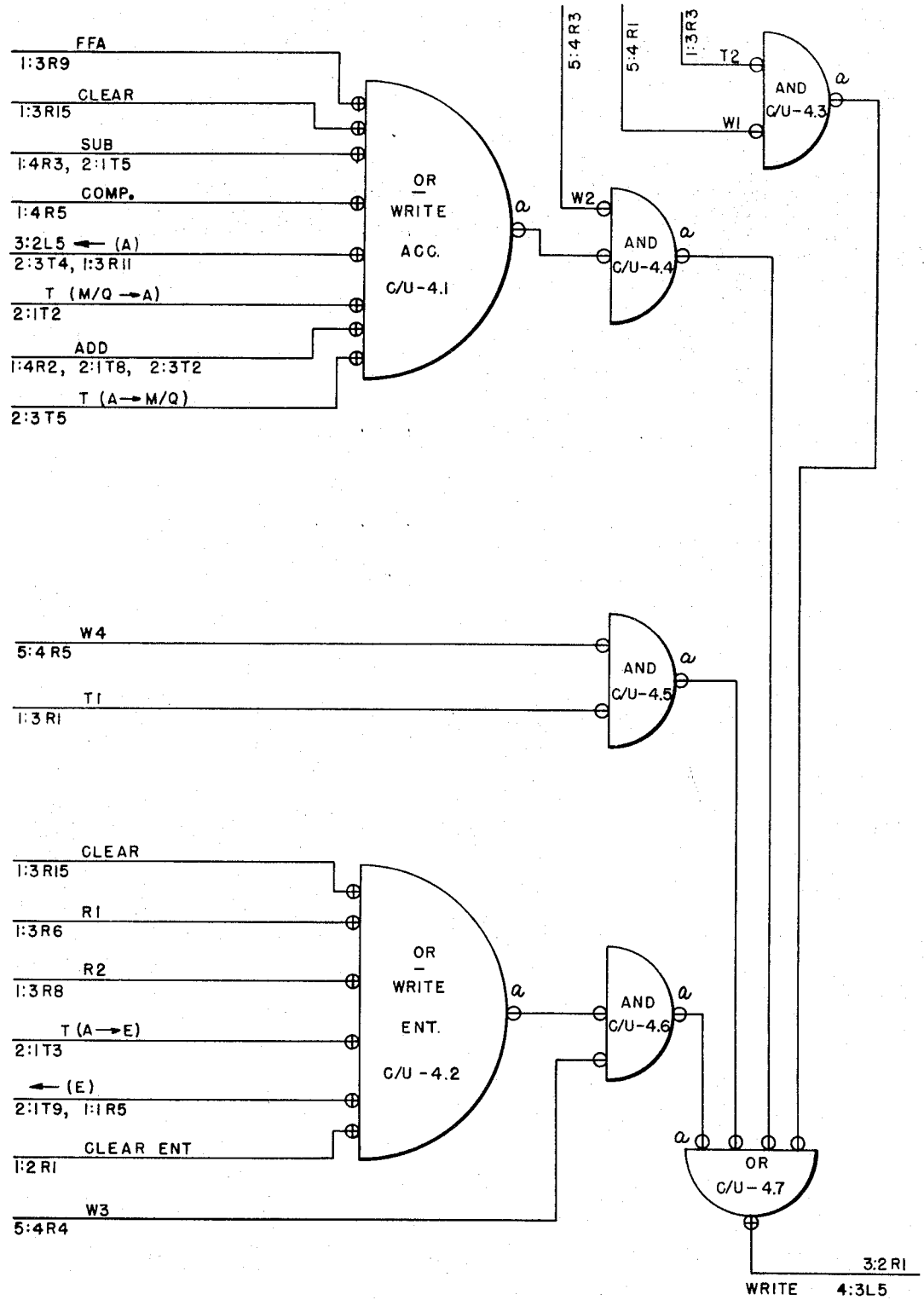
FIG_24 (3:2)

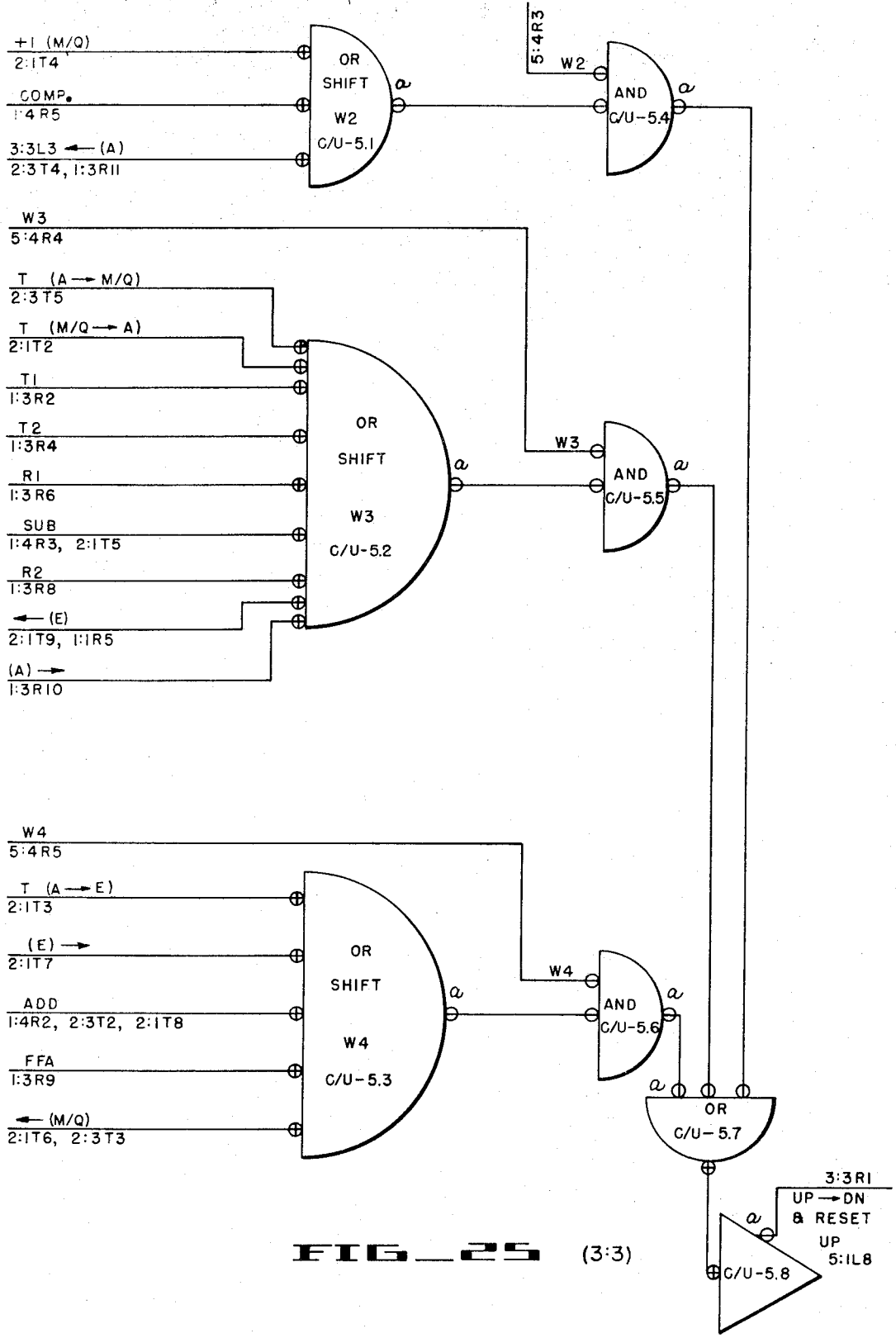
FIG_25 (3:3)

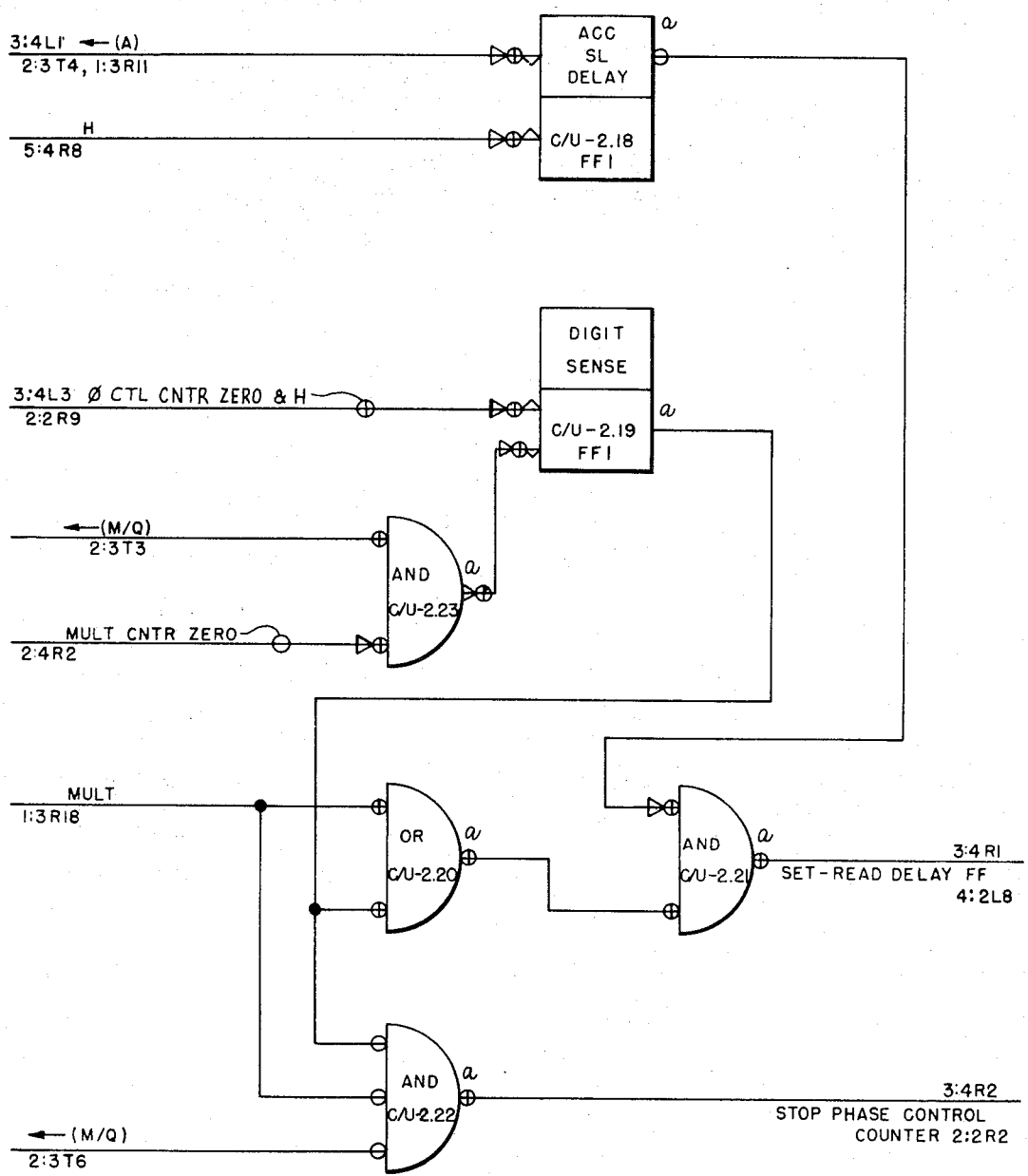
FIG_26 (3:4)

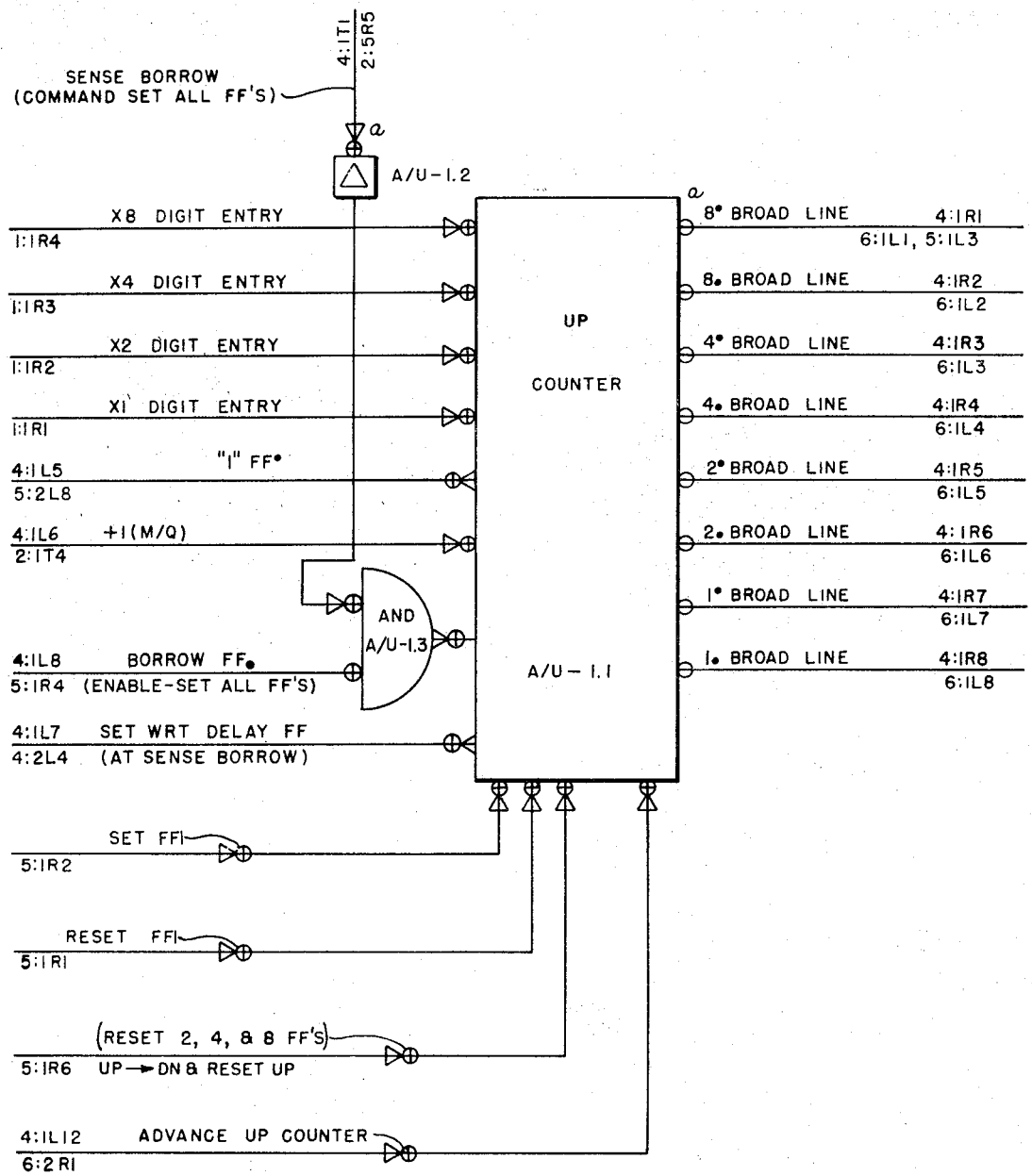
FIG_27 (4:1)

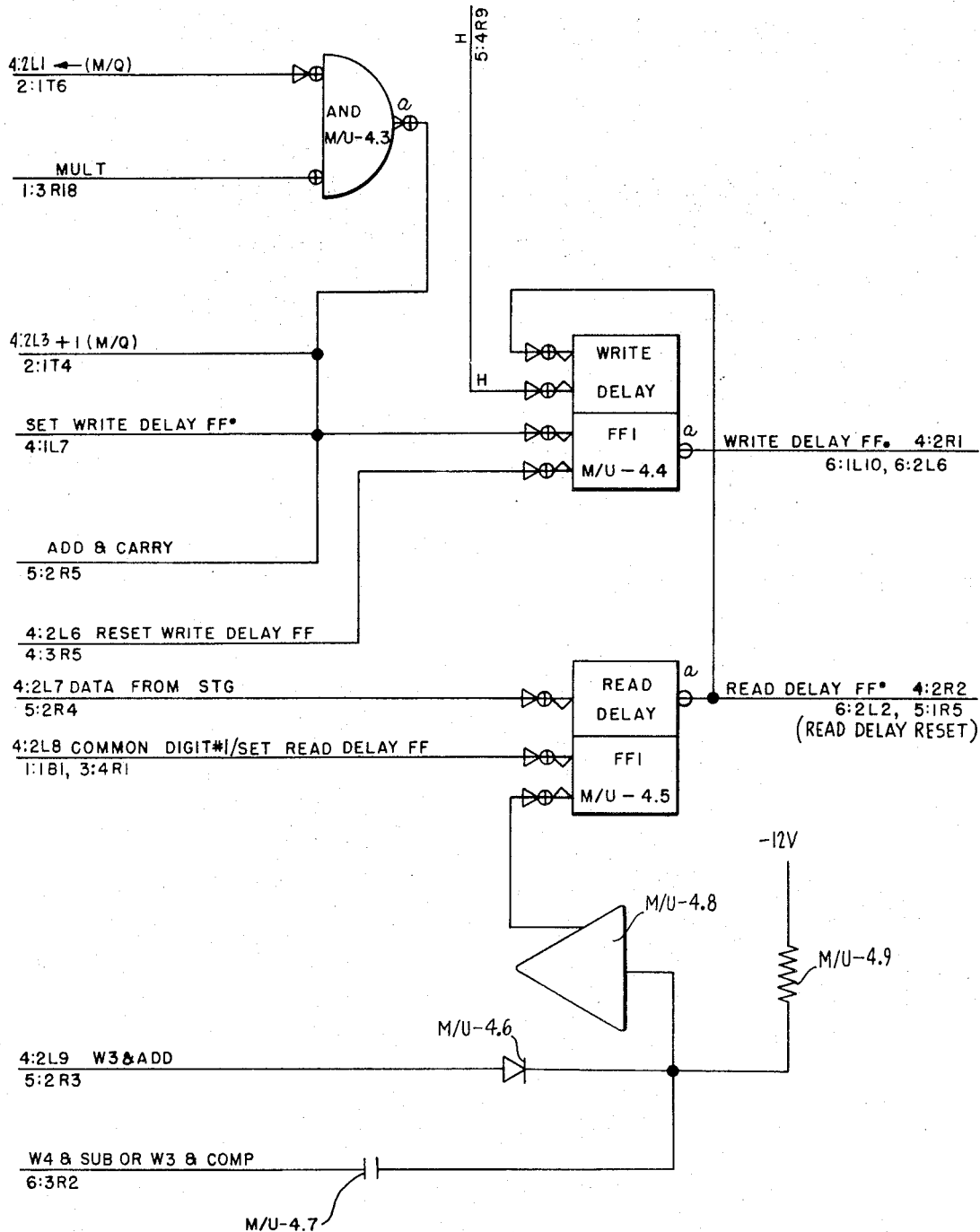
FIG_28 (4:2)

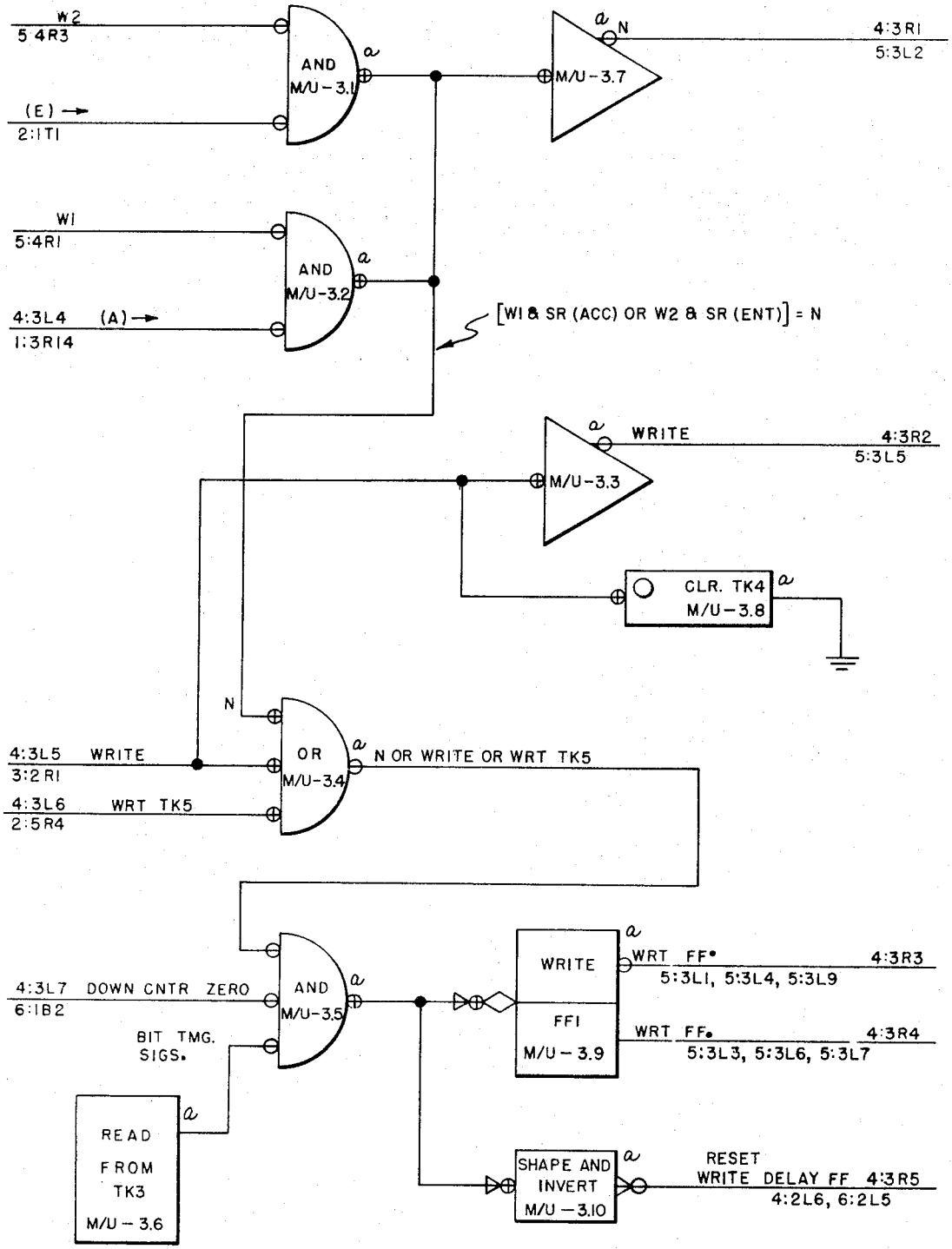
FIG_29 (4:3)

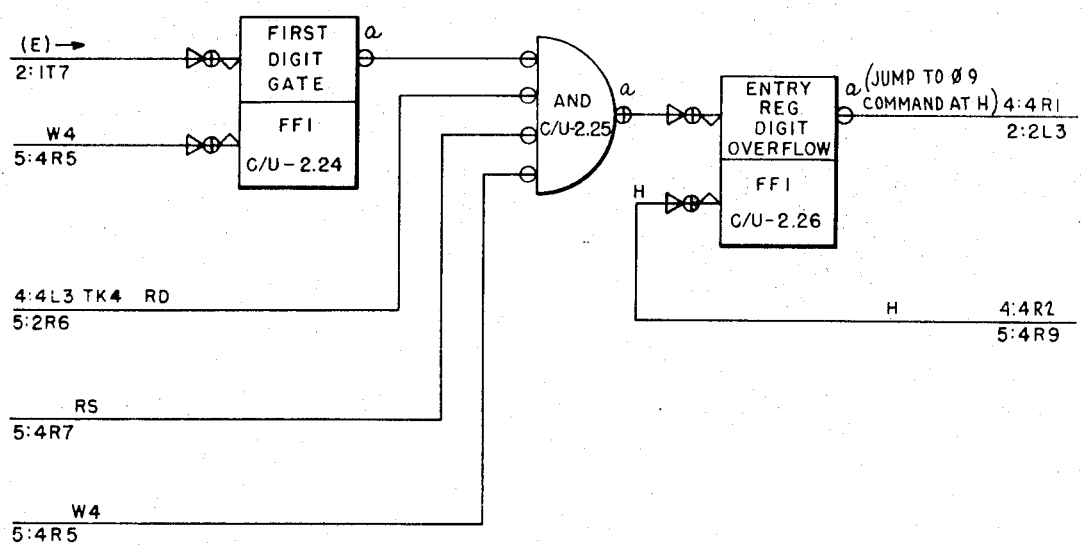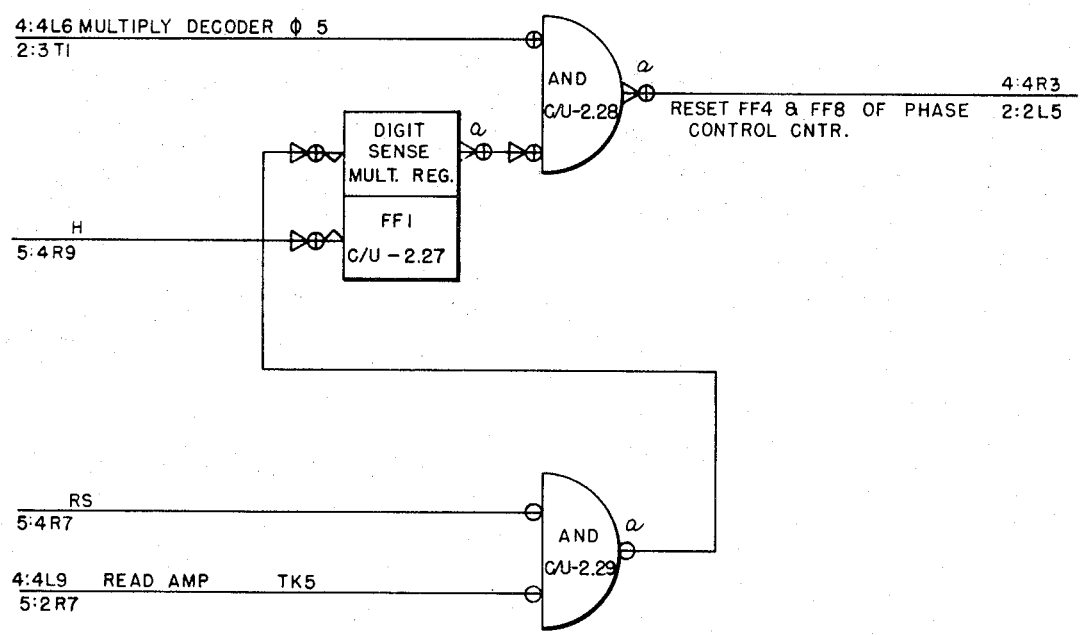
FIG_30 (4:4)

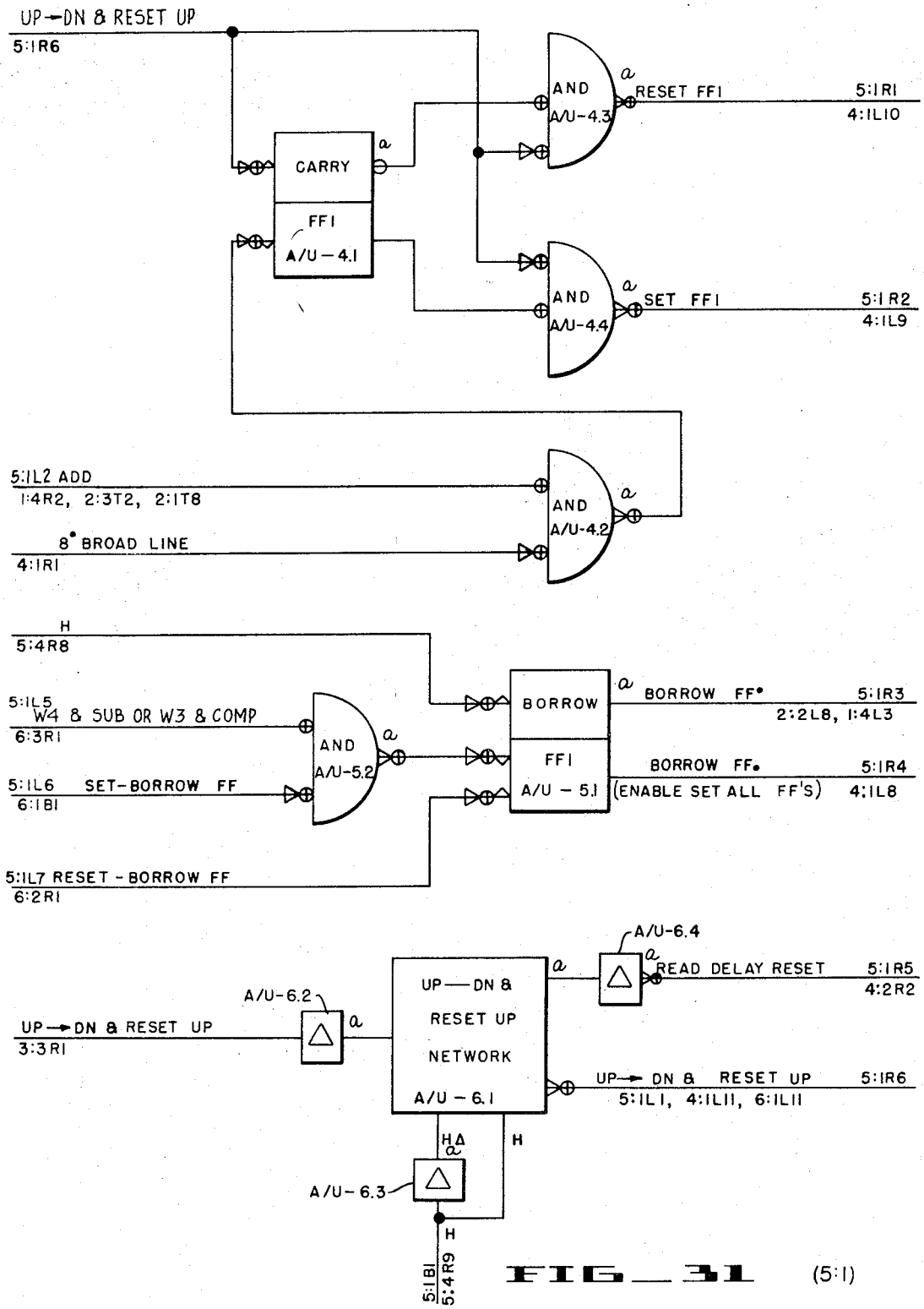
FIG_31 (5:1)

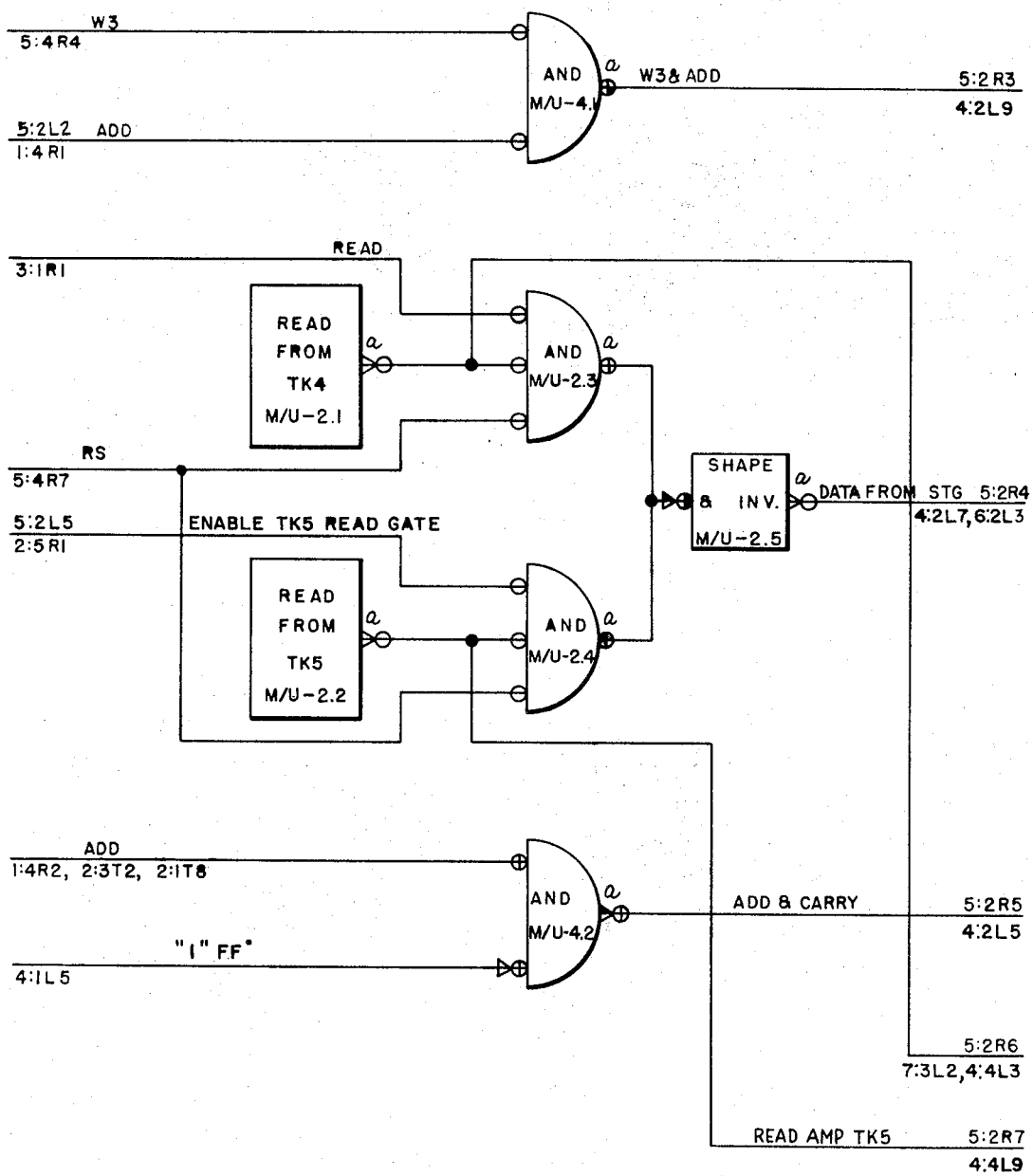
FIG_32 (5:2)

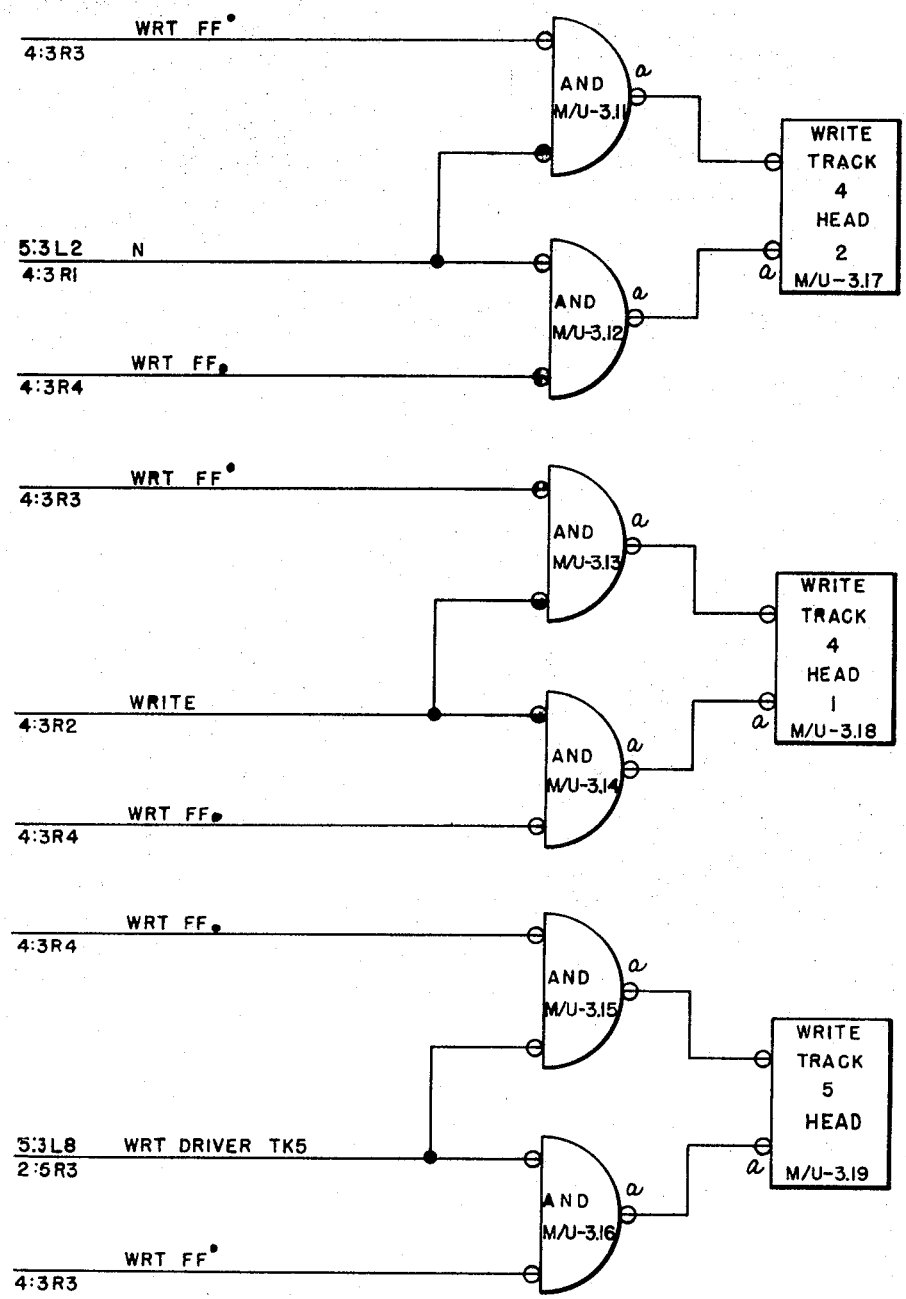
FIG_33 (5:3)

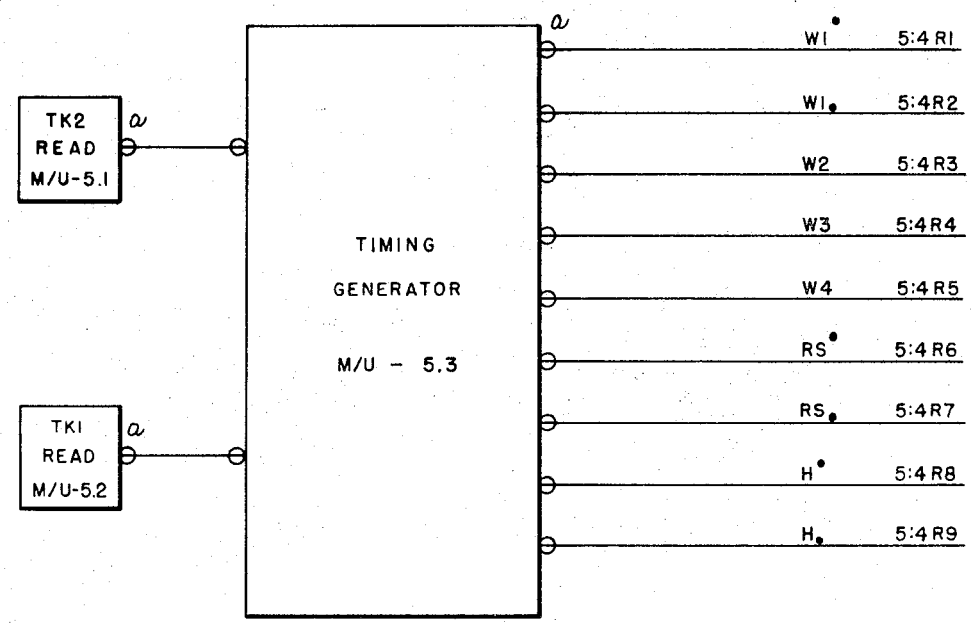
FIG_34 (5:4)

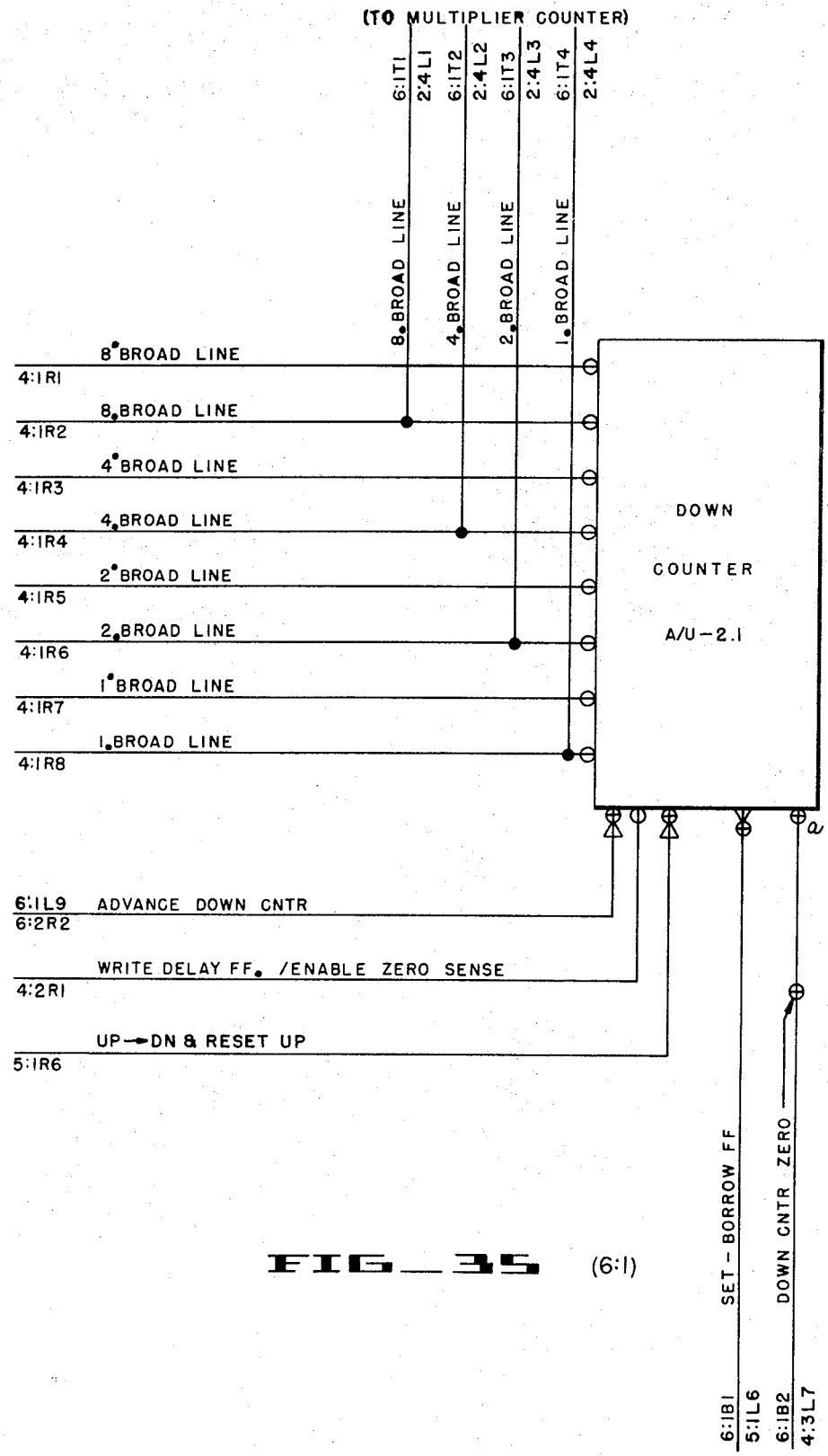
FIG_35 (6:1)

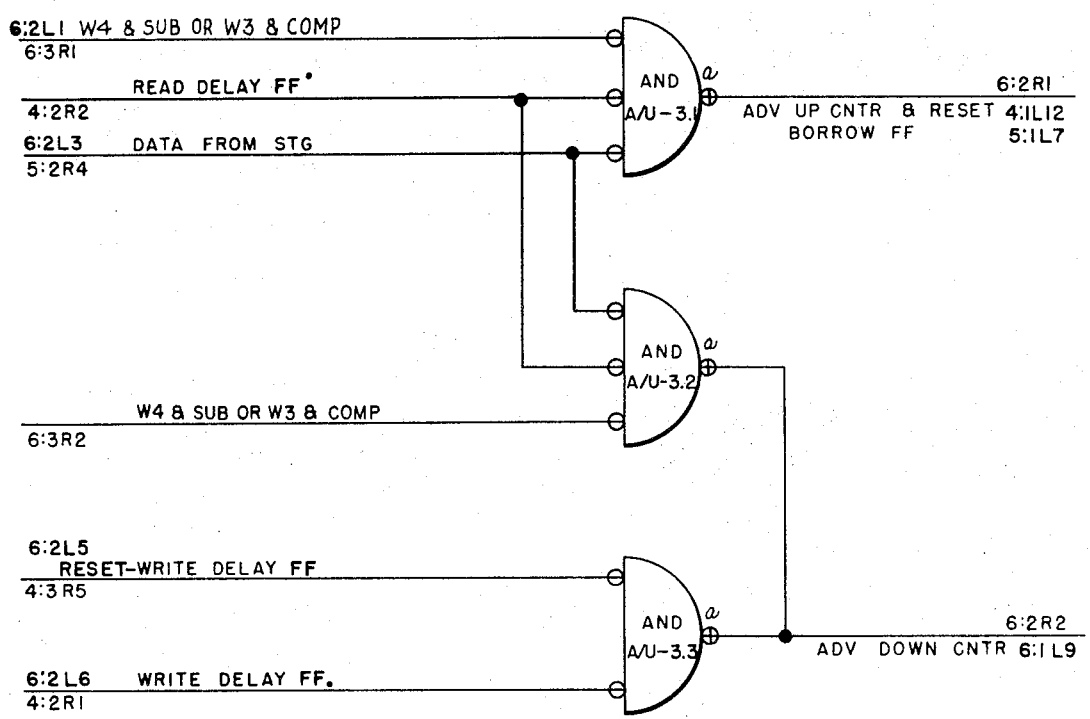
FIG_36 (6:2)

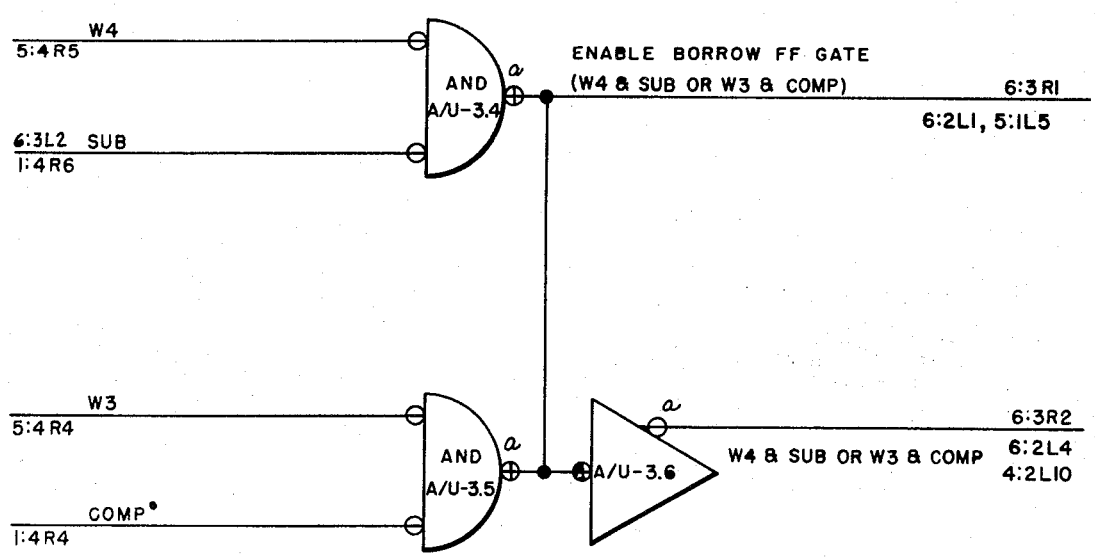
FIG_32 (6:3)

SERIAL ADDER/SUBSTRACTER UTILIZING COUNTERS

This invention relates to calculators, and, more particularly, to calculators adapted for at least one mode of data entry, viz., manipulation of a keyboard, and is a division of Ser. No. 398,902 now U.S. Pat. No. 3,523,282, which was a division of the copending application, Ser. No. 319,273, filed October 28, 1963, now abandoned.

Further, this invention relates to calculators which employ electronic means for performing calculations, as distinguished from the gear trains, racks, electromagnetic relay banks, and similar devices, of the great bulk of the prior art.

Also, this invention relates to calculators which employ electronic means for displaying the data entered into the calculator resulting from the calculations performed, as distinguished from the mechanical dials, and the like, of the prior art.

More particularly yet, this invention relates to electronic calculating devices of the highly compact type, i.e., those ranging in size from the volume of s small stenographer's desk to the volume of a present-day rotary, mechanical calculator, or even smaller, exclusive of auxiliary devices.

It has been broadly suggested in the prior art that a single, incrementable-type electronic counter be used in a large-scale, complex bookkeeping machine for the purpose of updating stored records.

The prior art has also disclosed a character display device in which the character is generated by selectively unblanking or turning on the stroke traces of a rectilinear-trace character raster in response to an unblanking signal selected by gating from among a set of N blanking signals, said blanking signals being continuously generated by N different blanking signal generators.

Those skilled in the art have long recognized the desirability of combining various principles and expedients which have evolved during the development of large-scale, automatic sequence controlled calculator technology, and automatic industrial control technology, into a compact, quiet, high-speed, keyboard-controlled calculating device which would perform at least the four basic arithmetic operations, addition, subtraction, multiplication, and division.

It has been generally recognized in the calculator art that it is highly desirable to provide, in keyboard-controlled calculating devices, retrievable storage means which are capable of storing a factor in response to the depression of a single key, and of retrieving the contents of this storage by depression of another single key. It has also been recognized that, desirably, such retrievable storage means should be "visible," rather than "blind," i.e., that it should be possible to see the contents of such storage displayed upon the face of the calculating device at all times.

In addition, it is generally recognized that magnetic storage drums are produced which are extremely compact and free from the problems usually associated with moving parts, and that it is desirable for these reasons, where possible, to incorporate such magnetic storage in electronic apparatus, e.g., in automatic sequence controlled calculating machines.

It is also well-known in the art that, where possible, the substitution of solid state components for space discharge devices is desirable for reasons of saving space, avoiding the problem of heat dissipation to a large degree, avoiding the use of filament voltage supplies, or ionizing supplies, and to provide a device which is generally rugged and free from excessive difficulties due to mechanical shock.

It is also desirable, in an electronic, keyboard-controlled calculating device, to provide a keyboard arrangement having a large number of "unconditional" function keys, i.e., keys, the operation of which is independent of the setting of other keys. This freedom from "conditional" function keys, results, of course, in a greater freedom from arbitrary rules of calculator operation such as are characteristic of devices of the prior art, and which have to be thoroughly learned before proficiency can be attained in the use of such prior art calculating devices. This freedom from arbitrary rules of operation results in lowering the cost of training clerical operators, and extends the usefulness of such an electronic calculating device to embrace a class of "casual" users, such as scientists and technicians.

It is also recognized as desirable in connection with the present invention to provide an external utilization device which can be directly connected to and controlled by the electronic calculator. Such utilization devices could comprise storage devices, printing devices, display devices, data transmitting devices, punching devices, etc.

It is also recognized as desirable in connection with the present invention to provide cathode ray display means capable of displaying the contents of a plurality of stores, in addition to current keyboard entry, or the result of a previously calculated step.

An object of the present invention is to provide an arithmetic unit in an electronic calculating device which is capable of arithmetically combining numerical factors emitted by a storage means in pulse-count or unitary, notation without the interposition of means for converting to a second form of notation.

Another object of the present invention is to provide an arithmetic unit for a keyboard-controlled, electronic calculating device adapted to receive numerical data in the form of a pulse train expressing said data in pulse-count, or unitary, notation, and to transmit the result, or partial results, of arithmetically operating upon such data in the form of a pulse train in which said results, or partial results, are expressed in pulse-count, or unitary, notation.

Another object of the present invention is to provide an electronic calculator wherein a single basic group of electrical circuit elements provides a principal portion of the electrical circuitry utilized in all digit entry and function operations of the calculator. to change A further object of the present invention is to provide a single monosequenceable and contrasequenceable register which coact to perform at least a portion of all arithmetic and information shifting operations.

A further object of the present invention is to provide an excess bit code system whereby a decimal zero is represented by two different pulse code groupings.

A further object of the present invention is to provide an excess bit code system whereby a decimal zero is represented by a reproducible or a nonreproducible or suppressed zero code notation.

Other objects of the present invention will in part be obvious, and will in part appear hereinafter.

The invention relates to an electronic desk type calculator wherein a pair of counters, preferably four element binary counters acting together in conjunction with timing and other circuitry are capable of performing the functions of shifting, addition, subtraction, multiplication and division as well as aid in transfer of data to and from storage.

For a fuller understanding of the nature and objects of the invention, reference should be had to the following detailed description, taken in connection with the accompanying drawings, which may be described as follows:

FIG. 13 is a description in block form in accordance with the present invention.

FIGS. 14 to 37 comprise a logic diagram of the calculator in accordance with the present invention.

FIG. 13 is a block diagram of a calculator embodying the invention. In the ensuing description, reference is made to several sections and figures contained in U.S. Pat. No. 3,523,282 of R.A. Ragen, issued Aug. 4, 1970 and assigned to the assignee of the present invention.

The timing and storage circuits as used in the present disclosure are fully set forth in the above mentioned U.S. Pat. No. 3,523,282 in the section labelled TIMING and following from column 6 to column 10. The conventions followed in the drawings are identical to those of the subject patent.

With the above conventions and positioning of the figures in mind, the calculator will now be described in detail with respect to the logic diagram as set forth in FIGS. 14 to 44.

The various operations of the calculator which occur during digit entry therein or during some function operation thereof, are a result of one or more programmed operations of the calculator, many of these individual programmed operations being utilized in a plurality of the calculator functions. These programmed operations will now be discussed in conjunction with the digit entry and function operations of the calculator.

DIGIT ENTRY

A digit is entered into the calculator by the depression and release of one of the digit keys (FIG. 14) marked from "O" to "9" in the digit signal generator E/U–1.0. This depression and release of a digit key, as indicated in the digit entry timing diagram (FIG. 135 of U.S. Pat. No. 3,523,282), produces a positive-going pulse on the common key output line and sets the Common Digit No. 1 flip flop E/U–2.2 (FIG. 14). With the arrival of the first H pulse thereafter on bus 1:1B2, the Common Digit No. 2 flip flop is set, the Common Digit No. 1 flip flop remaining in its set condition. With the arrival of the next positive-going transition on the H bus 1:1B2, the Common Digit No. 1 flip flop is reset, thereby producing a positive-going transition upon the FF· output lead thereof and producing a positive-going transition on the reset and transfer bus to reset the digit signal generator which was previously set by the depression and release of a key therein.

The reset and transfer signal to the digit signal generator produces positive-going transitions on the digit entry buses 1:1R1 to 1:1R4 in accordance with the digital value of the key previously depressed and released; (i.e., depression of the "7" key would provide a positive-going transition on the X1, X2 and X4 digit entry buses labelled 1:1R1, 1:1R2 and 1:1R3, there being no positive-going transition on the X8 digit entry bus 1:1R4). These positive-going transition pulses are transferred along the respective digit entry buses to the up counter (FIG. 27), thereby setting the up counter to indicate the digital value of the key originally depressed and released in the digit signal generator.

COMMON DIGIT FLIP FLOPS

At this same time (denoted as H2 on the digit entry timing diagram FIG. 135 of U.S. Pat. No. 3,523,282), a shift left entry signal is generated as follows:

The Common Digit No. 1 flip flop being reset at this time will have a negative voltage level on its FF· output lead, whereas the Common Digit No. 2 flip flop will have a negative voltage level on its FF· output lead. The occurrence of these two signals at the input of the AND gate E/U–2.3 will produce a positive level signal at the output thereof and on the bus labelled shift left entry (1:1R5).

READ

The positive voltage level signal on the shift left entry bus 1:1R5 is also transferred to bus 3:1L13, this bus being one of the input terminals of the OR gate C/U–3.2.

GATE C/U–3.2

This positive voltage level on the input terminal of OR gate C/U–3.2 enables this gate and provides a negative voltage level at the output thereof, this voltage level being applied to one of the input terminals of the AND gate C/U–3.6. When a negative voltage level appears on the W4 bus 3:1L12 concurrently with the negative voltage level output from OR gate C/U–3.2, AND gate C/U–3.6 is enabled and provides a negative output signal thereat, this negative level being applied to one of the input terminals of the OR gate C/U–3.7.

GATE C/U–3.7

The negative voltage level at the input of OR gate C/U–3.7 enables this gate and provides a positive voltage level output thereat, this positive voltage level being inverted by the inverter C/U–3.8 to provide a negative voltage level on the read bus 3:1R1.

GATE M/U–2.3

The occurrence of a negative voltage level on the read bus 3:1R1 will provide a negative voltage level on the read bus 5:2L3, one input of AND gate M/U–2.3. When a concurrent negative signal level appears on the RS bus 5:2L4, bit pulses appearing at the output of the read from track 4 head M/U–2.1 will pass through the now enabled AND gate M/U–2.3 and appear as positive voltage levels at the output thereof.

SHAPE AND INVERT M/U–2.5

These positive voltage levels will then be transferred to the input of the shape and invert circuit M/U–2.5 to provide negative voltage levels at the output thereof on the data from storage bus 5:2R4.

These negative voltage level signals on the data from storage bus are applied to the data from storage bus 6:2L3 input of the AND gate A/U–3.1 and also to the input data from storage bus 4:2L7 of the read delay flip flop M/U–4.5.

GATE A/U–3.1

Since at this time, the enable borrow flip flop gate bus 6:2L1 is at a negative voltage level and the read delay FF· bus 6:2L2 is at this time at a positive voltage level, the read delay flip flop (FIG. 28) being reset at this time, the AND gate A/U–3.1 will not be enabled. The first bit from the data storage track will, therefore, not be transferred through the AND gate A/U–3.1 due to this positive input signal on the input lead labelled read delay FF· bus 6:2L2. Instead, the positive-going edge of this first bit signal will set the read delay flip flop M/U–4.5 (FIG. 28), thereby causing a negative signal level to appear on the output lead thereof labelled read delay FF· 4:2R2 and enable AND gate A/U–3.1. Accordingly, a positive voltage level appears on the output terminal of this gate at the advance up counter and reset borrow flip flop bus 6:2R1, the data from storage bus 6:2L3 continuing to transfer positive pulses along the bus 6:2R1. The transfer of pulses along the advance up counter and reset borrow flip flop bus 6:2R1 causes the digits in track 4 to be counted into the up counter along the bus 4:1L12 and to reset the borrow flip flop (if the borrow flip flop is set) along the bus 5:1L7.

UP TO DOWN AND RESET UP

The up to down and reset up counter transfer signal is developed as follows:

The positive voltage level on the shift left entry bus 1:1R5 will also appear on the bus 3:3L12, this bus being the input to OR gate C/U–5.2 (FIG. 25).

GATE C/U–5.2

The positive voltage level at an input terminal of OR gate C/U–5.2 enables this OR gate and provides a negative voltage level output therefrom at the input to AND gate C/U–5.5. When the W3 signal on bus 3:3L4 is at a negative voltage level, AND gate C/U–5.5 is enabled and provides a negative output level thereat, this negative level being applied to one of the input terminals of the OR gate C/U–5.7.

GATE C/U–5.7

The negative voltage level on one of the input terminals of OR gate C/U–5.7 enables this gate and provides a positive voltage level output therefrom. This positive voltage level is inverted by the inverter C/U–5.8 and provides a negative voltage level on the up to down and reset up bus 3:3R1. This negative level is applied to the up to down and reset up bus 5:1L8, this bus being the input of a one shot A/U–6.2 (FIG. 31). The signal on this bus at this time does not constitute a significant level, however, and it is not until the end of the W3 time period that a significant signal is developed, namely, the positive-going transition from the negative voltage level to the positive voltage level as shown in the arrow in FIG. 135.

At the end of W3 time, the AND gate C/U-5.5 (FIG. 25) is disenabled and provides a positive voltage level output thereat, this positive voltage level disenabling OR gate C/U-5.7 and providing a negative-going voltage level at the output thereof. This change from a positive voltage level to a negative voltage level at the output of OR gate C/U-5.7 therefore provides a positive-going transition at the output of inverter C/U-5.8 and to the one shot A/U-6.2 (FIG. 31). The output of the one shot is transferred to the up to down and reset up network A/U-6.1 and produces a positive output signal on the up to down and reset up bus (5:1R6).

The positive up to down and reset up signal on bus 5:1R6 is transferred to the up to down and reset up bus 6:1L11 and thereby to an input of the down counter A/U-2.1 (FIG. 35). This input signal to the down counter causes a transfer of information in the up counter to the down counter.

At the trailing edge of W3 time, as discussed above, the positive-going transition on the up to down and reset up bus 5:1R6 is applied to the up counter A/U-1.1 (FIG. 27) along the bus 4:1L11, thereby resetting the up counter.

Also, at the end of W3 time the up to down and reset up network (A/U-6.1, FIG. 31) will produce a positive going transition signal at the read delay reset output (5:1R5). This positive going transition signal is applied to the read delay FF· output (4:2R2) of the read delay flip flop (M/U-4.5, FIG. 28) thus forcing the read delay flip flop to a reset condition. Also, this positive going transition signal (5:1R5) is applied to a set input of the write delay flip flop (M/U-4.4, FIG. 28) and thereby setting the write delay flip flop.

WRITE

The positive signal level appearing at the output of AND gate E/U-2.3 (FIG. 14), as mentioned supra in the discussion of the common digit flip flops will appear on the shift left entry register bus 1:1R5 and also at the shift left entry register bus 3:2L15 of the OR gate C/U-4.2 (FIG. 24).

GATE C/U-4.2

As a result of this positive input signal level to OR gate C/U-4.2 a negative output signal level is produced therefrom and appears on one input of the AND gate C/U-4.6. When a concurrent W3 signal appears on the W3 bus 3:2L17, the AND gate C/U-4.6 will be enabled and a negative voltage level signal will appear on the output thereof and simultaneously at one input terminal of the OR gate C/U-4.7.

GATE C/U-4.7

The negative voltage level signal at an input terminal of the OR gate C/U-4.7 will enable this gate and provide a positive voltage level signal at the output thereof on the write bus 3:2R1. This positive voltage level on the write bus 3:2R1 is transferred to the write bus 4:3L5, an input terminal of the OR gate M/U-3.4.

GATE M/U-3.4

The appearance of a positive voltage level on one of the input terminals of OR gate M/U-3.4 provides a negative voltage level at the output thereof, this negative level being applied to one of the input terminals of the AND gate M/U-3.5.

GATE M/U-3.5

The input terminal 4:3L7 of AND gate M/U-3.5 is connected to the down counter zero bus 6:1B2. The down counter zero bus is coupled to each of the elements of the down counter A/U-2.1 and provides a positive voltage level thereon when the down counter contains a zero count, this bus having a negative voltage level thereon at all other times. It can be seen that, when the down counter does contain a count, a negative voltage level will be provided on the down counter zero bus and, thereby, a negative voltage level is applied to the bus 4:3L7 of AND gate M/U-3.5. The concurrence of these negative voltage levels at the input of AND gate M/U-3.5 will, concurrently with bit pulses obtained from the track 3 read head M/U-3.6, provide a positive-going voltage level at the output thereof. It therefore follows that, for each bit read from track 3 at this time, the AND gate M/U-3.5 will be enabled and thereby provide a positive-going voltage transition at the output thereof.

These bits, read from track 3, will continue to be read through the AND gate M/U-3.5 until the down counter A/U-2.1 has been counted down to zero (to be described hereinafter), the down counter zero bus at this time shifting from a negative voltage level to a positive voltage level and, thereby, disenabling the AND gate M/U-3.5.

WRITE FLIP FLOP M/U-3.9

These positive-going voltage transitions are applied to the complement or toggle input of the write flip flop M/U-3.9, causing this flip flop to change state with each positive-going input voltage transition thereto. As a result, the FF· and FF. output leads of the write flip flop will also change in polarity in response to each of these input signals, the output signals from the write flip flop appearing on buses 4:3R3 and 4:3R4 being applied, respectively, to buses 5:3L4 and 5:3L6. These latter buses provide the input for one terminal of each of AND gates M/U-3.13 and M/U-3.14.

Concurrently with these voltage levels at the output terminals of the write flip flop, the write bus 4:3L5 will provide a positive voltage level to the inverter M/U-3.3 to provide a negative voltage level on the write bus 4:3R2. This negative voltage level is applied to bus 5:3L5, this bus being the second input of each of the AND gates M/U-3.13 and M/U-3.14. The concurrence of these input signals to these AND gates (the WRITE and WRITE FF signals) will alternately enable and disenable these gates, thereby causing an alternating input of signals to the write track 4 head No. 1 (M/U-3.18) (FIG. 33), thereby causing the number stored in the down counter to be written onto track 4. It should be noted at this point that the number of bits to be stored on track 4 will include an "excess" bit, i.e., one bit more than the value of the count read out of the down counter. The manner in which the excess bit is obtained will be described hereinafter.

EXCESS BIT

When the Common Digit flip flop No. 1 provides a positive-going transition at the FF· output terminal thereof, the read delay flip flop M/U-4.5 (FIG. 28) is set by the Common Digit flip flop No. 1 output signal (positive-going transition). This signal is applied along the Common Digit No. 1 bus 1:1B1 to the Common Digit bus 4:2L8 and thereby sets the read delay flip flop M/U-4.5.

Concurrently, with the complementing of the write flip flop M/U-3.9, these same positive voltage level signals from AND gate M/U-3.5 (FIG. 29) are transferred to the input of the shape and invert circuit M/U-3.10, causing a negative output level to be developed on the reset write delay FF bus 4:3R5. The trailing edge of this pulse will be positive-going when the AND gate M/U-3.5 is disenabled and will reset the write delay flip flop M/U-4.4, causing a negative signal level to appear at the FF. output 4:2R1 labelled "Write Delay FF." of this flip flop. This negative voltage level is transferred to the write delay flip flop FF. bus 6:2L6, this bus being one input of the AND gate A/U-3.3. The second bit from the track 3 read head, which passes via AND gate M/U-3.5 and shape and invert circuit M/U-3.10, appearing at the advance down counter AND gate A/U-3.3 (FIG. 36) together with the negative signal level on the write delay FF. bus 6:2L6 will cause a positive voltage level to appear at the output of this AND gate, thereby debiting the down counter by one count by a positive transition on bus 6:2R2. The down counter will be similarly debited for all following bits from the track 3 read head which are applied along the advance down counter bus 6:2R2 to the advance down counter bus 6:1L9. In this manner, there is a one bit delay provided prior to commencement of counting down or advancing the down counter, thereby providing the "excess" bit on track 4.

FIRST FACTOR

The first factor operation is performed to transfer a number stored in the entry register into the accumulator register. The timing diagram for this operation is shown in FIG. 136 of U.S. Pat. No. 3,523,282. This operation is initiated by depressing the FFA key of the function signal generator E/U-4.1. When the FFA key is released, a positive output signal appears on the FFA bus 1:3R9. This positive signal is transferred to the input lead of OR gate K/U-3.5 via FFA bus 1:3T7 and bus 1:2B7.

GATE E/U-3.5

This positive input signal to OR gate E/U-3.5 causes a negative signal level to appear at the output thereof, this negative signal level being impressed at the FF· output lead of the function timing flip flop E/U-3.1 (FIG. 15). This signal enables the function timing flip flop by unblocking same and allowing this flip flop to be set by the next positive-going signal pulse on the H bus 1:2L1 which pulse complements the function timing flip flop. Upon setting of this flip flop, a positive signal level appears at the FF. output thereof, this positive voltage level being transferred to one of the input terminals of the OR gate E/U-3.5, thereby causing this OR gate to remain enabled after the release of the FFA key. Concurrently, the positive output signal level at the FF. output lead of the function timing flip flop E/U-3.1 appears at the input of the inverter E/U-3.4 and provides a negative voltage level at the output thereof on the bus 1:2B12.

This negative signal level is impressed on the bus 1:3T12 and enables the FFA output lead 1:3R9 (or the output lead 1:3R1 through 1:3R14 and 1:3R17 through 1:3R20 corresponding to the depressed function key) of the function signal generator E/U-4.1, causing a positive signal level to be developed on this output lead. This positive signal level is transferred to the FFA bus 3:1L15, this bus being an input terminal of the OR gate C/U-3.2 (FIG. 23).

At this point the first factor read operation continues in the same manner set forth supra in the sections with gates marked: C/U-3.2, C/U-3.7, M/U-2.3, M/U-2.5 and A/U-3.1.

UP TO DOWN AND RESET UP

The FFA bus 1:3R9 also applies a positive voltage level to the bus 3:3L18, thereby enabling the OR gate C/U-5.3 and providing a negative output level thereat.

GATE C/U-5.3

This negative level at the input to OR gate C/U-5.3 is supplied to an input of AND gate C/U-5.6 and, in conjunction with a negative level on the W4 bus 3:3L14, will provide a negative voltage level at the output of this AND gate and upon an input terminal of OR gate C/U-5.7.

This output from AND gate C/U-5.6 will enable gate C/U-5.7 to provide at W4 time, the necessary up to down and reset up signal on bus 3:3R1, explained supra in the discussion of gates C/U-5.7. As shown on the first factor timing diagram, FIG. 136 of U.S. Pat. No. 3,523,282, the up to down and reset up function takes place at the trailing edge of W4 time.

WRITE

The positive voltage level on FFA bus 1:3R9 provides a positive level on the FFA bus 3:2L1, an input terminal of OR gate C/U-4.1.

GATE C/U-4.1

This positive level on an input terminal of OR gate C/U-4.1 (FIG. 24) enables this gate and provides a negative level at the output thereof. This negative level is applied to one input of the input terminals of AND gate C/U-4.4 and, in conjunction with a negative level W2 signal on W2 bus 3:2T1, AND gate C/U-4.4 will be enabled and provide a negative voltage level at the output thereof.

The negative voltage level at the output of AND gate C/U-4.4 will enable the OR gate C/U-4.7 at W2 time in the manner set forth supra to provide a positive voltage level write signal on the write bus 3:2R1 and write the contents of the down counter into the accumulator register as described supra.

At the end of the revolution of the drum, an H signal is provided on the H bus 1:2L1, this H signal resetting the function timing flip flop E/U-3.1 (FIG. 15). The positive-going signal then developed on the FF· output of the function timing flip flop E/U-3.1 will set the C.F. Stg. flip flop E/U-3.2. The negative signal appearing on the FF. output of the function timing flip flop will then be transferred to the input of the OR gate E/U-3.5 and to the input of an inverter E/U-3.4. A positive signal will be developed at the output of the inverter E/U-3.4 and will be transferred to the "Reset" input of FUNC. SIGNAL GEN. E/U-4.1, resetting the FFA flip flop and developing a negative signal level on the output bus of the FUNC. SIGNAL GEN. numbered 1:3T7 (FFA). This negative signal level is then applied to the input of the OR gate E/U-3.5, and, because one other enabling input (from the FUNC. TMG. FF. output) is now also at a negative level, the OR gate E/U-3.5 is then disenabled, producing a positive voltage level signal at the output thereof. This positive voltage level signal is then applied to the FF· output of the FUNC. TMG. flip flop E/U-3.1, locking the FUNC. TMG. flip flop in the reset state. Further H pulses applied at the complement input of the FUNC. TMG. flip flop E/U-3.1 will then have no effect.

This completes the first factor operation.

It should be noted that, for all functions of addition, subtraction, multiplication and division, it is required that one number be placed in the entry register and the other number be placed in the accumulator register. This order would be (1) either addend or augend in the accumulator register and the other factor in the entry register for addition, (2) the subtrahend in the accumulator register and and the subtracter in the entry register for subtraction, (3) the multiplicand or the multiplier in the accumulator register and the remaining factor in the entry register for multiplication and (4) the dividend in the accumulator register and the divisor in the entry register for division.

CLEAR ENTRY

Whenever a digit key is depressed and released after the depression and release of a function key, a clear entry cycle is initiated as follows: as a result of the depression and release of any function key the C.F. STG. flip flop will be set. The FF· lead thereof therefore being at a negative signal level, upon depression and release of a digit key a typical digit entry cycle is initiated wherein the common digit No. 1 flip flop is set, producing a negative signal level at the FF· output thereof.

GATE E/U-3.3

This negative signal level is then applied to an input terminal of the AND gate E/U-3.3 together with the negative signal level applied to the other input of this AND gate as developed at the FF· output of the C. F. STG. flip flop. AND gate E/U-3.3 will thereby be enabled, producing a positive signal level at the output thereof on the CLEAR ENTRY bus 1:2R1.

This positive voltage level will therefore be transferred along the clear entry bus 1:2R1 to the clear entry terminal 3:2L16 of the OR gate C/U-4.2. As explained supra, a positive input to OR gate C/U-4.2 will provide a positive voltage level on the write bus 3:2R1 during the W3 time period. As explained supra, a negative voltage level will be provided on the write bus 5:3L5 to prime the AND gates M/U-3.13 and M/U–3.14. However, since the write flip flop is not being complemented, only one of the AND gates M/U–3.13 or M/U–3.14 is enabled, thereby providing a constant signal to write track 4 head No. 1, this constant signal erasing any information written in the entry register of storage track 4.

ADD

Referring to the add timing diagram in FIG. 137 of U.S. Pat. No. 3,523,282, the add function is performed by depressing and releasing the add key of the function signal generator E/U–4.1, thereby providing a positive voltage level on the add bus 1:3T4 and 1:2B4, one of the input terminals of the OR gate E/U–3.5 to enable this gate.

The output of OR gate E/U–3.5 performs the same function set forth supra, thereby providing a positive voltage level on the add bus 1:3R12.

A positive voltage level will be produced at the output terminal of AND gate E/U–3.3 and will provide a clear entry operation in the same manner as set forth hereinabove.

GATE C/U–1.9

A positive voltage level is also developed on the add bus 1:3R12. This positive voltage level signal is applied to the input terminal 1:4L2 and inverted by the inverter C/U–1.2, this being one input terminal of the AND gate C/U–1.9. At this time, the accumulator sign flip flop C/U–1.5 is in its set condition (as shown hereinafter), thereby applying a negative voltage level to the other input of AND gate C/U–1.9 and providing a positive voltage level at the output thereof at bus 1:4R2. The output of AND gate C/U–1.9 is also inverted by the inverter C/U–1.13 to provide a negative voltage level on the add bus 1:4R1, the positive voltage level being transferred to the add bus 3:1L4.

GATE C/U–3.1

The positive voltage level signal on the input terminal 3:1L4 of the OR gate C/U–3.1 (FIG. 23) provides a negative output level therefrom. At the W3 time period, when a negative voltage level appears on the W3 bus 3:1T1, the AND gate C/U–3.4 will provide a negative output level to enable the OR gate C/U–3.7, as described supra. A read signal will then be provided on the READ bus 3:1R1 and carry out a read function at W3 time.

READ DELAY FF

During the write function, the read delay flip flop M/U–4.5 (FIG. 28) is reset as follows: At the end of the W3 time period, a positive voltage transition signal will be developed on the W3 bus 5:2L1, this bus being the upper input of the AND gate M/U–4.1 (FIG. 32). A negative voltage transition signal will thereby be produced at the output bus 5:2R3 of AND gate M/U–4.1. This negative voltage transition signal is applied to the inverter M/U–4.8 via the W3 & ADD bus 4:2L9 and diode M/U–4.6, producing a positive voltage transition signal at the output thereof. This positive voltage transition is applied to the reset input of the READ DELAY flip flop M/U–4.5, resetting this flip flop.

READ

The positive voltage level on add bus 1:4R2 is also applied to bus 3:1L14, an input terminal of OR gate C/U–3.2. At W4 time, as stated supra, a negative level read signal will be provided on the bus 3:1R1 in the same manner set forth supra. During this time the contents of the entry register will be transferred to the up counter as previously described and added to the number already therein. This provides the required addition for one significant digit level.

As the up counter counts from 8 to 9 in the process of adding the two digits together, a "jam back" signal will be developed by the negative signal level appearing on the FF· lead of the No. 8 flip flop (not shown in the logic drawings) of the up counter and a positive-going signal on the FF. lead of the No. 1 flip flop (not shown in the logic drawings) of the up counter as this latter flip flop is set. This "jam back" signal will set the No. 4 and No. 2 flip flops (not shown in the logic drawings), thus causing the up counter to count to "15" to represent the digit "9." At the arrival of the 10th count at the input of the up counter, all of the flip flops will be reset, the resetting of the No. 8 flip flop of the up counter causing the carry flip flop A/U–4.1 (FIG. 31) to be set.

CARRY

The setting of the carry flip flop A/U–4.1 (FIG. 31) is provided as follows: The add bus 5:1L2 will be at a positive voltage level at this time. Therefore, when the No. 8 flip flop of the up counter is reset, a positive-going voltage transition will appear on the 8· broad line 4:1R1 thereof and at the 8· broad line 5:1L3. The concurrence of these two conditions enables the AND gate A/U–4.2 and provides a positive-going transition at the output thereof to set the carry flip flop A/U–4.1.

The setting of the carry flip flop A/U–4.1 (FIG. 31) will develop a negative voltage level at the FF· output thereof and a positive voltage level at the FF. output thereof. The negative voltage level at the FF· output is applied to an input of the AND gate A/U–4.3 (FIG. 31) and the positive voltage level produced at the FF. output is applied to an input of the AND gate A/U–4.4 (FIG. 31). Upon the operation of the up to down and reset up counter network A/U–6.1 (FIG. 31), a positive-going transition signal is developed at the output thereof designated up to down and reset up (5:1R6). This positive-going transition signal is applied to the inputs connected directly to the 5:1L1 terminal of the AND gates A/U–4.4 (FIG. 31), thereby enabling the AND gate A/U–4.4 (FIG. 31) and FF1 a positive-going transition signal at the output designated set FF1 (5:1R2). The AND gate A/U–4.3 (FIG. 31) will be disenabled, producing a negative voltage level at the output designated reset FF1.

The positive-going transition signal developed on the output designated set FF1 (5:1R2) of the AND gate A/U–4.4 (FIG. 31) is applied to the set FF1 input (4:1L9) of the up counter A/U–1.1 (FIG. 27), thereby setting the No. 1 flip flop in the up counter. The negative voltage level developed on the reset FF1 output (5:1R1) of the AND gate A/U–4.3 (FIG. 31) will have no effect on the carry operation at this time.

During those periods of operation when the carry flip flop A/U–4.1 (FIG. 31) is reset, a positive voltage level is produced on the FF· output thereof and a negative voltage level is produced on the FF. output thereof. The positive voltage level produced on the FF· output is applied to an input of the previously mentioned AND gate A/U–4.3 (FIG. 31) and the negative voltage level produced on the FF. output is applied to an input of the previously mentioned AND gate A/U–4.1 (FIG. 31). Upon the operation of the up to down and reset up counter network A/U–6.1 (FIG. 31), a positive-going transition signal is produced on the (5:1R6) output thereof. This positive-going transition signal is applied to the input of the AND gates A/U–4.3 and A/U–4.4 (FIG. 31). The AND gate A/U–4.3 (FIG. 31) will thus be enabled, producing a positive-going transition signal at the reset FF1 (5:1R1) output, and the AND gate A/U–4.4 (FIG. 31) will be disenabled, producing a negative voltage level at the set FF1 (5:1R2) output. This negative voltage level will have no effect in the carry operation at this time. The positive-going transition signal developed on the reset FF1 (5:1R1) output of the AND gate A/U–4.3 (FIG. 31) is applied to the reset FF1 (4:1L9) input, an input of the up counter A/U–1.1 (FIG. 27), thereby resetting the No. 1 flip flop in the up counter when an up to down and reset up counter signal is developed.

UP TO DOWN AND RESET UP

The positive voltage level on the add bus 1:4R2 is also impressed upon the add bus 3:3L17, this bus being an input terminal of the OR gate C/U–5.3 (FIG. 25). This positive voltage level existing at the input of this gate will provide a negative level output therefrom, this negative level output, in conjunction with a negative level on the W4 bus 3:3L14 will provide a negative voltage level at the output of AND gate C/U-5.6, which appears at 3:3R1. The subsequent positive going transition at 3:3R1, which occurs at the end of W4 time, performs the up to down and reset up functions described supra, shifting the sum from the up counter to the down counter.

WRITE

The positive voltage level on the add bus 1:4R2 is also impressed upon the add bus 3:2L7, this bus being an input terminal of OR gate C/U-4.1 (FIG. 24). As described supra, at W2 time, a significant write signal will be provided on the write bus 3:2R1 to provide a W2 write operation.

The above completes the required steps of a typical add operation.

SUBTRACT

With reference to the subtract timing diagram (FIG. 138 of U.S. Pat. No. 3,523,282), the subtract operation is initiated by depression and release of the subtract key of the function signal generator E/U-4.1, thereby providing significant voltage levels on the clear entry bus 1:2R1, as described supra, and the subtract bus 1:3R13 in the same manner described supra.

The positive voltage level on bus 1:3R13 is applied to the subtract bus 1:4L1. This positive voltage level is inverted by the inverter C/U-1.1, the negative voltage level thereat being applied to the input terminals of AND gates C/U-1.10 and C/U-1.12. The accumulator sign flip flop C/U-1.5 is set at this time, thereby providing a negative voltage level on the input terminal thereto of the AND gate C/U-1.12 and providing a positive voltage level output therefrom on subtract bus 1:4R3. This positive voltage output is also inverted by the inverter C/U-1.14 to provide a negative voltage level on the subtract bus 1:4R6.

The positive voltage level on the subtract bus 1:4R3 is transferred to the subtract bus 3:1L5, this bus being an input terminal of the OR gate C/U-3.1 (FIG. 23) and providing a negative voltage level at the output thereof. As explained supra, during W3 time, a significant read signal is provided on the read bus 3:1R1 to provide the read function.

The positive voltage level on the subtract bus 1:4R3 is also impressed on the subtract bus 3:3L10, this bus being an input terminal of the OR gate C/U-5.2 (FIG. 25). As discussed supra, at the trailing edge of W3 time, the output of this OR gate will provide a significant up to down and reset up signal on the bus 3:3R1 to provide the proper functions connected therewith as discussed supra.

During W4 time, a negative voltage level signal appears on subtract bus 1:4R6 and bus 6:3L2.

GATE A/U-3.4

The concurrence of the negative level W4 signal and the subtract signal at the input terminals of the AND gate A/U-3.4 (FIG. 37) provides a positive level at the output thereof on the enable borrow flip flop gate bus 6:3R1. This positive output level is also inverted by the inverter A/U-3.6 to provide a negative level on the bus 6:3R2.

GATE A/U-3.2

The negative voltage level signal on bus 6:3R2 is transferred to bus 6:2L4, this bus being one input terminal of AND gate A/U-3.2. Concurrently, a negative signal level is applied to this AND gate on the read delay flip flop bus 6:2L2 and, thereby, the second pulse and all pulses thereafter read out of the read from track 4 head M/U-2.1 along the data from storage bus 6:2L3 will pass through AND gate A/U-3.2 and provide a positive voltage level at the output thereof. This output is the advance down counter bus 6:2R2. The output on this advance down counter bus will be a group of positive voltage level pulses corresponding to the number of pulses read from track 4 less one pulse.

The down counter is then counted down.

The positive voltage level on the subtract bus 1:4R3 is applied to the subtract bus 3:1L16, this bus being an input terminal of the OR gate C/U-3.2. When a negative level appears on the W4 bus at W4 time, a significant read signal will be applied to the the bus 3:1R1 as explained supra, thereby providing an entire read operation, as discussed supra.

BORROW

The positive voltage level on the bus 6:3R1 is applied along the bus 5:1L5 to the AND gate A/U-5.2. At the moment the down counter is counted down past zero, the number 8 flip flop (not shown in the logic diagrams) of the down counter is then set and a positive-going pulse will be applied by the set borrow flip flop bus 6:1B1 to the bus 5:1L6, thereby providing a positive-going transition at the output of AND gate A/U-5.2 and setting the borrow flip flop A/U-5.1.

At the end of the W4 time period, the read delay flip flop M/U-4.5 (FIG. 28) will be reset as a result of a positive-going transition appearing on the bus designated 4:2L10. This positive-going transition is delayed in the one shot circuit comprising capacitor M/U-4.7, resistor M/U-4.9 and inverter M/U-4.8 and is then applied to the reset input of the READ DELAY flip flop M/U-4.5, resetting this flip flop.

The subtract bus 1:4R3 has a positive voltage level thereon, this positive voltage level being applied to the subtract bus 3:2L3 and enabling the OR gate C/U-4.1. During W2 time, as explained supra, a positive voltage level is applied to the write bus 3:2R1, thereby providing the necessary operations to write the contents of the down counter into the accumulator register.

SUBTRACT-COMPLEMENT

During a subtract operation which involves the subtracting of an integer from a smaller integer, a complement operation will result as follows:

Assuming that the smaller integer has been intered into the accumulator register and the larger integer has been entered into the entry register, depression and release of the subtract key will initiate a subtract function as previously described. However, a deviation will develop from the typical subtract operation when a borrow is required. This deviation will occur during the first W4 time period after an H2 time period (refer to FIGS. 139 and 140 of U.S. Pat. No. 3,523,282). The positive voltage level, as normally developed on the subtract bus 1:4R3, is applied to the input of an inverter C/U-1.14 (FIG. 17) causing the inverter to produce a negative voltage level at the output thereof designated subtract (1:4R6). This negative voltage level is then applied to the input designated subtract (6:3L2) of an AND gate A/U-3.4 (FIG. 37) and, concurrently with the application of a negative voltage level (during W4 time period) at the other input thereof labelled W4 (6:3L1), this AND gate A/U-3.4 (FIG. 37) will be enabled, thereby developing a positive voltage level at the output thereof labelled W4 & SUB or W3 & COMP (6:3R1). This positive voltage level is applied to the "enabling" input labelled W4 & SUB or W3 & COMP (5:1L5) of a dynamic AND gate A/U-5.2 (FIG. 31).

Also, during the first W4 time period, the contents of the entry register are subtracted from the contents of the accumulator register. In this instance, as the larger number is subtracted from the smaller number in the down-counter, the down-counter will pass through "zero," producing a positive transition signal at the set borrow FF (6:1B1) output of the down-counter A/U-2.1 (FIG. 35). This positive transition signal is then applied to the "dynamic" input designated set borrow FF (5:1L6) of the borrow flip flop AND gate A/U-5.2 (FIG. 31) and, concurrently with the positive voltage level previously applied at the input labelled W4 & SUB or W3 &

COMP (5:1L5), the borrow flip flop AND gate will be enabled, producing a positive transition signal at the output thereof. This positive transition signal is applied to the "set" input of borrow flip flop A/U-5.1 (FIG. 31), setting the borrow flip flop and producing a negative voltage level at the FF· output thereof designated borrow FF· (5:1R3) and producing a positive voltage level at the FF. output thereof designated borrow FF. (5:1R4). (The tens complement of the difference between the larger number and the smaller number will be left in the down-counter.)

During the second W2 time period, a write signal is developed since a positive voltage level has been applied to subtract (3:2L3) input of the OR gate C;U-4.1 (FIG. 24), enabling this gate and producing a negative voltage level at the output thereof. This negative voltage level is then applied to one of two inputs of an AND gate C/U-4.4 (FIG. 24) and, concurrently with the negative signal level developed during the W2 time period at the remaining input thereof labelled W2 (5:4R3), this AND gate will be enabled and develop a write signal on the write bus (3:2R1) as previously described. The tens complement of the difference of the two numbers in the down-counter is then written into the accumulator register during the W2 time period.

The negative voltage level produced at the FF. output (1:4R5) of the comp flip flop C/U-1.6 (FIG. 17) will be applied to one input (2:5L14) of an AND gate C/U-2.17 (FIG. 22) and, concurrently, at the beginning of the W3 time period, a negative voltage level is produced at the other input (2:5L13), thereby enabling this AND gate C/U-2,17 (FIG. 22) and producing a positive transition signal at the sense borrow output thereof (2:5R5). This positive transition signal is applied to the sense borrow input (4:1T2) of a one shot circuit A/U-1.2 (FIG. 27), producing a positive transition signal at the output thereof.

This positive transition signal from one shot A/U-1.2 is applied to an input of the AND gate A/U-1.3 (FIG. 27). The positive voltage level developed at the borrow FF. output (5:1R4) of the borrow flip flop A/U-5.1 (FIG. 31) is applied to the other input of AND gate A/U-1.3. AND gate A/U-1.3 is thereby enabled, producing a positive going transition signal at the output thereof. This positive going transition signal is then applied to an input of the up-counter, setting the up-counter to represent a count of "9" as indicated by all flip flops thereof being set, i.e., the binary count of "15."

During the second W3 time period, if there is a digit in the tens position (i.e., a second order digit) of the accumulator register, the borrow flip flop will be reset as follows: the digit in the tens position of the accumulator register will be read into the up counter during the second W3 time period due to the application of a positive voltage level at the subtract input (3:1L5) of an OR gate C/U-3.1 (FIG. 23) and the subsequent development of a typical read command signal. When the first information bit pulse appears (from TK 4) on the advance up counter and reset borrow FF bus (6:2R1), this bit pulse will be applied to the reset borrow FF input (5:1L7) of the borrow flip flop A/U-5.1 (FIG. 31), resetting the borrow flip flop. The ensuing transfer of the second order digit from TK 4 into the up counter leaves a digit one bit smaller in the up counter due to the "9" previously stored in the up counter. The first bit of the second order digit will merely count the up counter up to zero.

The positive voltage level on the subtract bus is applied to the subtract input (3:3L10) of an OR gate C/U-5.2 (FIG. 25), enabling this gate and producing a negative voltage level at the output thereof. This negative voltage level is then applied to one of two inputs of an AND gate C/U-5.5 (FIG. 25) and, concurrently with the application of a positive transition signal at the end of a second W3 time period at the input designated W3 (3:L4), this AND gate C/U-5.5 (FIG. 25) is disenabled and subsequently develops a positive-going transition signal on the up to down and reset up bus (3:3R1).

Thus, the "9" in the up counter is then transferred to the down counter during the second W3 time period as previously described. During the third W2 time period, a write signal is developed as previously described and the "9" in the down counter is written into the accumulator register. The borrow flip flop will remain set throughout the remainder of the H period if there are no further digits in the higher order positions of the accumulator register to initiate a resetting of the borrow flip flop.

At the beginning of successive W3 time periods, a sense borrow signal will be produced as previously described, whereby the up counter will be set to register the count of "9," this "9" being transferred to the down counter and subsequently being written into the accumulator register.

As a result, a series of "9s" will be written into the accumulator register to the left of the least significant digits. In this case the least significant digit is the tens complement of the difference of the original integers. The negative voltage level developed at the borrow FF· output (5:1R3) of the borrow flip flop A/U-5.1 (FIG. 31) is applied to one input (1:4L3) of an AND gate C/U-1.4 (FIG. 17). Also, as a result of the initiation of the subtract operation, a positive voltage level will be developed on the subtract input (1:4L1) of the AND gate C/U-1.3 (FIG. 17). A negative voltage level is produced at the output of this AND gate and will be transferred to the remaining input of the AND gate C/U-1.4 (FIG. 17), thereby enabling this AND Gate and producing a negative voltage level at the output thereof. This negative signal level is applied to the upper gate input of the comp flip flop C/U-1.6 (FIG. 17).

Also, this same negative voltage level is applied to the input of an inverter C/U-1.7 (FIG. 17) producing a positive voltage level at the output thereof. This positive voltage level is transferred to the lower gate input of the comp flip flop C/U-1.6 (FIG. 17).

SECOND CYCLE

At the end of the first H time period, a positive voltage transition signal is developed on the H bus and is applied to the transfer input (1:4L5) of the comp. flip flop, C/U-1.6 (FIG. 17). This positive voltage transition signal transfers the negative voltage level at the upper gate input of the comp. flip and the positive voltage level at the lower gate input of the comp. flip flop to the FF· and FF. outputs thereof, respectively, thus setting the comp. flip flop. At the following H2 time, a positive transition signal is applied to the input labelled H (5:1L4) of the borrow flip flop, resetting the borrow flip flop. The complementing operation then proceeds as follows: The positive voltage level applied at the comp. input (3:1L6) of the read OR gate C/U-3.1 (FIG. 23) enables this gate and develops a negative voltage level at the output thereof. Additionally, at the beginning of the first W3 time period, a negative voltage signal level is applied to the input labelled W3 (3:1T1) of an AND gate C/U-3.4 (FIG. 23) and, together with a negative voltage level from the output of the read OR gate C/U-3.1 (FIG. 23), the AND gate C/U-3.4 (FIG. 23) is disenabled and develops a typical read command signal (negative voltage level) on the read bus (3:1R1). The negative voltage level read command signal is applied to the read input (5:2L3) of an AND gate M/U-2.3 (FIG. 32) and, together with the negative information bits from the read from Tk 4 circuit (M/U-2.1) and the negative signal level developed during the RS time period on the RS input (5:2L4), this AND gate M/U-2.3 is enabled and positive pulses are thereby developed at the output thereof. These positive pulses are applied to the input of the shape and invert circuit (M/U-2.5), causing negative pulses to appear at the output of the circuit, designated data from storage (5:2R4). The first pulse of these negative pulses is applied to the data from storage input (4:2L7) of the read delay flip flop, setting the read delay flip flop (by the positive-going trailing edge of this bit pulse) and producing a negative voltage signal level at the read delay FF· output (4:2R2). This negative voltage signal level is applied to the read delay FF· input (6:2L2) of an AND gate A/U-3.2 (FIG. 36).

The negative voltage level produced at the output designated comp· (1:4R4) of the comp flip flop C/U–1.6. (FIG. 17) is applied to the comp· input (6:3L4) of an AND gate A/U–3.5 (FIG. 37) and, together with the negative voltage level applied to the W3 input (6:3L3) during the first W3 time period, this AND gate A/U–3.5 (FIG. 37) is enabled, producing a positive voltage level at the output thereof. This positive voltage level is applied to the input of an inverter A/U–3.6 (FIG. 37), causing a negative voltage level to be produced at the W4 and subtract or W3 and comp output (6:3R2). This negative voltage level is applied to the W4 and subtract or W3 and comp input (6:2L4) of the previously mentioned AND gate A/U–3.2 (FIG. 36). The negative bit pulses developed at the data from stg output (5:2R4) of the shape and invert circuit M/U–2.5 (FIG. 32) is applied to the data from stg input (6:2L3) of the previously mentioned AND gate A/U–3.2 (FIG. 36) enabling this AND gate and producing positive pulses at the advance down counter output (6:2R2).

The AND gate A/U–3.1 (FIG. 36) is disenabled at this time because the positive voltage level on the enable borrow FF gate output (6:3R1) of the AND gate A/U–3.5 (FIG. 37) is applied to the input labelled W4 & SUB or W3 & COMP (6:2L1) of the AND gate A/U–3.1 (FIG. 36), and thus, disenables this gate and prevents pulses from advancing the up counter.

The positive pulses developed on the advance down counter bus (6:2R2) are applied to the advance down counter input (6:1L9) of the down counter A/U–2.1 (FIG. 35), counting the down counter down from zero. That is, the digit being entered at this time into the down counter is the tens complement of the difference of the two original numbers and, as the down counter is counted down from zero, a new tens complement of the first tens complement will be left in the down counter.

The comp flip flop C/U–1.6 (FIG. 17) is set and the FF· comp· output (1:4R4) is, therefore, at a negative voltage level. This negative voltage level is applied to one input comp· (6:3L4) of an AND gate A/U–3.5 (FIG. 37) and, together with the negative voltage signal level applied during the first W3 time period after the second H2 time period to the other input thereof labelled W3 (6:3L3), the AND gate A/U–3.5 (FIG. 37) is enabled and a positive voltage level is developed at the enable borrow FF gate output (6:3R1).

This positive voltage level is then applied to one of two inputs designated enable borrow FF gate (5:1L5) of an AND gate A/U–5.2 (FIG. 31).

The down counter, in being counted down, as previously described, will immediately pass through zero and develop a positive going transition signal at the output thereof designated set borrow FF (6:1B1) of the down counter A/U–2.1 (FIG. 35). This positive going transition signal is then applied to the input designated set borrow FF (5:1L6) of the borrow flip flop AND gate A/U–5.2 (FIG. 31), thereby enabling the borrow flip flop AND gate and producing a positive going transition signal at the output thereof. This positive-going transition signal sets the borrow flip flop A/U–5.1 (FIG. 31).

The read delay flip flop is reset at the end of the first W3 time period as follows: A negative voltage level is applied to an input designated comp· (6:3L4) of an AND gate A/U–3.5 (FIG. 37) and, together with the positive-going transition signal at the input labelled W3 (6:3L3), this AND gate A/U–3.5 (FIG. 37) is disenabled, producing a negative-going transition signal at the output thereof. This negative-going transition signal is applied to the input of an inverter A/U–3.6 (FIG. 37), causing a positive-going transition signal to be developed at the output thereof designated W4 and subtract or W3 and comp.

This positive transition signal is delayed in the "one-shot" circuit comprised of capacitor M/U–4.7, resistor M/U–4.9 and inverter M/U–4.8 and is then applied to the reset input of the READ DELAY flip flop M/U–4.5, resetting this flip flop.

The positive-going transition signal developed at the output designated read delay FF· (4:2R2) of the read delay flip flop M/U–4.5 (FIG. 28) is applied to a set input of the write delay flip flop M/U–4.4 (FIG. 28), setting the write delay flip flop. Since the borrow flip flop A/U–5.1 (FIG. 31) is set, as previously described, the output designated borrow FF. (enable-set all FF's) (5:1R4) will be at a positive voltage level. This positive voltage level is applied to the input designated borrow FF. (enable-set all FF's) of an AND gate A/U–1.3 (FIG. 27). Because the comp flip flop C/U–1.6 (FIG. 17) is set, the FF· output thereof designated comp· (1:4R4) is at a negative voltage level. This negative voltage level is applied to one of two inputs designated comp· (2:5L12). of an AND gate C/U–2.16 (FIG. 22) together with the negative transition signal developed at the beginning of the second W2 time period at the other input thereof labelled W2 (2:5L11). This AND gate C/U–2.16 (FIG. 22) will be enabled and a positive-going transition signal will be developed at the output thereof designated sense borrow (2:5R5). This positive-going transition signal is then applied to an input designated sense borrow (command set all FF's) (4:1T1) of a one shot circuit A/U–1.2 (FIG. 27), developing a positive-going transition signal at the output thereof. This positive-going transition signal is applied to an input of the previously mentioned AND gate A/U–1.3 (FIG. 27), enabling this AND gate and producing a positive-going transition signal at the output thereof. This positive-going transition signal is applied to an input of the up counter A/U–1.1 (FIG. 27), setting all flip flops in the up counter. A count of "9" will therefore be indicated by an actual binary count of "15" in the up counter.

The positive voltage level developed at the output designated comp. (1:4R5) of the comp flip flop C/U–1.6 (FIG. 17) is applied at the input designated comp. (3:2L4) of an OR gate C/U–4.1 (FIG. 24), enabling this OR gate and producing a negative voltage level at the output thereof. This negative voltage level is applied to an input of the AND gate C/U–4.4 (FIG. 24) together with a negative voltage level produced during the first W2 time period at the other input thereof labelled W2 (3:2T1). AND gate C/U–4.4 (FIG. 24) will thus be enabled and a positive voltage level write signal is developed on the write bus (3:2R1). The new tens complement in the down counter is then written into the accumulator register of track 4.

The positive voltage level developed at the output designated comp. (1:4R5) of the comp flip flop C/U–1.6 (FIG. 17) is also applied to an input designated comp. (3:3L2) of an OR gate C/U–5.1 (FIG. 25), enabling this OR gate and producing a negative voltage level at the output thereof. This negative voltage level is applied to an input of an AND gate C/U–5.4 (FIG. 25) together with a positive-going transition signal developed at the end of the first W2 time period at the other input thereof labelled W2 (3:3T1). This AND gate C/U–5.4 (FIG. 25) is thus enabled and a positive-going transition shift signal is developed on the up to down and reset up bus (3:3R1). The "9" in the up counter is then transferred to the down counter.

The positive voltage level developed at the output designated comp. (1:4R5) of the comp flip flop C/U–1.7 (FIG. 17) is applied to the input designated comp. (3:1L6) of an OR gate C/U–3.1 (FIG. 23), enabling this OR gate and developing a negative voltage level read signal on the read bus (3:1R1).

Bit pulses representing the "9" on track 4 are then applied to one of three inputs designated data from storage (6:2L3) of an AND gate A/U–3.2 (FIG. 36). These bit pulses are also applied to the input designated data from storage (4:2L7) of the read delay flip flop M/U–4.5 (FIG. 28), setting the read delay flip flop and developing a negative voltage level at the read delay FF· output (4:2R2). This negative voltage level is applied to one of the two remaining inputs designated read delay FF· (6:2L2) of the previously mentioned AND gate A/U–3.2 (FIG. 36).

The negative voltage level at the output designated comp· (1:4R4) of the comp flip flop C/U–1.6 (FIG. 17) is applied to one of two inputs designated comp· (6:3L4) of an AND gate A/U–3.5 (FIG. 37) and, together with the negative voltage signal level developed during the W3 time period at the other input thereof labelled W3 (6:3L3), this AND gate is enabled, thus producing a positive voltage level at the output thereof. This positive voltage level is applied to the input of an inverter A/U–3.6 (FIG. 37), producing a negative voltage level at the output thereof designated W4 and subtract or W3 and comp (6:3R2). This negative voltage level is then applied to the remaining input designated W4 and subtract or W3 and comp (6:2L4) of the previously mentioned AND gate A/U–3.2 (FIG. 36), thereby causing this AND gate to be enabled upon the introduction of the second information bit from the "9" stored on track 4. (The first bit from the information on track 4 is used to set the read delay flip flop and develop the necessary negative voltage level at the input of the AND gate A/U–3.2 (FIG. 36) designated read delay FF· and thus enable this AND gate to pass the remaining bit pulses from track 4.) The positive "information" bit pulses will then appear as positive pulses at the output designated advance down counter (6:2R2) of this AND gate A/U–3.2 (FIG. 36). These positive bit pulses are applied to the input designated advance down counter (6:1L9) of the down counter A/U–2.1 (FIG. 35), causing the down counter to be counted down from "9," this "9" having been previously transferred into the down counter at the end of the W2 time period. As a result, the down counter will contain a zero.

The negative voltage level developed at the output designated W4 and subtract or 03 and comp (6:3R2) of the inverter A/U–3.6 (FIG. 37), as described supra, is applied to the input designated W4 and subtract or W3 and comp (4:2L10) of a one shot circuit M/U–4.7 (FIG. 28), causing a negative-going transition signal to be developed at the output of this one shot at the end of the second W3 time period. This negative-going transition signal is then applied to an input of an OR gate M/U–4.6 (FIG. 28), enabling this OR gate and developing a positive-going transition signal at the output thereof. This positive-going transition signal is then applied to a reset input of the read delay flip flop M/U–4.5 (FIG. 28) resetting the read delay flip flop and producing a positive transition signal at the output thereof designated read delay FF· (4:2R2). This positive-going transition signal is transferred to a set input of the write delay flip flop M/U–4.4 (FIG. 28), setting the write delay flip flop.

The positive voltage level developed at the output designated comp. (1:4R5) of the comp flip flop C/U–1.6 (FIG. 17) is applied to the input designated comp. (3:2L4) of the OR gate C/U–4.1 (FIG. 24), enabling this OR gate and subsequently developing a positive voltage level write signal during the third W3 time period on the write bus (3:2R1).

This positive voltage level is applied to the input designated write (4:3L5) of the OR gate M/U–3.4 (FIG. 29), enabling this OR gate and producing a negative voltage level at the output thereof. This negative voltage level is then applied to an input of the AND gate M/U–3.5 (FIG. 29) and, together with the input from track 3 containing the negative bit timing pulses and the negative signal level on the input designated down counter zero (4:3L7) this AND gate is enabled, producing positive pulses at the output thereof and developing a write operation as described supra with the following exception:

Since the write delay flip flop M/U–4.4 (FIG. 28) has been set while the down counter A/U–2.1 (FIG. 35) remains at zero, a single bit will be written into track 4, indicating a zero as follows: The first bit developed at the output of the previously mentioned AND gate M/U–3.5 (FIG. 29) is applied to the input of a shape and invert circuit M/U–3.10 (FIG. 29), thereby developing a negative transition signal at the output thereof designated reset write delay FF (4:3R5). The positive-going trailing edge of this negative pulse is applied to the input designated reset write delay FF (4:2L6) of the write delay flip flop M/U–4.4 (FIG. 28), resetting the write delay flip flop and causing the output thereof designated write delay FF. (4:2R1) to return to a negative voltage level. As a result, the down counter zero bus will return to a positive voltage level and disenable the AND gate M/U–3.5 (FIG. 29), thereby preventing further bit pulses from being read from track 3. This negative voltage level is applied to the inputs designated write (5:3L5) of AND gates M/U–3.13 and M/U–3.14 (FIG. 33), causing one of these AND gates to be enabled and the other to be disenabled and thereby producing an output thereat, so that write track 4 head No. 1, M/U–3.18 (FIG. 33) will write a single bit into the accumulator register representing a zero.

In a similar manner, zeros will be written during succeeding W3 time periods for the remainder of the digit positions provided in the display.

The single positive pulse produced at the output of the AND gate M/U–3.5 (FIG. 29) as previously described, is applied to the complement input of the write flip flop M/U–3.9 (FIG. 29), causing the voltage levels at the outputs thereof designated write FF· (4:3R3) and write FF. (4:3R4) to change polarity. The voltage levels on the inputs designated write FF· (5:3L4) and write FF. (5:3L6) of the AND gates M/U–3.13 and M/U–3.14 (FIG. 33), respectively, will also change polarity. The positive voltage level developed on the write bus (4:3L5) is also applied to the input of an inverter M/U–3.3 (FIG. 29), causing a negative voltage level to be developed at the output thereof designated write (4:3R2).

As previously described, the comp flip flop C/U–1.6 (FIG. 17) is set at the end of the first H period. Therefore, a negative voltage level is developed on the FF· output thereof, designated comp· (1:4R4) and a positive voltage level is developed on the FF. output thereof designated comp. (1:4R5). Also, the input designated sub (1:4L1) of AND gate C/U–1.3 (FIG. 17) will be at a negative voltage level and the input designated add (1:4L2) of this AND gate C/U–1.3 (FIG. 17) will also be at a negative voltage level, thereby enabling this AND gate and producing a positive voltage level at the output thereof. This positive voltage level is applied to an input of AND gate C/U–1.4 (FIG. 17), disenabling this AND gate and causing a positive voltage to be developed at the output thereof. This positive voltage is applied to the upper transfer input of the comp flip flop C/U–1.6 (FIG. 17) and to the input of an inverter C/U–1.7 (FIG. 17), causing a negative voltage level to be produced at the output thereof. This negative voltage level is then applied to the lower transfer input of the comp flip flop C/U–1.6 (FIG. 17).

The positive-going transition signal developed on the H bus (5:4R9) at the end of the second H period is applied to the transfer input labelled "H" (1:4L5) of the comp flip flop C/U–1.6 (FIG. 17), causing the positive voltage level at the upper transfer input of the comp flip flop and the negative voltage level at the lower transfer input of the comp flip flop to be transferred to the FF· and FF. outputs thereof, respectively. The positive-going transition signal thus developed at the FF· output of the comp flip flop is applied to the complement input of the ACC sign flip flop C/U–1.5 (FIG. 17), resetting the ACC sign flip flop. A negative voltage level is thereby developed on the ACC FF. output thereof, and is applied to the input of the drive circuit C/U–1.8 (FIG. 17), causing the drive circuit to energize the negative indicator C/U–1.15 (FIG. 17). The lighting of the negative indicator indicates that the information contained in the accumulator register is a negative quantity.

Also, the negative voltage level developed at the FF. output of the ACC sign flip flop C/U–1.5 (FIG. 17) is applied to an input designated acc FF. of an AND gate C/U–1.11 (FIG. 17) and also to the input designated acc FF. of an additional AND gate C/U–1.10 (FIG. 17).

If it is now desired to subtract an additional integer from the quantity now stored in the accumulator register as a result of the preceding complement operation, the subtract key of the function signal generator E/U–4.1 (FIG. 16) is operated and a positive voltage level is developed on the subtract bus (1:3R13) as previously described. This positive voltage level is applied to the input designated sub (1:4L1) of an inverter C/U–1.1 (FIG. 17), causing a negative voltage level to be developed at the output thereof. This negative voltage level is applied to an input of the previously mentioned AND gate C/U–1.10 (FIG. 17), enabling this AND gate and producing a positive voltage level on the output thereof designated add (1:4R2). The quantities in the entry register and the accumulator register are then added together as in a normal add operation. However, since a borrow operation is not generated during the add function, the comp flip flop C/U–1.6 (FIG. 17) is not affected and the acc sign flip flop C/U–1.5 (FIG. 17) will remain in the reset condition. Thus, upon the completion of this last operation, the negative indicator C/U–1.15 (FIG. 17) will remain lit, indicating a negative quantity in the accumulator.

An additional variation of the complement operation is produced by the entering of a digit into the entry register and operating the add function key in the function signal generator E/U–4.1 (FIG. 16). A positive voltage level is thereby developed at the output thereof designated add (1:3R12). This positive voltage level is applied to the input designated add (1:4L2) of an inverter C/U–1.2 (FIG. 17), causing a negative voltage level to be developed at the output thereof. This negative voltage level is applied to an input of the previously mentioned AND gate C/U–1.11 (FIG. 17), thereby enabling this AND gate and producing a positive voltage level on the output designated sub (1:4R3).

Two further variations are possible at this point. If the integer in the entry register is smaller than the integer in the accumulator register, then operation of the add function key will result in the development of a subtract operation. However, if the integer in the entry register is smaller than the integer in the accumulator register, the borrow flip flop A/U–5.1 (FIG. 31) will not be set and therefore the comp. flip flop C/U–1.6 (FIG. 17) will remain in the reset state. Since the comp flip flop remains in the reset state, a positive-going transition signal will not be applied to the complement input of the acc sign flip flop C/U–1.5 (FIG. 17). Thus, the acc sign flip flop will remain in a reset state and the negative indicator lamp C/U–1.15 (FIG. 17) will remain lit, indicating a negative quantity in the accumulator.

A second variation wherein the integer in the entry register is larger than the integer in the accumulator register, will produce a positive quantity in the accumulator register as follows:

Since the integer in the entry register is larger than the integer in the accumulator register, the subtract function, which had been developed as previously described, will result in the setting of the borrow flip flop A/U–5.1 (FIG. 31) and the setting of the comp flip flop C/U–1.6 (FIG. 17). At the end of the second H period, during this operation, the comp flip flop will be reset, thereby developing a positive-going transition signal at the output thereof. This positive-going transition signal is applied to the complement input of the acc sign flip flop C/U–1.5 (FIG. 17) and thereby setting the acc sign flip flop and de-energizing the negative indicator lamp C/U–1.15 (FIG. 17). Therefore, a positive quantity will be indicated in the accumulator register.

MULTIPLICATION

The multiplication operation is initiated by depression and release of a multiply key of the function signal generator E/U–4.2. This operation of the multiply key enables the OR gate E/U–3.5 as described supra, and provides a positive voltage level signal on the multiply bus 1:3R17 and a negative voltage level signal on the multiply bus 1:3R18.

This positive voltage level on the multiply bus 1:3R17 is applied to the multiply bus 2:2L10, an input terminal of OR gate C/U–2.7 (FIG. 19) to provide a negative output level therefrom.

GATE C/U–2.7

This negative level at the output of gate C/U–2.7 is applied to one input terminal of AND gate C/U–2.6. At this time, a second input terminal to this AND gate designated multiply counter zero bus 2:2L9 will be at a negative level due to the fact that the down counter is at a zero count and the write delay flip flop is reset. AND gate C/U–2.6 is therefore enabled on the application thereto of a negative signal level on the H bus 2:2L6, thereby producing a negative level at the output thereof. When the level on the H bus changes to a positive level, the output of the AND gate C/U–2.6 goes positive, this positive-going transition being fed to the phase control counter C/U–2.3 (the phases of which are shown in FIG. 141 for the multiply operation), thereby advancing the phase control counter to phase 1 thereof.

For each phase of the phase control counter, a combination of signals will be applied at the output terminals thereof labelled 2:2R1 through 2:2R8, this combination indicating the phase of operation at a particular point in time.

The output terminals from the phase control counter are applied to the input terminals 2:3B1 to 2:3B8 of the multiply decoder C/U–2.8 and, upon receipt of the first advance pulse by the phase control counter, set the multiply decoder to multiplication phase 1.

MULTIPLICATION PHASE 1

At multiplication phase 1, as shown in Timing Diagram FIG. 142 of U.S. Pat. No. 3,523,282, a positive voltage level is applied to the transfer from accumulator to multiplier quotient register bus 2:3T5, this positive voltage level being applied also to the transfer from accumulator to multiplier quotient register bus 3:1L8, an input terminal of OR gate C/U–3.1.

As explained supra, when a negative voltage level appears on the W3 bus 3:1T1 in conjunction with the enabling of gate C/U–3.1, a negative level will appear on the read bus 3:1R1 and provide the necessary signal thereon for reading the contents of the accumulator register into the up counter.

At the trailing edge of W3 time, the transfer from accumulator to multiplier quotient register bus 3:3L5 will also have a positive voltage level thereon due to the positive level of bus 2:3T5. Accordingly, as set forth supra, at the trailing edge of W3 time an up to down and reset up signal will be applied to the bus 3:3R1 to shift the contents of the up counter into the down counter and reset the up counter.

The positive voltage level on the transfer accumulator to multiplier quotient register 2:3T5 is transferred to bus 2:5L7, this bus being an input terminal of OR gate C/U–2.14.

GATE C/U–2.14

This positive voltage level at the input of OR gate C/U–2.14 provides a negative output level therefrom, this negative level, when applied to AND gate C/U–2.15 concurrently with a negative level on W4 bus 2:5L10, will provide a positive output level therefrom on the write track 5 bus 2:5R4.

The positive voltage level on write track 5 bus 2:5R4 is applied to write track 5 bus 4:3L6, this bus being an input terminal of the OR gate M/U–3.4.

The application of the positive voltage level signal to an input terminal OR gate M/U–3.4 provides a negative voltage level at the output thereof and, in conjunction with a negative voltage level on the down counter zero bus 4:3L7, provides output bit pulses from track 3 read head M/U–3.6. The output of the AND gate M/U–3.5 will provide output signals on the write flip flop buses 4:3R3 and 4:3R4 and reset write delay flip flop bus 4:3R5 as described supra.

The output terminals 4:3R3 and 4:3R4 of the write flip flop are coupled to the AND gates M/U–3.15 and M/U–3.16. Upon the arrival of a write driver track 5 negative voltage level signal on bus 5:3L8, this signal being provided at the output of OR gate C/U–2.14 (FIG. 22), the bits read from track 3 will be written onto track 5 by the write track 5 head M/U–3.19. These bits will continue to be written onto track 5 until the down counter has been counted down to zero whereupon AND gate M/U–3.5 will be disenabled and cut off the passage of bit signals from track 3 to track 5.

The positive voltage level on the transfer accumulator to multiplier quotient register 2:3T5 is also applied to the transfer accumulator to multiplier quotient register bus 3:2L8, this bus being an input terminal of the OR gate C/U–4.1. As described supra, at W2 time, when a negative voltage level appears on bus 3:2T1, the write bus 3:2R1 will have a positive level thereon and provide the write operation discussed supra for gate C/U–4.1. Since, at W2 time, nothing is stored in the down counter, only one of AND gates M/U–3.15 or M/U–3.16 will be enabled and, accordingly, the contents of the accumulator register will be erased.

MULTIPLICATION PHASE 2

The next positive-going transition on the H bus 2:2L6 will step the phase counter C/U–2.3 to its phase 2 state as shown in FIG. 143 of U.S. Pat. No. 3,523,282. As explained supra, under the discussion of the phase 1 operation, the output of the phase control counter will be fed to the multiply decoder and provide an output on the phase 2 bus, this bus being the shift left accumulator register bus 2:3T4. This phase 2 operation takes place after the phase 5 operation and will be discussed after the phase 5 operation.

MULTIPLICATION PHASE 3

The next positive-going transition on the H bus 2:2L6 will step the phase control counter to phase 3 thereof as shown in FIG. 144 of U.S. Pat. No. 3,523,282 and, thereby, as explained supra, provide a positive voltage level on the phase 3 bus, this bus being the shift left multiplier quotient register bus 2:3T3. The positive voltage level on bus 2:3T3 is inverted by inverter C/U–2.9, producing a negative voltage level on bus 2:3T6. This negative voltage level is applied to input terminal 3:4L7 of the AND gate C/U–2.22 (FIG. 26). This will enable this AND gate as a result of the negative signal levels having been applied to the remaining inputs thereof, one of these signals being a negative level multiply signal on the bus 3:4L6 and the other being a negative level signal from the FF. output of the digit sense flip flop C/U–2.19. The concurrence of these signals at the input of AND gate C/U–2.22 will provide a positive level output therefrom, this level being applied on the stop phase control counter bus 3:4R2 to the 1. bus 2:2R2 of the phase control counter. The phase control counter (C/U– 2.3, FIG. 19) is then locked in the multiply phase 3 state and will remain so locked until the most significant digit in the accumulator register is sensed. The most significant digit in the accumulator register is sensed by the following series of operations:

The positive voltage level on the shift left multiplier quotient register bus 2:3T3 is applied to the shift left multiplier quotient register bus 2:5L1, this bus being an input terminal of the OR gate C/U–2.12 (FIG. 22).

GATE C/U–2.12

A negative level is thereby applied at the output of this OR gate on the enable track 5 read gate bus 2:5R1, thereby applying a negative voltage level to the enable track 5 read gate bus 5:2L5, an input terminal of AND gate M/U–2.4. Upon the occurrence of a negative voltage level on the RS bus 5:2L4, the output from the read from track 5 head M/U–2.2 will pass through the now enabled AND gate M/U–2.4 and be transferred through a shape and invert circuit M/U–2.5 to the data from storage bus 5:2R4.

It should be understood that, though the read head from track 5 is constantly energized due to the appearance of an RS negative signal on AND gate M/U–2.4 during each W period, the contents of the multiplier quotient register are only read during W1 time, at all other times the multiplier quotient register having no information stored therein. It is for this reason that the RS timing signal can be used alone.

Thus, the data on the data from storage bus 6:2L3, read out by the track 5 read head, will be transferred to the up counter along bus 6:2R1 in the manner set forth supra.

The positive voltage level on the shift left multiplier quotient register bus 2:3T3 is applied to the shift left multiplier quotient register bus 3:3L19, this bus being an input terminal of the OR gate C/U–5.3. Accordingly, as discussed supra, at the trailing edge of W4 time, a positive going transition will appear on the up to down and reset up counter bus (5:1L8) to provide an up to down and reset up function, thereby shifting the contents of the up counter to the down counter.

The positive voltage level on the shift left multiplier quotient register bus 2:3T3 is also applied to the shift left multiplier quotient register bus 2:5L6, this bus being an input terminal of the OR gate C/U–2.14. At W4 time, when a negative level appears on the W4 bus 2:5L10, the write track 5 head M/U–3.19 will be energized and write the contents of the down counter into the multiplier quotient register on track 5 in the manner set forth supra in the discussion of phase one of the multiply operation.

The positive voltage level on the shift left multiplier quotient register bus is inverted by the inverter C/U–2.9 (FIG. 20) to provide a negative level on the shift left multiplier quotient register bus 2:3T6, this negative level being applied to the shift left multiplier quotient register bus 2:4L6. When the voltage level on the H bus 2:4L5 goes negative, the concurrence of this negative voltage level and the negative voltage level on the shift left multiplier quotient register bus 2:4L6 will enable AND gate C/U–2.11 (FIG. 21) and provide a negative voltage level at the output thereof. When the voltage level on the H bus 2:4L5 goes positive, the output of AND gate C/U–2.11 will go positive and provide a positive-going transition on the command broadside bus of the multiplier counter C/U–2.10. A number contained in the down counter will now be transferred to the multiplier counter along the broadside line buses 6:1T1 to 6:1T4. The multiplier counter will thus contain a count equal to the count of the down counter.

As a result of a count being entered into the multiplier counter, a positive transition signal will appear on the multiply counter zero bus 2:4R2, this signal being transferred to the multiplier counter zero bus 3:4L5. This positive transition signal on bus 3:4L5 provides a positive transition at the output of AND gate C/U–2.23 since a positive voltage level is now applied to the phase 3 bus 2:3T3. This positive voltage transition at the output of the AND gate C/U–2.23 will set the digit sense flip flop C/U–2.19 and cause a positive voltage level to appear on the FF. output lead thereof. This positive level signal will disenable AND gate C/U–2.22 and allow the phase control counter to be advanced to its next phase. This positive voltage level transition will also be applied along the multiplier counter zero bus 2:2L9 to one input of the AND gate C/U–2.6, thereby disenabling this AND gate and providing a positive-going transition on the output thereof. This positive-going transition will be applied to the advance bus of the phase control counter and thereby advance the counter to its next phase.

MULTIPLICATION PHASE 4

The phase control counter now sets the multiply decoder to its phase 4 state, thereby developing a positive voltage level on the phase 4 or add bus 2:3T2. Thus, a typical add cycle will be initiated, adding the contents of the entry register to the contents of the accumulator register and leaving the sum in the accumulator register.

The above is accomplished because the add bus 2:3T2 is tied to the same terminals as the add bus 1:4R2 of the add operation and, therefore, performs the same operations as performed by the existence of a positive level on bus 1:4R2.

After the phase 4 addition operation is completed, the following positive transition at time H1 will attempt to advance the phase control counter through the AND gate C/U–2.6. However, if the multiplier counter contains a count therein, the AND gate C/U–2.6 will be disenabled due to the positive voltage level on the input lead thereto labelled multiply counter zero (2:2L9). Therefore, the phase control counter will remain in its phase 4 operation so long as the multiply counter contains a count therein.

With the arrival of the next H pulse, the multiplier counter C/U–2.10 will be debited one count. The add cycle will again be instituted and the contents of the entry register will again be added into the accumulator register. This operation continues until the multiplier counter has been counted down to zero, whereupon the multiplier counter zero buses 2:4R2 and 2:2L9 will contain a negative level thereon and enable AND gate C/U–2.6.

MULTIPLICATION PHASE 5

Since AND gate C/U–2.6 is now enabled, the following H pulse will cause a positive transition on the output thereof and advance the phase control counter to its phase 5 state as shown in FIG. 145 of U.S. Pat. No. 3,523,828. Accordingly, as described supra, the multiply decoder C/U–2.8 will provide a positive voltage level on the phase 5 output bus 2:3T1 thereof.

The positive voltage level on the phase 5 bus 2:3T1 is applied to the multiply decoder phase 5 bus 4:4L6, this bus being an input terminal of AND gate C/U–2.28 (FIG. 30). This AND gate will be enabled in the following manner: During RS time periods, a positive level signal is applied on the RS bus 4:4L8, this bus being an input terminal of AND gate C/U–2.29. Also, information remaining on track 5 will appear as negative pulses on the read amp. track 5 bus 4:4L9, this bus being the other input terminal of AND gate C/U–2.29. The positive transitions of the pulses on the read amp. track 5 bus 4:4L9 will provide positive-going transitions at the output of AND gate C/U–2.29 and will set the digit sense multiply register flip flop C/U–2.27. This will provide a negative level at the FF· output of the digit sense multiply register flip flop. With the next succeeding positive-going transition on the H bus 5:4R9, the digit sense multiply register flip flop C/U–2.27 will be reset and provide a positive-going transition on the FF· output thereof, this positive-going transition passing through the AND gate C/U–2.28 previously enabled by the positive level on the multiply decoder phase 5 bus. This positive-going transition appears on the reset FF4 and FF8 of phase control counter bus 4:4R3.

This positive transition on the reset FF4 and FF8 of phase control counter bus 4:4R3 is applied to the bus 2:2L5 to reset the phase control counter to its phase 2 state. This resetting of the phase control counter to its phase 2 state will be initiated due to the information still remaining in the track 4 storage register. The calculator will then proceed to operate in the multiply function from phase 2 on as described supra.

MULTIPLICATION PHASE 2

When the multiply decoder is in the phase 2 state, a positive level appears on the shift left accumulator bus 2:3T4.

This positive voltage level is applied to the shift left accumulator bus 3:1L1, an input terminal of OR gate C/U–3.1 (FIG. 23). As explained supra, enabling of OR gate C/U–3.1 will, at W3 time, provide a negative level on the read bus 3:1R1 and thereby read the contents of the accumulator register into the up counter.

This positive voltage level of the shift left accumulator bus (2:3T4) is applied to the set input designated shift left accumulator (3:4L1) of the ACC SL DELAY flip flop C/U–2.18 (FIG. 26), setting the ACC SL DELAY flip flop on the application of the next succeeding positive-going transition signal on the reset input labelled H (3:4L2). The ACC SL DELAY flip flop will be reset, thus developing a positive-going transition at the output thereof. The input designated multiply (3:4L6) of OR gate C/U–2.20 (FIG. 26) will be at a positive voltage level, thereby enabling this OR gate and producing a positive voltage level at the output thereof.

This positive voltage level is then transferred to the input of the previously mentioned AND gate C/U–2.21 (FIG. 26) and, together with the positive transition signal developed at the output of the ACC SL DELAY flip flop C/U–2.18 (FIG. 26), as previously mentioned, the AND gate C/U–2.21 (FIG. 26) will be enabled, thereby producing a positive transition at the output designated set-read delay FF (3:4R1). This positive-going transition is applied to the set input designated common digit No. 1 (4:2L8) of the read delay flip flop M/U–4.5 (FIG. 28), thereby setting the read delay flip flop and producing a negative voltage level at the output thereof designated read delay FF· (4:2R2).

The previously mentioned positive voltage level produced on the shift left accumulator bus (2:3T4) is applied to an input designated shift left accumulator (3:3L3) of the shift OR gate C/U–5.1 (FIG. 25), thus enabling this OR gate and producing a negative voltage level at the output thereof. This negative voltage level is applied to an input of the AND gate C/U–5.4 (FIG. 25) and, together with the positive-going transition signal applied to the input designated W2 (3:3T1) at the end of the first W2 time period, this AND gate C/U–5.4 (FIG. 25) will be disenabled and develop a positive-going transition signal on the up to down and reset up bus (3:3R1). The positive-going transition signal on the up to down and reset up bus (3:3R1) is applied to the input designated up to down and reset up (5:1L8) of a one shot circuit A/U–6.2 (FIG. 31), enabling this one shot circuit and producing a negative-going transition signal at the output thereof. This negative-going transition signal is applied to the input of the up to down and reset up network A/U–6.1 (FIG. 31), thereby developing a positive-going transition signal at the output designated read delay reset (5:1R5).

The positive-going transition signal on the read delay reset bus (5:1R5) is applied to the output designated read delay FF· (4:2R2) of the read delay flip flop M/U–4.5 (FIG. 28), thus forcing the read delay flip flop into a reset condition. Also, this positive-going transition signal (5:1R5) is applied to a set input of the write delay flip flop M/U–4.1 (FIG. 28), thereby setting the write delay flip flop.

MULTIPLICATION PHASE 5

When the phase control counter is advanced to its phase 5 state as shown in FIG. 145 of U.S. Pat. No. 3,523,282 and no information remains in track 5 of the drum, no pulses are applied to the input bus of AND gate C/U–2.29 (FIG. 30) designated read amp. track 5 bus 4:4L9. Therefore, the digit sense multiply register flip flop C/U–2.27 (FIG. 30) will not be set and the input to the digit sense multiply register flip flop next appearing on the H bus 4:4L7 will have no effect thereon and not provide a positive-going transition on the FF· output thereof. Therefore, the AND gate C/U–2.28 is not enabled and the next incoming positive transition on the H bus 2:2L6 will advance the phase control counter continually, one step for each incoming positive transition thereto, through a complete cycle back to a zero count or phase zero. At this point, all inputs to the AND gate C/U–2.31 (FIG. 19) will be at a negative level since each of the FF. terminals of the flip flops of the phase control counter are now at a negative level. The following H pulse on the H bus 2:2L6, after the phase control counter has been counted to its zero phase, provides a negative signal level at the input to AND gate C/U–2.31, thereby enabling the gate and causing a positive level signal to appear at the output thereof. This positive level signal is applied to the reset input of the function signal generator E/U–4.2 (FIG. 16) along buses 2:2R9 and 1:3L4 to reset the multiply flip flop (not shown) in the function signal generator E/U–4.2. Concurrently, the negative signal level is developed on the multiply output bus 1:3R17 of the function signal generator multiply and divide circuit, this negative signal being transferred to the multiply bus 2:2L10, an input or OR gate C/U–2.7. This OR gate is then disenabled and produces a positive level at the output thereof, this positive level being applied to one of the inputs of AND gate C/U–2.6 and disenabling this AND gate, Disenabling of AND gate C/U–2.6 prevents the phase control counter from being advanced by the application of further H pulses thereto.

The positive-going leading edge of the signal appearing at the output of AND gate C/U–2.31 is applied to an input terminal 3:4L3 of the digit sense flip flop C/U–2.19, thereby resetting this flip flop.

The above completes the set of operations required to provide the multiplication function.

DIVIDE

The divide operation is commenced by depressing and releasing the divide key of the function signal generator E/U–4.2 and thereby providing a positive voltage level on the divide buses 1:3L3 and 1:1R19 and a negative voltage level on the divide bus 1:3R20 to institute the phases of the divide operation as set forth in FIG. 146 of U.S. Pat. No. 3,523,282.

The positive voltage level on the divide bus 1:3L3 is transferred to the divide bus 1:2B2 and enables OR gate E/U–3.5 in the same manner described supra to perform the operations associated therewith. The positive voltage level on the divide bus 1:3R19 is transferred along the divide bus 2:2L11 to the input of OR gate C/U–2.7 to provide a negative level output therefrom as described supra in the multiplication operation.

Since a negative level appears on buses 1:3R20 and 2:2R9, as described supra in the multiplication operation, the negative level output of OR gate C/U–2.7, in conjunction with a negative level on the multiply counter zero bus and a positive transition on the H bus will shift the phase control counter C/U–2.3 to phase 1 of the divide operation.

DIVIDE PHASE 1

When the phase control counter C/U–2.3 is shifted to phase 1 as depicted in FIG. 147 of U.S. Pat. No. 3,523,282, a combination of signals is provided on the output buses 2:2R1 to 2:2R8 thereof to indicate a phase 1 divide operation. The voltage levels on these buses are transferred to the input buses of the divide decoder C/U–2.1 these buses being labelled 2:1B1 through 2:1B8. This operation sets the divide decoder to its phase 1 state, producing a positive level signal on the output lead therefrom labelled phase 1 sub bus 2:1T5.

The positive voltage level on the subtract bus 2:1T5 provides the same functions described supra when a positive level appears on the subtract bus 1:4R3. Therefore, the contents of the entry register will be subtracted from the contents of the accumulator register in the manner set forth hereinabove under subtraction with the following change:

Because neither the add nor subtract function keys have been operated, the subtract bus (1:4R1) and the add bus (1:4L2) will be at a negative voltage level. Therefore, the input labelled "subtract" (1:4L1) of AND gate C/U–1.3 (FIG. 17) will be at a negative voltage level and the input labelled "add" (1:4L2) of this AND gate C/U–1.3 (FIG. 17) will also be at a negative voltage level. Therefore, this AND gate will be enabled and a positive voltage level will be developed at the output thereof. This positive voltage level is applied to an input of AND gate C/U–1.4 (FIG. 17), disenabling this gate. Therefore, because the AND gate C/U–1.4 (FIG. 17) is disenabled, the borrow signal appearing on the BORROW FF· input (1:4L3) of the AND gate C/U–1.4 (FIG. 17) will be inhibited and will have no effect on the COMP flip flop C/U–1.6 (FIG. 17). At those points of the divide operation wherein an integer is subtracted from a smaller integer to develop a borrow signal, the COMP flip flop C/U–1.6 (FIG. 17) will remain in its reset condition at the end of the H time period when a positive-going "transfer" signal is applied to the COMP flip flop.

DIVIDE PHASE 2

The next following positive transition on the H bus 2:2L6 will advance the phase control counter to phase 2 and thereby provide a positive voltage level on the phase 2 and add bus 2:1T8 of the divide decoder. Phase 2 of the division operation constitutes a restoration of the previously subtracted quantity (subtracted during phase 1) into the accumulator register. This restoration is provided by adding the contents of the entry register to the contents of the accumulator register, this function being the normal add function and, accordingly, the positive level on the add bus 2:1T8 will provide the same add function as provided by the add bus 1:4R2, when a positive voltage level appears thereon, thereby restoring the accumulator register to its original condition.

DIVIDE PHASE 3

When the H bus 2:2L6 again shifts from a negative to a positive voltage level, the positive-going transition will shift the phase control counter to phase 3 of the divide operation and thereby, as described supra, place a positive voltage level on the phase 3 shift left entry bus 2:1T9. This positive voltage level on the shift left entry bus 2:1T9, as shown in FIG. 148 of U.S. Pat. No. 3,523,282, provides the same function as a positive voltage level on the shift left entry bus 1:1R5 and, thereby, shifts the contents of the entry register one digit space to the left or, effectively, multiplies the contents of the entry register by 10.

The positive voltage level on the shift left entry bus 2:1T9 is also applied to the enabled jump to phase 1 at H bus 2:2L4. The application of this positive voltage level at the input of the phase control counter will, at the next H time, jump the phase control counter back to phase 1 rather than continuing the count onward to phase 4. The phase control counter then proceeds to cycle through the phase 1, phase 2 and phase 3 cycles of the divide operation until, at a subsequent time, a subtraction operation in phase 1 provides a negative value result.

When the subtraction in phase 1 of the divide operation provides a negative quantity in the accumulator register, the borrow flip flop A/U–5.1 (FIG. 31) is set in the manner described supra during the borrow operation of the subtract function. Setting of the borrow flip flop will provide a negative voltage level on the borrow FF· bus 5:1R3 and also on the borrow FF· bus 2:2L8, thereby priming AND gate C/U–2.4 for conduction when a negative voltage level appears on the H bus 2:2L7. At the next H time when the H bus 2:2L7 goes negative, the output of the AND gate C/U–2.4 (FIG. 19) will have a positive-going transition thereat and thereby jump the phase control counter to phase 4 by providing the positive-going transition on the jump to phase 4 command bus.

DIVIDE PHASE 4

When the phase control counter has shifted to the phase 4 state, a positive voltage level is provided on the phase 4 and add bus 2:1T8 of the divide decoder C/U–2.1. This add function is identical to the add function of phase 2 of division and adds the contents of the entry register back into the accumulator register as described previously for the add function.

DIVIDE PHASE 5

At the next positive-going transition on the H bus 2:2L6, the phase control counter will advance to phase 5 which is a shift right entry function as depicted in FIG. 149 of U.S. Pat. No. 3,523,282. A positive voltage level will appear on the phase 5 shift right entry bus 2:1T7 of the divide decoder in the manner previously described.

In the shift right entry register operation, the positive voltage level on the shift right entry bus 2:1T7 is applied to the shift right entry bus 3:1L17, this bus being an input terminal of the OR gate C/U–3.2. As explained supra, enabling of OR gate C/U–3.2 will cause a negative level to appear on the read bus 3:1R1 at W4 time and, thereby, as explained supra, read the contents of the entry register into the up counter.

The positive voltage level on the shift right entry bus 2:1T7 is also applied to the shift right entry bus 3:3L16, this bus being an input terminal of the OR gate C/U–5.3. As explained supra, enabling of OR gate C/U–5.3 will provide a negative voltage level on the up to down and reset up bus 3:3R1 at the trailing edge of W4 time, thereby transferring the contents of the up counter into the down counter and resetting the up counter.

The positive voltage level on the shift right entry bus 2:1T7 is also applied through the inverter C/U–2.2 to the shift right entry bus 2:1T1 and thereby to the shift right entry bus 4:3L2 as a negative voltage level. During W2 time when a negative voltage level appears on the W2 bus 4:3L1, and AND gate M/U–3.1 is enabled and provides a positive voltage output thereat.

The positive voltage level at the output of AND gate M/U–3.1 is applied to one of the input terminals of OR gate M/U–3.4 and is described as N signal. This positive N signal at an input terminal of OR gate M/U–3.4 provides a negative voltage level at the output thereof.

The positive voltage level at the output of AND gate M/U–3.1 is also applied to the inverter M/U–3.7 to provide a negative voltage level on the N bus 4:3R1, this negative voltage level being applied to the N bus 5:3L2. The positive voltage level on the bus 5:3L2 is applied to an input terminal of each of AND gates M/U—3.11 and M/U–3.12, the other input terminal of each of these gates being fed by the write FF· and write FF. output terminals 5:3L1 and 5:3L3.

Since the output of OR gate M/U–3.4 (FIG. 29) is at a negative level and, concurrently, the down counter zero bus 4:3L7 is at a negative level due to the non-zero condition of the down counter, AND gate M/U–3.5 is enabled and pulses read by the read head from track 3 M/U–3.6 pass to the write flip flop M/U–3.9 and the shape and invert circuit M/U–3.10 in the manner described supra. Accordingly, the alternate negative levels on the write FF· and write FF. buses, in conjunction with the negative level N signal on bus 5:3L2, will enable the AND gates M/U–3.11 and M/U–3.12 to pass pulses therethrough in the manner described supra. Thereby the contents of the down counter are placed in track 4 via track 4 write head 2 (M/U–3.17) (FIG. 33) to shift the contents of the entry register one position to the right.

DIVIDE PHASE 6

At the end of the phase 5 operation, the next succeeding positive transition on the H bus 2:2L6 will advance the phase control counter to phase 6 and thereby, in the manner described above, provide a positive voltage level on the phase 6 shift left multiplier quotient register bus 2:1T6 of the divide decoder, and provide the steps set forth in FIG. 144 of U.S. Pat. No. 3,523,282.

The positive voltage level on the shift left multiplier quotient register bus 2:1T6 is transferred to the shift left multiplier quotient register bus 2:5L1 and thereby enables OR gate C/U–2.12 (FIG. 22) as explained supra in phase 3 of the multiplication operation. Thus, as explained supra, the AND gate M/U–2.4 (FIG. 32) is enabled and the contents of the track 5 are read into the up counter. This reading of the contents of the multiplier quotient register into the up counter will take place during the W1 time period because the contents of the multiplier quotient register pass under track 5 read head at W1 time.

The contents of the up counter are shifted to the down counter and the up counter is reset by the application of the positive voltage level on the shift left multiplier quotient register bus 2:1T6 to the shift left multiplier quotient register bus 3:3L19, thereby enabling the OR gate C/U–5.3 (FIG. 25). In the manner described supra, enabling the OR gate C/U–5.3 will provide the necessary signal on bus 3:3R1 at the trailing edge of W4 time, to shift the contents of the up counter into the down counter and resetting the up counter.

The positive voltage level on the shift left multiplier quotient register bus 2:1T6 is also applied to the shift left multiplier quotient register bus 2:5L6 and thereby enables the OR gate C/U–2.14 (FIG. 22) in the same manner indicated supra. Accordingly, as described supra, at W4 time, a significant write TK5 signal will be produced at the output of AND gate C/U–2.15 to read the contents of the down counter into the multiplier quotient register during the W4 time period.

DIVIDE PHASE 7

After the phase 6 operation has been completed, the next positive-going transition on the H bus 2:2L6 will advance the phase control counter to its phase 7 state and thereby provide a positive voltage level on the phase 7 subtract bus 2:1T5 of the divide decoder.

The phase 7 subtract operation is identical to the phase 1 subtraction and will subtract the contents of the entry register from the contents of the accumulator register in the same manner described supra for the phase 1 operation.

DIVIDE PHASE 8

At the next positive voltage transition on the H bus 2:2L6, the phase control counter will shift to its phase 8 state and thereby provide a positive voltage level on the phase 8 and add one to the multiplier quotient register bus 2:1T4 of the divide decoder as indicated in FIG. 150 of U.S. Pat. No. 3,523,282.

The division phase 8 operation proceeds in the following manner: At the beginning of the phase 8 condition of the divide decoder, phase 8 bus 2:1T4 is shifted from a negative level to a positive level thereby providing a positive-going transition thereon. This positive transition is transferred to the add 1 to the multiplier quotient register bus 4:2L3 and thereby sets the write delay flip flop M/U–4.4.

The positive voltage transition on the add 1 to the multiplier quotient register bus 2:1T4 is also applied to the add 1 to the multiplier quotient register bus 4:1L6 of the up counter, thereby setting the number 1 flip flop at this time (at the beginning of W1 time). The subsequent bits obtained by a reading out of the count in track 5 is also read into the up counter due to the negative voltage level on the enabled track 5 read gate bus 2:5R1 and 5:2L5 thereby adding "1" to the present contents of the multiplier quotient register. This sum is then subsequently rewritten back into the multiplier quotient register. It is to be noted that, due to the setting of the write flip flop, an excess 1 bit will be placed into the multiplier quotient register in the same manner as previously described.

The positive voltage level on the add one to the multiplier quotient register bus 2:1T4 is also applied to the add one to multiplier quotient register bus 3:3L1 and, thereby, as explained supra, enables OR gate C/U–5.1 and provide a negative voltage level on the up to down and reset up bus 3:3R1 at the W2 period. Accordingly, at the trailing edge of W2 time, the contents of the up counter are shifted to the down counter and the up counter is reset.

The positive voltage level on the add 1 to the multiplier quotient register bus 2:1T4 is also applied to the add one to the multiplier quotient register bus 2:5L3, this being an input terminal of the OR gate C/U–2.12.

As explained supra, the positive voltage level at the input of OR gate C/U–2.12 provides an enabling pulse for the AND gate M/U–2.4 which, in conjunction with an RS signal thereto, will read the contents from track 5 into the up counter, this function taking place immediately upon sensing any data stored in track 5.

The positive voltage level on the add 1 to the multiplier quotient register bus 2:1T4 will also be transferred to the add 1 to the multiplier quotient register bus 2:5L8, thereby providing a positive level on an input terminal of the OR gate C/U–2.14. As explained supra, enabling of OR gate C/U–2.14 will provide a significant level at the output thereof so that the track 5 write head will be energized during the W4 time period to write the contents of the down counter back into track 5 of the drum.

JUMP DIVIDE PHASE 8 TO PHASE 7

The positive voltage level on the bus 2:1T4 is also applied to the enable jump phase 8 to phase 7 bus 2:2L2 and, thereby, at the conclusion of the phase 8 operation, will shift the phase control counter back to the phase 7 state. Thereby, the phase 7 and phase 8 operations of the multiplication operation will be continued until a negative number is sensed in the accumulator register.

JUMP TO DIVIDE PHASE 4

This negative number will occur when a subtraction during the phase 7 operation results in a negative result, thereby providing a positive voltage level signal on the enable jump to phase 4 bus 2:2L1 and thereby jumping the phase control counter back to phase 4.

The operation now continues with phase 4 and continues through phases 5, 6, 7 and 8 in the manner previously described.

JUMP TO DIVIDE PHASE 9

Upon jumping from the phase 7 operation back to the phase 4 operation as described above, (when an advance to the phase 5 operation produces a low order digit overflow), a jump from the phase 5 state to the phase 9 state is produced in the following manner: At the commencement of a phase 5 divide operation, the change from a negative level to a positive level on the phase 5 shift right entry bus 2:1T7 is also placed on the shift right entry bus 4:4L1, thereby setting the first digit gate flip flop C/U-2.24 and producing a negative level on the FF output thereof. This negative level, in conjunction with a negative level on the RS bus 4:4L4 and a negative level on the W4 bus 4:4L5, will enable AND gate C/U-2.25 upon the occurrence of a negative level on the track 4 read bus 4:4L3, thereby providing a change from a negative level to a positive level at the output of this AND gate. Each pulse along the track 4 read bus 4:4L3 will provide a positive-going transition at the output of AND gate C/U-2.25, these positive-going transitions being applied to the entry register digit overflow flip flop C/U-2.26, thereby setting this flip flop and producing a negative level on the jump to phase 9 command at H bus 4:4R1.

The negative level on the jump to phase 9 command at H bus 4:4R1 is shifted to a positive level upon the occurrence of a positive voltage transition on the H bus 4:4R2, this pulse resetting the entry register digit overflow flip flop and providing a positive transition on the jump to phase 9 command at H bus 4:4R1, this positive transition being transferred to the jump to phase 9 command at H bus 2:2L3 and, thereby, jumping the phase control counter to phase 9. This jump to phase 9 takes place concurrently with the application of an H pulse to the phase control counter via H bus 2:2L6.

DIVIDE PHASE 9

When the phase control counter is set to phase 9, in the manner described supra, the divide decoder provides a positive level during phase 9 on the transfer from accumulator to entry register bus 2:1T3 as described in FIG. 151 of U.S. Pat. No. 3,523,282.

The positive voltage level on the transfer from accumulator to entry register bus 2:1T3 provides a positive volt-age level on the similarly designated bus 3:1L9, this bus being an input terminal of the OR gate C/U-3.1 (FIG. 23) to enable this gate. In the manner described supra, enabling of OR gate C/U-3.1 provides a significant voltage level on the read bus 3:1R1 at the W3 time period and the contents of the accumulator register are transferred into the up counter.

The positive voltage level on the transfer from accumulator to entry register bus 2:1T3 is applied to the similarly named bus 3:3L15, this bus being an input terminal of the OR gate C/U-5.3 (FIG. 25) and, as explained supra, enables this OR gate and, thereby, provides a positive going transition on the up to down and reset up bus 3:3R1 at the trailing edge of W4 time. Accordingly, the contents of the up counter will be transferred to the down counter and the up counter will be reset.

The positive voltage level on the transfer from accumulator to entry register bus 2:1T3 provides a positive voltage level on the similarly named bus 3:2L14 and, as described supra, enables OR gate C/U-4.2 and provides a significant voltage level on the write bus 3:2R1 during the W3 time period to write the contents of the down counter into the entry register.

It should be understood that the contents of the accumulator register which are read into the entry register at this time represent the remainder of the division operation.

DIVIDE PHASE 10

The next incoming positive voltage transition on the H bus 2:2L6 will advance the phase control counter to phase 10 as described in FIG. 152 of U.S. Pat. No. 3,523,282 and thereby provide a positive voltage level on the phase 10 transfer from multiplier quotient register to accumulator register bus 2:1T2 of the divide decoder.

The positive voltage level on the transfer from multiplier quotient register to accumulator register bus 2:1T2 is impressed on the similarly named bus 2:5L2, thereby enabling OR gate C/U-2.12 (FIG. 22) in the manner previously described. Accordingly, the track 5 read head AND gate M/U-2.4 (FIG. 32) will be enabled and transfer the contents of track 5 into the down counter as soon as read, this being during W1 time. This operation is fully explained supra.

The positive voltage level on the transfer from multiplier quotient register to the accumulator register bus 2:1T2 provides a positive level on the similarly named bus 3:3L6, thereby enabling OR gate C/U-5.2 (FIG. 25) and providing a positive going transition on the up to down and reset up bus 3:3R1 at the trailing edge of the W3 time period in the manner similarly set forth supra. Accordingly, the contents of the up counter are shifted to the down counter and the up counter is reset.

The positive voltage level on the transfer from the multiplier quotient register to the accumulator register bus 2:1T2 is also transferred to the similarly named bus 3:2L6, thereby enabling the OR gate C/U-4.1 (FIG. 24). As explained supra, by enabling OR gate C/U-4.1, the write bus 3:2R1 will have a significant voltage level applied thereto during the W2 time period and, thereby, write the contents of the down counter into the accumulator register.

Accordingly, in the division operation the quotient is now stored in the accumulator register and the remainder is stored in the entry register.

This completes the basic operation required to perform a division operation.

TRANSFER TO TEMPORARY STORAGE 1

The contents of the accumulator register are transferred to the temporary storage register No. 1 by depression and release of the T1 key (FIG. 16) of the function signal generator E/U-4.1 as shown in FIG. 153 of U.S. Pat. No. 3,523,282. As described supra, depression and release of the transfer to storage register 1 key will provide a positive level on the bus 1:3T10, thereby providing a significant level at the output of OR gate E/U-3.5 (FIG. 15) as described supra. Also, a positive voltage level will be applied to the T1 bus 1:3R2 and a negative level will be applied to the T1 bus 1:3R1.

The positive voltage level on the bus 1:3R2 is transferred to the T1 bus 3:1L2 (FIG. 23), this bus being an input terminal of the OR gate C/U-3.1 to enable this gate. As set forth supra, by enabling of OR gate C/U-3.1, the contents of the accumulator register will be read into the up counter at the W3 time period due to this positive level at the input of OR gate C/U-3.1.

The positive level on bus 1:3R2 is transferred to the T1 bus 3:3L7, enabling the OR gate C/U-5.2 and thereby providing a positive going transition on the up to down and reset up bus 3:3R1 as explained supra. Thereby, the contents of the up counter are transferred to the down counter and the up counter is reset.

The negative voltage level on the T1 bus 1:3R1 is transferred to the T1 bus 3:2L10, thereby providing a negative input level to one input terminal of the AND gate C/U-4.5 (FIG. 24). When a negative level appears on the W4 bus 3:2L9, the AND gate C/U-4.5 is enabled and provides a negative output level thereat and at an input terminal of OR gate C/U-4.7. This negative input level to OR gate C/U-4.7 will provide a significant voltage level on the write bus 3:2R1 as discussed supra. The above steps will transfer the contents of the accumulator register into the temporary storage register No. 1.

TRANSFER TO TEMPORARY STORAGE 2

Information is transferred from the accumulator register to the temporary storage register No. 2 in a manner similar to the transfer from the accumulator register to the storage register No. 1 described supra. This operation is commenced by the depression and release of the T2 key of the function signal generator, thereby enabling the OR gate E/U-3.5 as described supra and providing a negative voltage level on the T2 bus 1:3R3 and a positive voltage level on the T2 bus 1:3R4 as shown in FIG. 154 of U.S. Pat. No. 3,523,282.

The positive voltage level on the T2 bus 1:3R4 is transferred to the T2 bus 3:1L3, this bus being an input of OR gate C/U-3.1 to enable this gate. As described supra, enabling of OR gate C/U-3.1 will provide a significant voltage level on the read bus 3:1R1 and thereby transfer the contents of the accumulator register to the up counter during the W3 time period.

The appearance of the positive voltage level on the T2 bus 1:3R4 also provides a positive voltage level on the T2 bus 3:3L8, thereby enabling the OR gate C/U-5.2 and, as described supra, providing an up to down and reset up signal on the bus 3:3R1 at the trailing edge of W3 time. Thereby, the contents of the up counter are transferred to the down counter and the up counter is reset.

The negative voltage level appearing on the T2 bus 1:3R3 is transferred to the T2 bus 3:2T3, this bus being an input terminal of the AND gate C/U-4.3. When a concurrent negative voltage level also appears on the W1 bus 3:2T2, AND gate C/U-4.3 is enabled and provides a negative output level thereat and at an input terminal of OR gate C/U-4.7 to provide a significant signal on the write bus 3:2R1 in the manner describes supra.

The above operations will transfer the contents of the accumulator register into the temporary storage register No. 2.

RECALL FROM TEMPORARY STORAGE 1

Information can be transferred from the temporary storage register No. 1 into the entry register by depressing and releasing the R1 key of the function signal generator as shown in FIG. 155 of U.S. Pat. No. 3,523,282. Depression and release of the R1 key will provide a positive voltage level on the R1 bus 1:3T8 and thereby provide a negative level at the output of OR gate E/U-3.5 to provide the operations described supra. Also, a negative level will appear on the R1 bus 1:3R5 whereas, a positive level will appear on the R1 bus 1:3R6.

The negative voltage level on the R1 bus 1:3R5 will provide a negative voltage level on the R1 bus 3:1T2, this bus being an input terminal of the AND gate C/U-3.3. When a concurrent negative level appears on the W1 bus 3:1T3, AND gate C/U-3.3 (FIG. 23) will be enabled and provide a negative level at the output thereof and at an input terminal of OR gate C/U-3.7 to provide a significant read signal on the read bus 3:1R1 as set forth supra. Therefore, the contents of the temporary storage register No. 1 are read into the up counter.

The positive voltage level on the R1 bus 1:3R6 is transferred to the R1 bus 3:3L9, thereby enabling the OR gate C/U-5.2 (FIG. 25) and providing a positive going transition on the up to down and reset up bus 3:3R1 at the trailing edge of W3 time as explained supra. This positive going transition on the up to down and reset up bus will transfer the contents of the up counter to the down counter and reset the up counter.

The positive voltage level on the R1 bus 1:3R6 will provide a positive voltage level on the R1 bus 3:2L12, thereby enabling the OR gate C/U-4.2 (FIG. 24) and providing a significant voltage level on the write bus 3:2R1 during the W3 time period as explained supra. Accordingly, the contents of the down counter will be written into the entry register.

The above operations are required to recall the contents of the storage register No. 1 into the entry register.

RECALL FROM TEMPORARY STORAGE 2

The contents of the temporary storage register No. 2 are recalled to the entry register by the depression and release of the R2 key (FIG. 16) of the function signal generator as shown in FIG. 156 of U.S. Pat. No. 3,523,282. Depression and release of the R2 key provides a positive voltage level on the R2 bus 1:3T9 to enable the OR gate E/U-3.5 (FIG. 15) and provide the functions as described supra in connection therewith. Depression and release of the R2 key will also provide a negative voltage level on the R2 bus 1:3R7 and a positive level on the R2 bus 1:3R8.

The appearance of a negative level on the R2 bus 1:3R7 provides a negative level on the R2 bus 3:1L11, this bus being an input terminal of the AND gate C/U-3.5 (FIG. 23). When a negative level appears on the W2 bus 3:1L10, AND gate C/U-3.5 is enabled and provides a negative output level thereat and at an input terminal of OR gate C/U-3.7 to provide a significant read signal on the read bus 3:1R1 as described supra. The contents of the temporary storage register No. 2 are therefore transferred to the up counter.

The appearance of a positive level on the R2 bus 3:3R8 will provide a positive level on the R2 bus 3:3L11, thereby enabling the OR gate C/U-5.2 (FIG. 25) and, at the trailing edge of the W3 time providing a positive going transition on the up to down and reset up bus 3:3R1 as explained supra. This positive going transition on the up to down and reset up bus 3:3R1 will shift the contents of the up counter to the down counter and reset the up counter.

The presence of a positive level on the R2 bus 1:3R8 will provide a positive level on the R2 bus 3:2L13, thereby enabling the OR gate C/U-4.2 (FIG. 24) and, as described supra, thereby provide a significant voltage level on the write bus 3:2R1 during the W3 time period. Therefore, the contents of the down counter will be written into the entry register.

The above operations are required to recall the contents of the temporary storage register No. 2 into the entry register.

H DELAY CIRCUIT OPERATION

The H delay circuit is designed to clear the up counter and down counter of surplus numbers which may incidentally have been left in the counters at the end of an H time. At the end of every H period, a positive-going transition signal is applied to an input labelled H (5:1B1) of a special one shot circuit A/U-6.2 (FIG. 31). This special one shot circuit contains an H delay network wherein, upon the introduction of the previously mentioned positive-going transition signal on the H bus, a delayed signal will be initiated by the initial H signal. On the application of the initial positive-going transition (H) signal to the previously-mentioned one shot A/U-6.2 (FIG. 31), a negative-going transition signal will be developed at the output thereof. This negative-going transition signal is applied to the input of the up to down and reset up counter network A/U-6.1 (FIG. 31), causing a typical positive-going transition up to down and reset up counter signal to be developed on the output labelled up to down and reset up (5:1R6).

This positive-going transition signal is applied to an input designated up to down and reset up (4:1L11) of the up counter A/U-1.1 (FIG. 27). Also, this positive-going transition signal will be applied to the input designated up to down and reset up counter (5:1L1) of the AND gates A/U-4.3 and A/U-4.4 (FIG. 31) and resetting the carry flip flop A/U-4.1 (FIG. 31) if the carry flip flop has been set. Finally, this positive-going transition signal will be applied to the input designated up to down and reset up (6:1L11) of the down counter A/U-2.1 (FIG. 35). Therefore, whatever count may have remained in the up counter at the end of the H time period is now transferred to the down counter and the up counter will be reset to zero.

The H delay signal which is developed shortly after the application of the initial H signal at the end of the H time period will also produce a negative-going transition signal at the output of the special one shot circuit A/U–6.2 (FIG. 31). This negative-going transition signal is applied to the up to down and reset up counter network A/U–6.1 (FIG. 31), causing a positive transition signal to be developed at the output thereof, designated up to down and reset up (5:1R6). This positive-going transition signal is applied to the previously mentioned inputs designated up to down and reset up (4:1R11) of the up counter A/U–1.1 (FIG. 27), reset up counter (5:1L1) of the carry flip flop A/U–4.1 (FIG. 31) and the AND gates A/U–4.3 and A/U–4.4 (FIG. 31) and the input designated "up to down and reset up" (6:1L11) of the down counter A/U–2.1 (FIG. 35).

Therefore an additional transfer operation will be initiated wherein the zero now contained in the up counter will be transferred to the down counter, leaving a zero in the down counter and resetting the up counter and leaving a zero in the up counter, i.e., clearing the up and down counters.

SHIFT LEFT ACCUMULATOR REGISTER

The contents of the accumulator register may be shifted to the left by depression and release of the shift left key (arrow pointing to the left) (FIG. 16) of the function signal generator. Depression and release of the shift left key will provide a positive level on the shift left accumulator bus 1:3T6, thereby enabling the OR gate E/U–3.5 (FIG. 15) and providing the functions thereof as discussed supra. Also, a positive voltage level will appear on the shift left accumulator bus 1:3R11.

This positive voltage level on the shift left accumulator bus (1:3R11) is applied to the set input designated shift left accumulator (3:4L1) of the ACC SL DELAY flip flop C/U–2.18 (FIG. 26), setting the ACC SL DELAY flip flop on the application of the next succeeding positive-going transition signal on the reset input labelled H (3:4L2). The ACC SL DELAY flip flop will be reset, thus developing a positive-going transition at the output thereof. The input designated multiply (3:4L6) of OR gate C/U–2.20 (FIG. 26) will be at a positive voltage level, thereby enabling this OR gate and producing a positive voltage level at the output thereof.

This positive voltage level is then transferred to the input of the previously-mentioned AND gate C/U–2.21 (FIG. 26) and, together with the positive transition signal developed at the output of the ACC SL DELAY flip flop C/U–2.18 (FIG. 26), as previously mentioned, the AND gate C/U–2.21 (FIG. 26) will be enabled, thereby producing a positive transition at the output designated set-read delay FF (3:4R1). This positive-going transition is applied to the set input designated common digit No. 1(4:2L8) of the read delay flip flop M/U–4.5 (FIG. 28), thereby setting the read delay flip flop and producing a negative voltage level at the output thereof designated read delay FF (4:2R2).

The positive voltage level developed on the shift left accumulator bus (1:3R11), previously mentioned, is also applied to the input designated shift left accumulator (3:1L1) of the OR read gate C/U–3.1 (FIG. 23), thereby enabling this OR gate and producing a negative voltage level at the output thereof. This negative voltage level is then applied to an AND gate C/U–3.4 (FIG. 23) and, together with the negative signal level applied at the other input thereof labelled W3 (3:1T1) during the first W3 time, this AND gate C/U–3.4 (FIG. 23) will be enabled and develop a negative voltage level "read" signal on the read bus (3:1R1). The integer in the units position of the accumulator register is then read from the accumulator register into the up counter.

The previously mentioned positive voltage level produced on the shift left accumulator bus (1:3R11) is applied to an input designated shift left accumulator (3:3L3) of the sift OR gate C/U–5.1 (FIG. 25), thus enabling this OR gate and producing a negative voltage level at the output thereof. This negative voltage level is applied to an input of the AND gate C/U–5.4 (FIG. 25) and, together with the positive-going transition signal applied to the input designated W2 (3:3T1) at the end of the first W2 time period, this AND gate C/U–5.4 (FIG.25) will be disenabled and develop a positive-going transition signal on the up to down and reset up bus (3:3R1). The positive-going transition signal on the up to down and reset up bus (3:3R1) is applied to the input designated up to down and reset up (5:1L8) of a one shot circuit A/U–6.2 (FIG. 31), enabling this one shot circuit and producing a negative-going transition signal at the output thereof. This negative-going transition signal is applied to the input of the up to down and reset up network A/U–6.1 (FIG. 31), thereby developing a positive-going transition signal at the output designated read delay reset (5:1R5).

The positive-going transition signal on read delay reset bus (5:1R5) is applied to the output designated read delay FF (4:2R2) of the read delay flip flop M/U–4.5 (FIG. 28), thus forcing the read delay flip flop into a reset condition. Also, this positive-going transition signal (5:1R5) is applied to a set input of the write delay flip flop M/U–4.1 (FIG. 28), thereby setting the write delay flip flop.

The positive voltage level developed on the shift left accumulator bus (1:3R11), previously mentioned, is applied to the shift left accumulator (3:2L5) input of the write OR gate C/U–4.1 (FIG. 24), thus enabling this OR gate and producing a negative voltage level at the output thereof. This negative voltage level is applied to an input of an AND gate C/U–4.4 (FIG. 24) and, together with the negative voltage level applied to the W2 input (3:2T1) during the second W2 time period to enable this AND gate and develop a positive voltage level write signal on the write bus (3:2R1). This positive voltage level is applied to the write input (4:3L5) of the write OR gate M/U–3.4 (FIG. 29), thereby enabling this OR gate and producing a negative voltage level at the output thereof designated N or WRITE or WRT TK5 (FIG. 29). This negative voltage level is then applied to an input of an AND gate M/U–3.5 (FIG. 29) and, together with the negative signal level applied to the down counter zero input (4:3L7) and the negative bit timing pulses from the read from TK3 circuit M/U–3.6 (FIG. 29) on the remaining input, this AND gate M/U–3.5 (FIG. 29) will be enabled and develop positive pulses at the output thereof. (Input 4:3L7 is placed at a negative voltage level because the write delay flip flop M/U–4.4 of FIG. 28 is set, thereby enabling the down counter zero gate in the down counter A/U–2.1 of FIG. 35 and developing a negative voltage level on the down counter zero bus 6:1B2).

The first of these positive pulses as applied to the input of the shape and invert circuit M/U–3.10 (FIG. 29) will cause a negative pulse to be produced at the output thereof designated reset write delay FF (4:3R5). The positive-going trailing edge of this negative pulse is applied to the reset write delay FF (4:2L6) input of the write delay flip flop M/U–4.4 (FIG. 28), thereby resetting the write delay flip flop and producing a negative voltage level at the output thereof designated write delay FF. (4:2R1). This negative voltage level will then disenable the down counter zero gate in the down counter A/U–2.1 (FIG. 35) and produce a positive voltage level on the down counter zero bus (6:1B2). This positive voltage level is then applied to the down counter zero input (4:3L7) of the AND gate M/U–3.5 (FIG. 29), thus disenabling this AND gate and preventing further bit pulses from passing through this gate.

Therefore, one "information" bit (a positive pulse) will be applied to the complement input of the write flip flop M/U–3.9 (FIG. 29) and thus, cause a change of voltage level at the output terminals thereof designated WRT FF· (4:3R3) and WRT FF. (4:3R4). This single change of voltage levels will be applied to the WRT FF· (5:3L4) input of an AND gate M/U–3.1 (FIG. 33) and the WRT FF. (5:3L6) of the AND gate M/U–3.14 (FIG. 33) and, together with the negative signal level on the write bus (5:3L5) will enable these AND gates and cause a single change of voltage level at the output terminals thereof. This single change of voltage level is then applied to the write track 4 head No. 1 M/U–3.18 (FIG. 33), thereby causing a single bit representing a "0" to be written into the accumulator register. Therefore, each time the shift left accumulator key is operated, a zero will be produced and displayed to the right of the least significant or lowest order integer.

SHIFT RIGHT ACCUMULATOR REGISTER

The contents of the accumulator register can be shifted to the right by depression and release of the shift right key (arrow pointing to the right) of the function signal generator as indicated in FIG. 157 of U.S. Pat. No. 3,523,282. Depression and release of the shift right accumulator key (FIG. 16) will provide a positive voltage level on the shift right accumulator bus 1:3T5, thereby enabling the OR gate E/U-3.5 (FIG. 15) and providing the operations consonant therewith. Also, a positive voltage level will appear on the shift right accumulator bus 1:3R10 and a negative voltage level will appear on the shift right accumulator bus 1:3R14 due to the inverter E/U-4.5.

The positive voltage level on the shift right accumulator bus 1:3R14 is transferred to the shift right accumulator bus 3:1L7, thereby enabling the OR gate C/U-3.1. As discussed supra, enabling of OR gate C/U-3.1 provides a significant voltage level on the read bus 3:1R1 at the W3 time period, thereby reading the contents of the accumulator register into the up counter.

The positive voltage level on the shift right accumulator bus 1:3R10 is also applied to the shift right accumulator bus 3:3L13 to enable the OR gate C/U-5.2 and thereby provide a positive going transition on the up to down and reset up bus 3:3R1 at the trailing edge of W3 time as described supra. This positive going transition on the up to down and reset up bus 3:3R1 will shift the contents of the up counter into the down counter and reset the up counter.

The negative voltage level on the shift right accumulator bus 1:3R14 will provide a negative voltage level on the shift right accumulator bus 4:3L4, this bus being an input terminal of the AND gate M/U-3.2. During the W1 time period, a concurrent negative voltage level appears on the W1 bus 4:3L3, thereby enabling the AND gate M/U-3.2 and providing a positive level at the output thereof.

The positive voltage level at the output terminal of AND gate M/U-3.2 enables OR gate M/U-3.4 and, thereby, as described supra, will write the contents of the down counter into the accumulator register during the W1 time period.

The above operations will shift the contents of the accumulator register one digit position to the right.

INITIAL CLEARING OF CALCULATOR

Before initiating operation of the calculator, it is often desirable and even necessary to clear one or more of the registers on track 4 and/or track 5 of the drum. These operations are performed in the following manner:

CLEAR ENTRY KEY

The entry register is cleared or erased by closure of the clear entry key E/U-4.6 (FIG. 15). Closure of this key completes a circuit and provides a positive voltage level on the clear entry bus 1:2R1. In the manner described supra during the discussion of the clear entry operation, the entry register will be cleared since the same type of positive level is applied to the clear entry bus by closure of the clear entry key as was provided in the prior discussion by the enabling of the AND gate E/U-3.3.

The positive voltage level on the clear entry bus 1:2R1 is also transferred to the clear entry bus 2:5L9, this bus being an input terminal of OR gate C/U-2.14. As explained supra, a significant voltage level will be applied to the write driver track 5 bus 2:5R3 and, during the W4 time period, to the write track 5 bus 2:5R4 due to enabling of OR gate C/U-2.14.

Since the write flip flop M/U-3.9 is not complemented due to the disenabling of AND gate M/U-3.5 at this time, only one of the AND gates M/U-3.13 or M/U-3.14 will be energized and, therefore, write track 4 head will erase the contents of track 4 whenever the entry register appears thereunder as explained supra. Also, only one of the AND gates M/U-3.15 or M/U-3.16 will be energized during the W4 time period. Since the track 5 write head is over the multiplier quotient portion of track 5 during the W time period, write track 5 head will erase the contents of the multiplier quotient register.

CLEAR ENTRY AND ACCUMULATOR REGISTER KEY

Both the entry register and the accumulator register may be cleared of any information thereon by closure of the clear key E/U-4.4, thereby placing a positive voltage level on the clear bus 1:3R15. Also, this change to a positive voltage level will be delayed by the delay one shot circuit E/U-4.3. The output of the delay circuit is a positive voltage level. Therefore, this change to a positive voltate level on the clear delta bus 1:3L1 is applied, through diode E/U-4.7, to the clear delta bus 1:4L4 and, thereby, setting the accumulator sign flip flop C/U-1.5.

The output on the clear delta bus 1:3R16 is also applied to the clear delta bus 2:5R2, this positive voltage being applied through diode C/U-2.30 to the FF. bus of the clear Q register flip flop C/U-2.13 and, thereby, setting this flip flop.

The positive voltage level on the clear bus 1:3R15 is applied to the clear bus 3:2L2 and to the clear bus 3:2L11. As explained supra, the positive level on the clear bus 3:2L2 will enable the OR gate C/U-4.1 and, thereby, during W2 time, provide a significant voltage level on the write bus 3:2R1, thereby writing the contents of the down counter into the accumulator register. Since the down counter has no count therein, no bits will be entered into the accumulator register and, accordingly, this register will be erased.

The positive level on the clear bus 3:2L11 will enable the OR gate C/U-4.2 and, as described supra, thereby provide a significant voltage level on the write bus 3:2R1 during the W3 time period. Since the down counter will have no count contained therein, no bit information will be written from the down counter and accordingly, the entry register will have no bit information written therein as explained hereinbelow.

The positive voltage level on the clear delta bus 1:3R16 is applied to an input terminal of the OR gate C/U-2.14. As explained supra, enabling of OR gate C/U-2.14 provides a significant voltage level on the write driver track 5 bus 2:5R3 and, during the W4 time period, to the write track 5 bus 2:5R4.

Since the write flip flop M/U-3.9 (FIG. 29) is not complemented due to the disenabling of the AND gate M/U-3.5 (FIG. 29) at this time, only one of the AND gates M/U-3.13 or M/U-3.14 (FIG. 33) will be energized and, therefore, write track 4 head No. 1 will erase the contents of track 4 whenever the entry and accumulator registers appear thereunder as explained supra. Also, only one of the AND gates M/U-3.15 or M/U-3.16 will be energized during the W4 time period. Since the track 5 write head is over the multiplier quotient portion of track 5 during the W4 time period, write track 5 head will erase the contents of the multiplier quotient register. Accordingly, the calculator will be reset to compute a new problem at this time.

The output of the calculator in the form of a display circuit is fully disclosed in U.S. Pat. No. 3,523,282.

Though the invention has been disclosed with respect to a single preferred embodiment of the invention, many alterations and variations thereof will become immediately apparent to those skilled in the art. For example, any type of single digit storage device capable of performing the operation of the device utilized herein could be used. Rather than using an up and down counter, two up counters, or two down counters, or a down and an up counter could be used with but minor changes in circuitry. Also, the counters could be composed of any device capable of indicating a count. A host of other variations could also be made. It is therefore the intention that the appended claims be interpreted as broadly as possible in view of the prior art to include the above-mentioned variations and all other variations apparent to those skilled in the art.

What is claimed is:

1. An electronic calculator comprising:
   a. an up counter;
   b. a down counter;
   c. memory means;
   d. reading means associated with said memory means for reading digits out of said memory means; and
   e. control means controlling said reading means and said up counter, said control means entering a first digit in said memory means into said up counter during a first interval and adding a second digit in said memory means to said first digit in said up counter during a second interval, the lower order sum of said first and second digits being transferred from said up counter to said down counter substantially instantaneously after the termination of said second interval.

2. A device as recited in claim 1 further including:
   a. a carry storage device;
   b. means responsive to a predetermined condition of the lower order sum in said up counter for storing a carry in said carry storage device during said second interval; and
   c. means for successively entering the carry from said storage device into said up counter after the termination of said second interval.

3. A device as recited in claim 1 further including:
   writing means controlled by said control means for writing the lower order sum in said down counter into said memory means during a third interval.

4. An electronic device comprising:
   a. a first counter;
   b. a second counter;
   c. a memory means;
   d. means for entering representation of a digit from said memory means into said first counter;
   e. means for broadsiding the digit representation from said first counter into said second counter;
   f. means for entering representation of a digit from said memory means into said second counter to debit the digit representation already there and obtain a difference; and
   g. means for writing the difference appearing in said second counter into said memory means.

5. A device as set forth in claim 4 further including:
   means for resetting said first counter with the concurrence of broadsiding said digit representation into said second counter.

6. A device as set forth in claim 5 further including:
   means responsive to a predetermined state of said second counter for debiting the next succeeding digit representation entered into said first counter by one.

7. A device as set forth in claim 6 wherein said responsive means includes:
   1. a borrow counter;
   2. means for conditioning said borrow counter to represent a count of one each time said second counter passes through its zero state; and
   3. means for entering said count from said borrow counter into said first counter for debiting the next digit representation entered.

8. An electronic calculating device comprising:
   a. an up counter;
   b. a down counter;
   c. means for conditioning said up counter to represent a digit;
   d. means for broadsiding the digit representation from said up counter into said down counter;
   e. means for debiting the digit representation in said down counter;
   f. a borrow storage device;
   g. means for successively entering a borrow count from said down counter into said storage device each time said down counter passes through its zero state;
   h. means for resetting said up counter; and
   i. means for transferring said borrow count from said borrow storage device into said up counter to debit said up counter by "1" substantially instantaneously with the resetting thereof.

* * * * *